(12) United States Patent
Takahashi et al.

(10) Patent No.: US 11,215,820 B2
(45) Date of Patent: Jan. 4, 2022

(54) THREE-DIMENSIONAL DISPLAY APPARATUS, THREE-DIMENSIONAL DISPLAY SYSTEM, HEAD UP DISPLAY, HEAD UP DISPLAY SYSTEM, THREE-DIMENSIONAL DISPLAY APPARATUS DESIGN METHOD, AND MOBILE OBJECT

(71) Applicants: OSAKA CITY UNIVERSITY, Osaka (JP); KYOCERA Corporation, Kyoto (JP)

(72) Inventors: Hideya Takahashi, Kashiwara (JP); Goro Hamagishi, Toyonaka (JP); Kaoru Kusafuka, Tokyo (JP)

(73) Assignees: OSAKA CITY UNIVERSITY, Osaka (JP); KYOCERA Corporation, Kyoto (JP)

( * ) Notice: Subject to any disclaimer, the term of this patent is extended or adjusted under 35 U.S.C. 154(b) by 223 days.

(21) Appl. No.: 16/481,406

(22) PCT Filed: Jan. 26, 2018

(86) PCT No.: PCT/JP2018/002582
§ 371 (c)(1),
(2) Date: Jul. 26, 2019

(87) PCT Pub. No.: WO2018/139611
PCT Pub. Date: Aug. 2, 2018

(65) Prior Publication Data
US 2019/0377177 A1 Dec. 12, 2019

(30) Foreign Application Priority Data

Jan. 27, 2017 (JP) .............................. JP2017-013685
Jan. 27, 2017 (JP) .............................. JP2017-013686
(Continued)

(51) Int. Cl.
*G03H 1/00* (2006.01)
*G02B 27/01* (2006.01)
(Continued)

(52) U.S. Cl.
CPC ......... *G02B 27/0101* (2013.01); *G02B 30/27* (2020.01); *H04N 13/305* (2018.05); *G02B 2027/0129* (2013.01)

(58) Field of Classification Search
CPC ................ G02B 27/0101; G02B 30/27; G02B 2027/0129; H04N 13/305
(Continued)

(56) References Cited

U.S. PATENT DOCUMENTS 6,970,290 B1 11/2005 Mashitani et al.
8,576,484 B2 11/2013 Okamoto
(Continued)

FOREIGN PATENT DOCUMENTS

CN 105467603 A 4/2016
JP H09-050019 A 2/1997
(Continued)

*Primary Examiner* — Jonathan M Blancha
(74) *Attorney, Agent, or Firm* — Studebaker & Brackett PC

(57) ABSTRACT

A three-dimensional display apparatus comprises a display panel (display element) and a parallax barrier (optical element). The display panel displays a left-eye image and a right-eye image respectively in first subpixels and second subpixels. The parallax barrier transmits at least part of the left-eye image toward the left eye, and at least part of the right-eye image toward the right eye. A first certain number of the first subpixels and of the second subpixels are each successively arranged in each column. A region in which the first subpixels are arranged and a region in which the second subpixels are arranged are displaced from each other by a second certain number between two adjacent columns. The
(Continued)

first certain number is greater than the second certain number and is not a multiple of the second certain number.

13 Claims, 52 Drawing Sheets

(30) Foreign Application Priority Data

Jan. 27, 2017 (JP) .............................. JP2017-013687
Oct. 31, 2017 (JP) .............................. JP2017-210105

(51) Int. Cl.
  *H04N 13/305* (2018.01)
  *G02B 30/27* (2020.01)
(58) Field of Classification Search
  USPC ............................................................ 359/13
  See application file for complete search history.

(56) References Cited

U.S. PATENT DOCUMENTS

| | | |
|---|---|---|
| 8,902,300 B2 | 12/2014 | Saito |
| 9,838,674 B2 | 12/2017 | Cho et al. |
| 2012/0057228 A1 | 3/2012 | Okamoto |
| 2013/0194398 A1 | 8/2013 | Saito |
| 2014/0029095 A1* | 1/2014 | Allio .................... H04N 13/31 359/464 |
| 2014/0168390 A1 | 6/2014 | Cho et al. |
| 2014/0320614 A1 | 10/2014 | Gaudreau |
| 2015/0362740 A1 | 12/2015 | Hamagishi et al. |
| 2016/0219260 A1* | 7/2016 | Sato .................... H04N 13/398 |
| 2016/0327791 A1* | 11/2016 | Kasano ................. G02B 27/01 |

FOREIGN PATENT DOCUMENTS

| | | |
|---|---|---|
| JP | 2001-166259 A | 6/2001 |
| JP | 2012-053343 A | 3/2012 |
| JP | 2012-083428 A | 4/2012 |
| JP | 2014-121097 A | 6/2014 |

* cited by examiner

FIG. 4
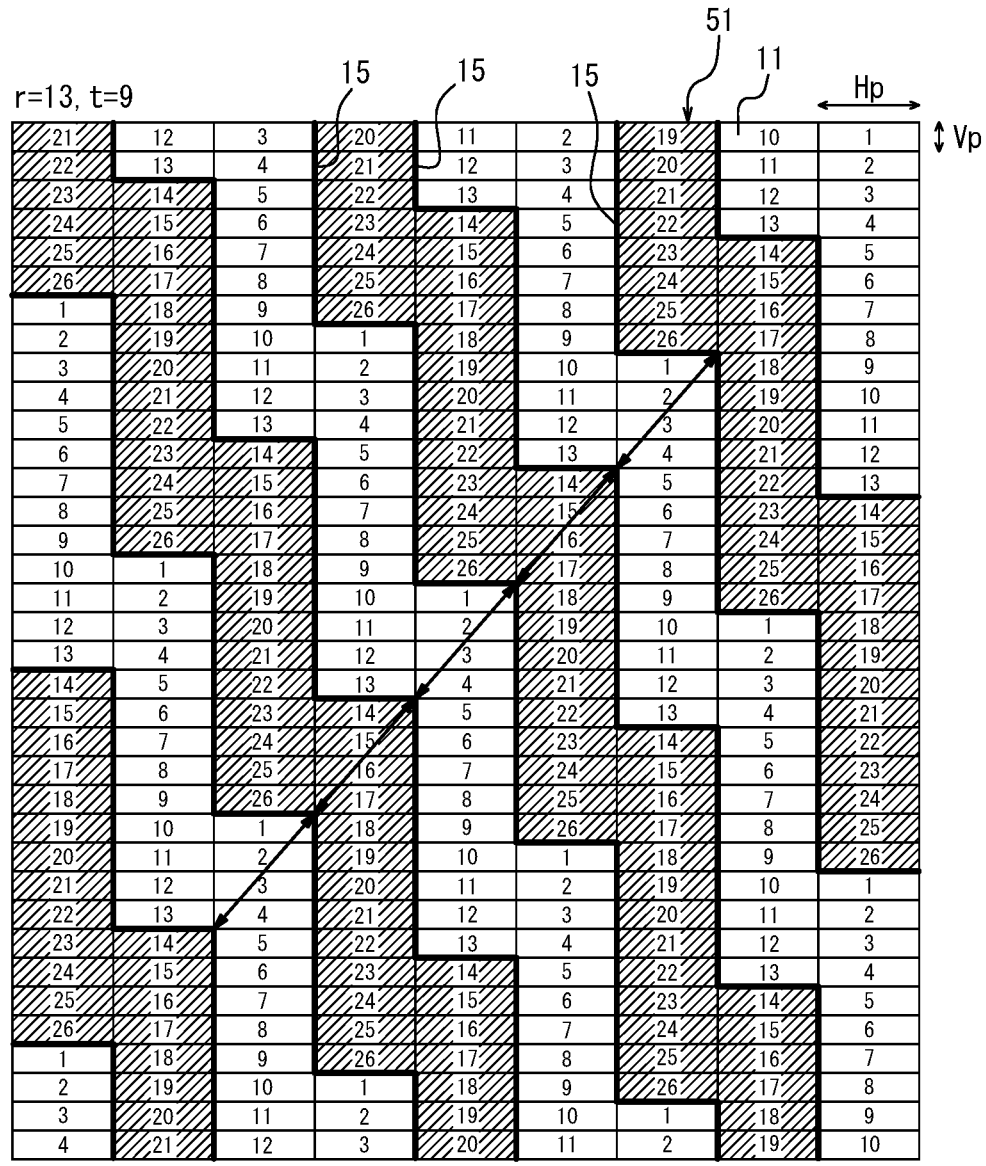
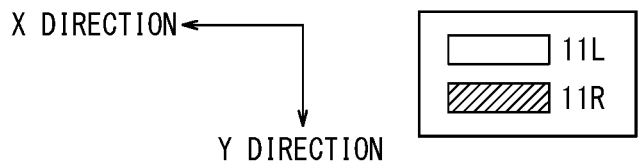

THREE-DIMENSIONAL DISPLAY APPARATUS, THREE-DIMENSIONAL DISPLAY SYSTEM, HEAD UP DISPLAY, HEAD UP DISPLAY SYSTEM, THREE-DIMENSIONAL DISPLAY APPARATUS DESIGN METHOD, AND MOBILE OBJECT

CROSS REFERENCE TO RELATED APPLICATION

This application claims priority to and the benefit of Japanese Patent Application No. 2017-210105 filed on Oct. 31, 2017, Japanese Patent Application No. 2017-013685 filed on Jan. 27, 2017, Japanese Patent Application No. 2017-013686 filed on Jan. 27, 2017, and Japanese Patent Application No. 2017-013687 filed on Jan. 27, 2017, the entire disclosures of which are incorporated herein by reference.

TECHNICAL FIELD

The present disclosure relates to a three-dimensional display apparatus, a three-dimensional display system, a head up display, a head up display system, a three-dimensional display apparatus design method, and a mobile object.

BACKGROUND

Display apparatuses including barriers for causing different image light to reach the left and right eyes of a user to provide stereoscopic vision without the aid of special glasses and the like are conventionally known (e.g. PTL 1, PTL 2, and PTL 3).

CITATION LIST

Patent Literature

PTL 1: US 2015/0362740 A1
PTL 2: JP 2001-166259 A
PTL 3: JP H9-50019 A

SUMMARY

Technical Problem

Conventional three-dimensional display apparatuses have room for improvement in techniques of appropriately displaying a three-dimensional image to the left and right eyes.

It could therefore be helpful to provide a three-dimensional display apparatus, a three-dimensional display system, a head up display, a head up display system, a three-dimensional display apparatus design method, and a mobile object having improved techniques of appropriately displaying a three-dimensional image to enhance convenience.

Solution to Problem

To achieve the object stated above, a three-dimensional display apparatus according to an embodiment of the present disclosure comprises a display apparatus and an optical element. The display apparatus has a display surface including subpixels arranged in a grid in a first direction corresponding to a direction in which parallax is provided to eyes of a user and a second direction approximately orthogonal to the first direction, and is configured to display a left-eye image and a right-eye image respectively in first subpixels and second subpixels separated by display boundaries passing along boundaries between the subpixels. The optical element is configured to selectively transmit at least part of the left-eye image in a direction of an optical path toward a left eye of the user, and selectively transmit at least part of the right-eye image in a direction of an optical path toward a right eye of the user. When an arrangement in the first direction of the grid formed by the subpixels is a row and an arrangement in the second direction of the grid is a column, a first certain number of the first subpixels and of the second subpixels are each successively arranged in each column. A region in which the first subpixels are arranged and a region in which the second subpixels are arranged are displaced from each other in the second direction by a second certain number between two adjacent columns. The first certain number is greater than the second certain number and is not a multiple of the second certain number To achieve the object stated above, a three-dimensional display system according to an embodiment of the present disclosure comprises a display apparatus, an optical element, a detection apparatus, and a controller. The display apparatus has a display surface including subpixels arranged in a grid in a first direction corresponding to a direction in which parallax is provided to eyes of a user and a second direction approximately orthogonal to the first direction, and is configured to display a left-eye image and a right-eye image respectively in first subpixels and second subpixels separated by display boundaries passing along boundaries between the subpixels. The optical element is configured to selectively transmit at least part of the left-eye image in a direction of an optical path toward a left eye of the user, and selectively transmit at least part of the right-eye image in a direction of an optical path toward a right eye of the user. The detection apparatus is configured to detect positions of the left eye and the right eye of the user. The controller is configured to move the display boundaries, based on the positions of the left eye and the right eye of the user detected by the detection apparatus. When an arrangement in the first direction of the grid formed by the subpixels is a row and an arrangement in the second direction of the grid is a column, a first certain number of the first subpixels and of the second subpixels are each successively arranged in each column. A region in which the first subpixels are arranged and a region in which the second subpixels are arranged are displaced from each other in the second direction by a second certain number between two adjacent columns. The first certain number is greater than the second certain number and is not a multiple of the second certain number To achieve the object stated above, a head up display according to an embodiment of the present disclosure comprises a display apparatus, an optical element, a detection apparatus, a controller, and an optical system. The display apparatus has a display surface including subpixels arranged in a grid in a first direction corresponding to a direction in which parallax is provided to eyes of a user and a second direction approximately orthogonal to the first direction, and is configured to display a left-eye image and a right-eye image respectively in first subpixels and second subpixels separated by display boundaries passing along boundaries between the subpixels. The optical element is configured to selectively transmit at least part of the left-eye image in a direction of an optical path toward a left eye of the user, and selectively transmit at least part of the right-eye image in a direction of an optical path toward a right eye of the user. The detection apparatus is configured to detect positions of the left eye and the right eye of the user. The controller is configured to move the display boundaries, based on the positions of the left eye and the right eye of the user detected by the detection apparatus. The optical system is configured to project image light emitted from the display surface and transmitted through the optical element so as to form a virtual image in a field of view of the user. When an arrangement in the first direction of the grid formed by the subpixels is a row and an arrangement in the second direction of the grid is a column, a first certain number of the first subpixels and of the second subpixels are each successively arranged in each column. A region in which the first subpixels are arranged and a region in which the second subpixels are arranged are displaced from each other in the second direction by a second certain number between two adjacent columns. The first certain number is greater than the second certain number and is not a multiple of the second certain number To achieve the object stated above, a three-dimensional display apparatus design method according to an embodiment of the present disclosure is a three-dimensional display apparatus design method for a three-dimensional display apparatus including a display apparatus and an optical element. The display apparatus has a display surface including subpixels arranged in a grid in a first direction corresponding to a direction in which parallax is provided to eyes of a user and a second direction approximately orthogonal to the first direction, and is configured to display a left-eye image and a right-eye image respectively in first subpixels and second subpixels separated by display boundaries passing along boundaries between the subpixels. The optical element is configured to selectively transmit at least part of the left-eye image in a direction of an optical path toward a left eye of the user, and selectively transmit at least part of the right-eye image in a direction of an optical path toward a right eye of the user. The three-dimensional display apparatus design method comprises: determining a optimum viewing distance; determining an image pitch that is a pitch in the first direction with which the left-eye image and the right-eye image are displayed, based on the optimum viewing distance; determining a first certain number and a second certain number based on the image pitch, the first certain number being greater than the second certain number; and determining an arrangement method of the first subpixels and the second subpixels and a shape of the optical element based on the first certain number and the second certain number. When an arrangement in the first direction of the grid formed by the subpixels is a row and an arrangement in the second direction of the grid is a column, the first certain number of the first subpixels and of the second subpixels are each successively arranged in each column. A region in which the first subpixels are arranged and a region in which the second subpixels are arranged are displaced from each other in the second direction by the second certain number between two adjacent columns A three-dimensional display apparatus according to an embodiment of the present disclosure comprises a display surface and an optical element. The display surface includes subpixels arranged in a grid along a horizontal direction and a vertical direction. The optical element is configured to define, for each of strip regions extending in a certain direction on the display surface, a light ray direction of image light emitted from subpixels. An edge of each of the strip regions traverses the subpixels, and a length of a one pixel section of the edge along the horizontal direction is shorter than a length of the one pixel section of the edge along the vertical direction A three-dimensional display system according to an embodiment of the present disclosure comprises a display surface, an optical element, a camera, and a controller. The display surface includes subpixels arranged in a grid along a horizontal direction and a vertical direction. The optical element is configured to: define, for each of strip regions extending in a certain direction on the display surface, a light ray direction of image light emitted from subpixels, wherein an edge of each of the strip regions traverses the subpixels, and a length of a one pixel section of the edge along the horizontal direction is shorter than a length of the one pixel section of the edge along the vertical direction; and cause light emitted from subpixels in part of the strip regions to propagate to a position of a right eye of a user, and light emitted from subpixels in other part of the strip regions to propagate to a position of a left eye of the user. The camera is configured to capture an image of the right eye and the left eye of the user. The controller is configured to determine three-dimensional positions of the right eye and the left eye of the user based on the image captured by the camera, and control an image displayed on the display surface based on the three-dimensional positions of the right eye and the left eye.

A head up display system according to an embodiment of the present disclosure comprises a display surface, an optical element, a camera, a controller, and an optical system. The display surface includes subpixels arranged in a grid along a horizontal direction and a vertical direction. The optical element is configured to: define, for each of strip regions extending in a certain direction on the display surface, a light ray direction of image light emitted from subpixels, wherein an edge of each of the strip regions traverses the subpixels, and a length of a one pixel section of the edge along the horizontal direction is shorter than a length of the one pixel section of the edge along the vertical direction; and cause light emitted from subpixels in part of the strip regions to propagate to a position of a right eye of a user, and light emitted from subpixels in other part of the strip regions to propagate to a position of a left eye of the user. The camera is configured to capture an image of the right eye and the left eye of the user. The controller is configured to determine three-dimensional positions of the right eye and the left eye of the user based on the image captured by the camera, and control an image displayed on the display surface based on the three-dimensional positions of the right eye and the left eye. The optical system is configured to project the image light emitted from the display surface so as to form a virtual image in a field of view of the user.

A mobile object according to an embodiment of the present disclosure comprises a head up display system. The head up display system includes a display surface, an optical element, a camera, a controller, and an optical system. The display surface includes subpixels arranged in a grid along a horizontal direction and a vertical direction. The optical element is configured to: define, for each of strip regions extending in a certain direction on the display surface, a light ray direction of image light emitted from subpixels, wherein an edge of each of the strip regions traverses the subpixels, and a length of a one pixel section of the edge along the horizontal direction is shorter than a length of the one pixel section of the edge along the vertical direction; and cause light emitted from subpixels in part of the strip regions to propagate to a position of a right eye of a user, and light emitted from subpixels in other part of the strip regions to propagate to a position of a left eye of the user. The camera is configured to capture an image of the right eye and the left eye of the user. The controller is configured to determine three-dimensional positions of the right eye and the left eye of the user based on the image captured by the camera, and control an image displayed on the display surface based on the three-dimensional positions of the right eye and the left eye. The optical system is configured to project the image light emitted from the display surface so as to form a virtual image in a field of view of the user.

A three-dimensional display system according to an embodiment of the present disclosure comprises a display apparatus having a display surface including subpixels arranged in a grid along a horizontal direction and a vertical direction, and configured to display a left-eye image and a right-eye image respectively in first subpixels and second subpixels separated by a display boundary on the display surface from among the subpixels. The three-dimensional display system comprises a barrier having a light shielding region that shields the left-eye image and the right-eye image, and a light transmitting region that causes at least part of the left-eye image to reach a left eye of a user and at least part of the right-eye image to reach a right eye of the user. The three-dimensional display system comprises a detection apparatus configured to detect an observation distance from the display apparatus to at least one of the left eye and the right eye. The three-dimensional display system comprises a controller configured to divide the display surface into divided regions arranged in the horizontal direction, depending on the observation distance. The display boundary is periodically located with a first phase in the horizontal direction in a same divided region, and periodically located with a second phase different from the first phase in the horizontal direction in an adjacent divided region.

A head up display system according to an embodiment of the present disclosure comprises a display apparatus having a display surface including subpixels arranged in a grid along a horizontal direction and a vertical direction, and configured to display a left-eye image and a right-eye image respectively in first subpixels and second subpixels separated by a display boundary on the display surface from among the subpixels. The head up display system comprises a barrier having a light shielding region that shields the left-eye image and the right-eye image, and a light transmitting region that causes at least part of the left-eye image to reach a left eye of a user and at least part of the right-eye image to reach a right eye of the user. The head up display system comprises a detection apparatus configured to detect an observation distance from the display apparatus to at least one of the left eye and the right eye. The head up display system comprises a controller configured to divide the display surface into divided regions arranged in the horizontal direction, depending on the observation distance. The head up display system comprises an optical member configured to cause image light emitted from the display apparatus to be viewed by the user as a virtual image. The display boundary is periodically located with a first phase in the horizontal direction in a same divided region, and periodically located with a second phase different from the first phase in the horizontal direction in an adjacent divided region.

A mobile object according to an embodiment of the present disclosure comprises a head up display system. The head up display system includes a display apparatus having a display surface including subpixels arranged in a grid along a horizontal direction and a vertical direction, and configured to display a left-eye image and a right-eye image respectively in first subpixels and second subpixels separated by a display boundary on the display surface from among the subpixels. The head up display system includes a barrier having a light shielding region that shields the left-eye image and the right-eye image, and a light transmitting region that causes at least part of the left-eye image to reach a left eye of a user and at least part of the right-eye image to reach a right eye of the user. The head up display system includes a detection apparatus configured to detect an observation distance from the display apparatus to at least one of the left eye and the right eye. The head up display system includes a controller configured to divide the display surface into divided regions arranged in the horizontal direction, depending on the observation distance. The head up display system includes an optical member configured to cause image light emitted from the display apparatus to be viewed by the user as a virtual image. The display boundary is periodically located with a first phase in the horizontal direction in a same divided region, and periodically located with a second phase different from the first phase in the horizontal direction in an adjacent divided region.

A three-dimensional display system according to an embodiment of the present disclosure comprises a display apparatus having subpixels arranged in a grid along a first direction and a second direction orthogonal to the first direction, and configured to display a left-eye image and a right-eye image respectively in first subpixels and second subpixels separated by a display boundary from among the subpixels. The three-dimensional display system comprises a barrier having a light shielding region that shields the left-eye image and the right-eye image, and a light transmitting region that causes at least part of the left-eye image to reach a left eye of a user and at least part of the right-eye image to reach a right eye of the user. The three-dimensional display system comprises a detection apparatus configured to detect positions of the left eye and the right eye. The three-dimensional display system comprises a controller having operation modes between which orientations of both the left-eye image and the right-eye image displayed by the display apparatus are different. The controller is configured to move the display boundary, based on the operation modes and a change in the positions of the left eye and the right eye.

A three-dimensional display system according to an embodiment of the present disclosure comprises a display apparatus having subpixels arranged in a grid along a first direction and a second direction orthogonal to the first direction, and configured to display a left-eye image and a right-eye image respectively in first subpixels and second subpixels separated by a display boundary from among the subpixels. The three-dimensional display system comprises a barrier having a light shielding region that shields the left-eye image and the right-eye image, and a light transmitting region that causes at least part of the left-eye image to reach a left eye of a user and at least part of the right-eye image to reach a right eye of the user. The three-dimensional display system comprises a detection apparatus configured to detect positions of the left eye and the right eye. The three-dimensional display system comprises a controller configured to move the display boundary depending on the positions of the left eye and the right eye. The controller is configured to operate in a first mode of causing the display apparatus to display the left-eye image and the right-eye image so that the first direction of the display apparatus is a lateral direction as seen from the user, or a second mode of causing the display apparatus to display the left-eye image and the right-eye image so that the second direction of the display apparatus is the lateral direction as seen from the user. The barrier is configured to, between the first mode and the second mode, maintain a same structure of the light transmitting region and the light shielding region, and rotate 90 degrees with respect to the display apparatus in a plane along the first direction and the second direction.

A three-dimensional display system according to an embodiment of the present disclosure comprises a display apparatus having subpixels arranged in a grid along a first direction and a second direction orthogonal to the first direction, and configured to display a left-eye image and a right-eye image respectively in first subpixels and second subpixels separated by a display boundary from among the subpixels. The three-dimensional display system comprises a barrier having a light shielding region that shields the left-eye image and the right-eye image, and a light transmitting region that causes at least part of the left-eye image to reach a left eye of a user and at least part of the right-eye image to reach a right eye of the user. The three-dimensional display system comprises a detection apparatus configured to detect positions of the left eye and the right eye. The three-dimensional display system comprises a controller configured to move the display boundary depending on the positions of the left eye and the right eye. The display apparatus has a pixel formed by subpixels arranged along the first direction. The controller is configured to operate in a first mode of causing the display apparatus to display the left-eye image and the right-eye image so that the first direction of the display apparatus is a lateral direction as seen from the user, or a second mode of causing the display apparatus to display the left-eye image and the right-eye image so that the second direction of the display apparatus is the lateral direction as seen from the user. The barrier is configured to maintain a same barrier inclination angle of the light transmitting region and the light shielding region between the first mode and the second mode, set an opening ratio in the second mode to be lower than an opening ratio in the first mode, and rotate 90 degrees with respect to the display apparatus in a plane along the first direction and the second direction between the first mode and the second mode.

A head up display system according to an embodiment of the present disclosure comprises a display apparatus having subpixels arranged in a grid along a first direction and a second direction orthogonal to the first direction, and configured to display a left-eye image and a right-eye image respectively in first subpixels and second subpixels separated by a display boundary from among the subpixels. The head up display system comprises a barrier having a light shielding region that shields the left-eye image and the right-eye image, and a light transmitting region that causes at least part of the left-eye image to reach a left eye of a user and at least part of the right-eye image to reach a right eye of the user. The head up display system comprises a detection apparatus configured to detect positions of the left eye and the right eye. The head up display system comprises a controller having operation modes between which orientations of both the left-eye image and the right-eye image displayed by the display apparatus are different. The head up display system comprises an optical member configured to cause the left-eye image and the right-eye image to be viewed by the user as a virtual image. The controller is configured to move the display boundary, based on the operation modes and a change in the positions of the left eye and the right eye.

A mobile object according to an embodiment of the present disclosure comprises a head up display system. The head up display system includes a display apparatus having subpixels arranged in a grid along a first direction and a second direction orthogonal to the first direction, and configured to display a left-eye image and a right-eye image respectively in first subpixels and second subpixels separated by a display boundary from among the subpixels. The head up display system includes a barrier having a light shielding region that shields the left-eye image and the right-eye image, and a light transmitting region that causes at least part of the left-eye image to reach a left eye of a user and at least part of the right-eye image to reach a right eye of the user. The head up display system includes a detection apparatus configured to detect positions of the left eye and the right eye. The head up display system includes a controller having operation modes between which orientations of both the left-eye image and the right-eye image displayed by the display apparatus are different. The head up display system includes an optical member configured to cause the left-eye image and the right-eye image to be viewed by the user as a virtual image. The controller is configured to move the display boundary, based on the operation modes and a change in the positions of the left eye and the right eye.

Advantageous Effect

It is thus possible to provide a three-dimensional display apparatus, a three-dimensional display system, a head up display, a head up display system, a three-dimensional display apparatus design method, and a mobile object having improved techniques of appropriately displaying a three-dimensional image to enhance convenience.

BRIEF DESCRIPTION OF THE DRAWINGS

In the accompanying drawings:

FIG. 4 is a diagram illustrating pixel arrangement of the display panel;

DETAILED DESCRIPTION

Figure 1:
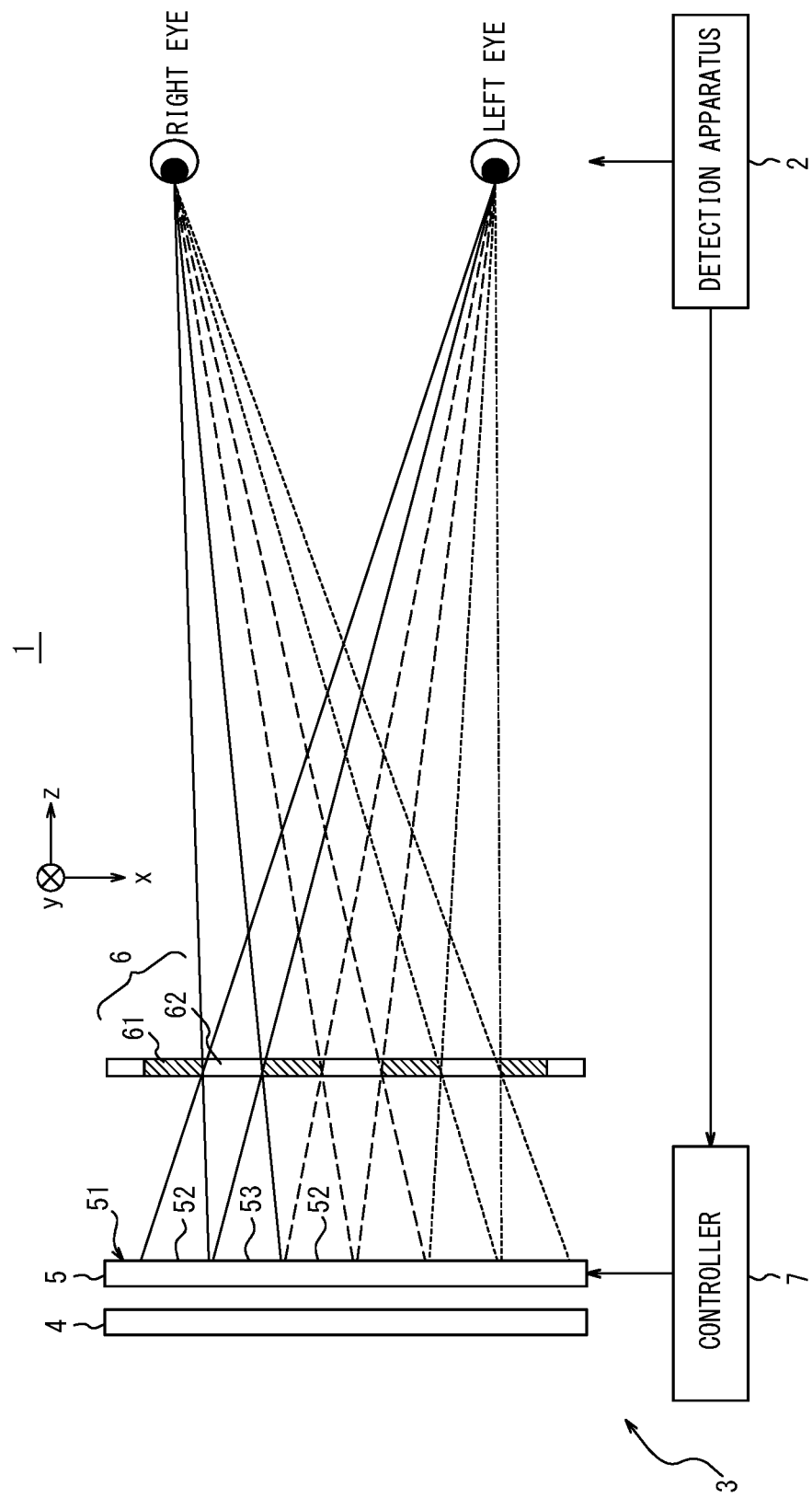
FIG. 1 is a schematic diagram of a three-dimensional display apparatus according to an embodiment.

Embodiments of the present disclosure will be described below, with reference to the drawings. The drawings referred to in the following description are schematic, and the dimensional ratios and the like in the drawings do not necessarily correspond to the actual dimensional ratios and the like.

Embodiment 1

A three-dimensional display apparatus has a optimum viewing distance, i.e. a distance optimum for observing a three-dimensional image. Preferably, the optimum viewing distance is allowed to be set appropriately depending on the use environment of the three-dimensional display apparatus. A three-dimensional display system 1 according to one of embodiments of the present disclosure has a high degree of freedom in setting the optimum viewing distance.

The three-dimensional display system 1 according to one of embodiments of the present disclosure includes a detection apparatus 2 and a three-dimensional display apparatus 3, as illustrated in FIG. 1. FIG. 1 illustrates the three-dimensional display system 1 as seen from above the user.

The detection apparatus 2 detects the position of any of the left and right eyes of the user, and outputs the detected position to a controller 7. The detection apparatus 2 may include, for example, a camera. The detection apparatus 2 may capture an image of the face of the user by the camera. The detection apparatus 2 may detect the position of at least one of the left and right eyes from the image captured by the camera. The detection apparatus 2 may detect the position of at least one of the left and right eyes as coordinates in a three-dimensional space, from an image captured by one camera. The detection apparatus 2 may detect the position of at least one of the left and right eyes as coordinates in a three-dimensional space, from images captured by two or more cameras.

The detection apparatus 2 may be connected to an external camera, instead of including a camera. The detection apparatus 2 may include an input terminal to which a signal from the external camera is input. The external camera may be directly connected to the input terminal. The external camera may be indirectly connected to the input terminal via a shared network. The detection apparatus 2 not including a camera may include an input terminal to which a video signal from a camera is input. The detection apparatus 2 not including a camera may detect the position of at least one of the left and right eyes from the video signal input to the input terminal.

The detection apparatus 2 may include, for example, a sensor. The sensor may be an ultrasonic sensor, an optical sensor, or the like. The detection apparatus 2 may detect the position of the head of the user by the sensor, and detect the position of at least one of the left and right eyes based on the position of the head. The detection apparatus 2 may detect the position of at least one of the left and right eyes as coordinates in a three-dimensional space by one or more sensors.

The detection apparatus 2 may detect the moving distance of the left and right eyes along the eyeball arrangement direction, based on the detection result of the position of at least one of the left and right eyes.

The three-dimensional display system 1 may not include the detection apparatus 2. In the case where the three-dimensional display system 1 does not include the detection apparatus 2, the controller 7 may include an input terminal to which a signal from an external detection apparatus is input. The external detection apparatus may be connected to the input terminal. The external detection apparatus may use an electrical signal and an optical signal as transmission signals to the input terminal. The external detection apparatus may be indirectly connected to the input terminal via a shared network. The controller 7 may receive position coordinates indicating the position of at least one of the left and right eyes acquired from the external detection apparatus. The controller 7 may calculate the moving distance of the left and right eyes along the horizontal direction, based on the position coordinates.

In the case where the relative positional relationship between a display panel 5 of the three-dimensional display apparatus 3 and the eyes of the user is fixed, the detection apparatus 2 is unnecessary. The controller 7 can cause the display panel 5 to display an image based on a preset eye position.

The three-dimensional display apparatus 3 includes an irradiation unit 4, the display panel 5 as a display device, a parallax barrier 6 as an optical element, and the controller 7.

The irradiation unit 4 is located on the side of one surface of the display panel 5, and irradiates the display panel 5 in a planar manner. The irradiation unit 4 may include a light source, a light guide, a diffuser, a diffusion sheet, and the like. The irradiation unit 4 emits irradiation light by the light source, and homogenizes the irradiation light in the surface direction of the display panel 5 by the light guide, the diffuser, the diffusion sheet, or the like. The irradiation unit 4 emits the homogenized light toward the display panel 5.

Figure 2:
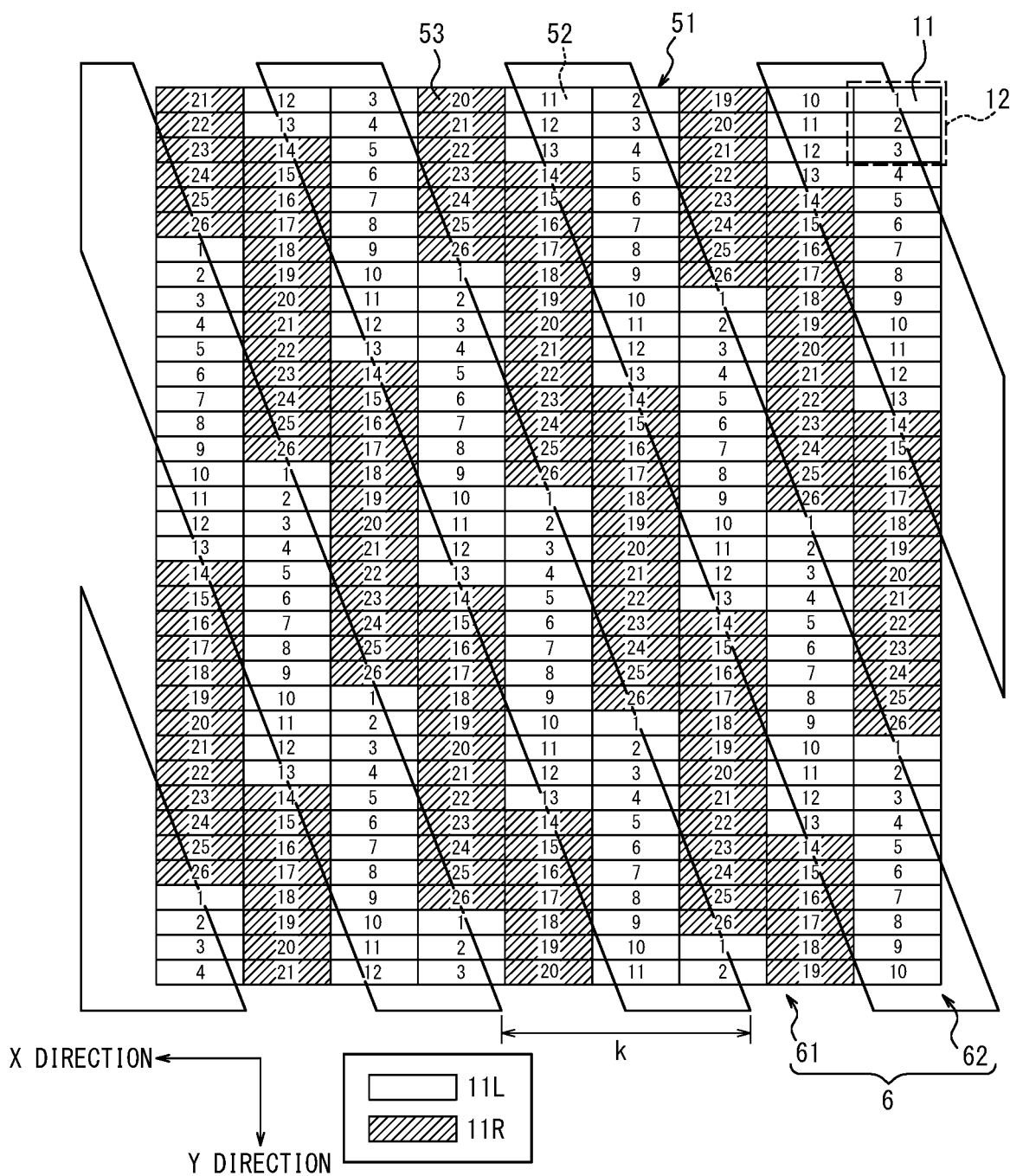
FIG. 2 is a diagram of a display panel in FIG. 1 as seen from the eyes of the user.

As the display panel 5, a display panel such as a transmissive liquid crystal display panel may be used. The display panel 5 has a display surface 51 including division regions divided in a first direction (x direction) and a second direction (y direction) approximately orthogonal to the first direction, as illustrated in FIG. 2. The first direction (x direction) corresponds to a direction in which the parallax is provided to the eyes of the user. In the three-dimensional display apparatus 3 of a type in which the user directly views the display panel 5 in a typical sitting or standing position, the first direction is the horizontal direction and the second direction is the vertical direction. Hereafter, the first direction is referred to as "x direction", and the second direction is referred to as "y direction". In the drawings illustrating the display panel 5, the x direction is indicated as the direction from right to left, and the y direction is indicated as the direction from top to bottom. A direction orthogonal to the x direction and the y direction and toward the eyes of the user is referred to as "z direction".

Each of the division regions corresponds to one subpixel 11. The subpixels 11 are arranged in a grid in the x direction and the y direction. In this embodiment, each subpixel 11 is longer in the x direction than in the y direction. Each subpixel 11 corresponds to any of the colors of R (Red), G (Green), and B (Blue). Three subpixels 11 of R, G, and B as a set can constitute one pixel 12. One pixel 12 can be referred to as a single pixel. The y direction is, for example, the direction in which subpixels 11 constituting one pixel 12 are arranged. The arrangement of the subpixels 11 in the y direction is called "column". The x direction is, for example, the direction in which subpixels 11 of the same color are arranged. The arrangement of the subpixels 11 in the x direction is called "row".

The display panel 5 is not limited to a transmissive liquid crystal panel, and may be any other display panel such as an organic EL. In the case where a light-emitting display panel is used as the display panel 5, the irradiation unit 4 is unnecessary.

Figure 3:
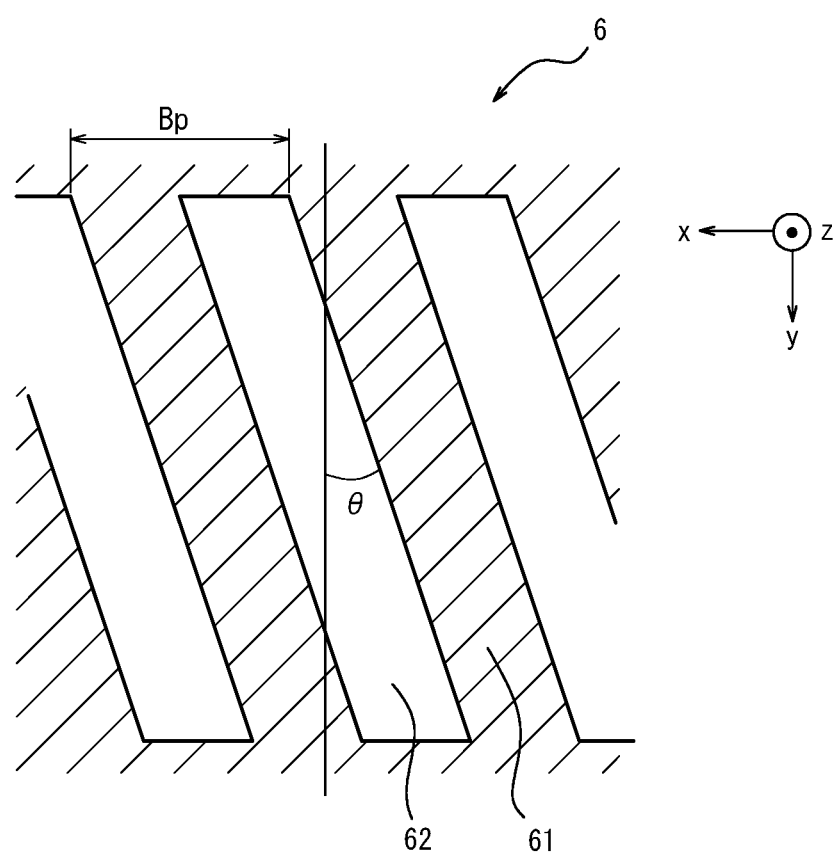
FIG. 3 is a diagram illustrating an example of the structure of a parallax barrier.

The parallax barrier 6 defines the light ray direction of image light emitted from the subpixels 11. For example, the parallax barrier 6 includes light shielding regions 61 and light transmitting regions 62 arranged in a slit shape extending in a certain direction, as illustrated in FIG. 3. The parallax barrier 6 determines the visible range of image light emitted from the subpixels 11 for each of the left and right eyes. The parallax barrier 6 may be located on the side of the display panel 5 opposite to the irradiation unit 4, as illustrated in FIG. 1. The parallax barrier 6 may be located on the same side of the display panel 5 as the irradiation unit 4.

The light transmitting regions 62 are parts that transmit light incident on the parallax barrier 6. The light transmitting regions 62 may transmit light at transmittance of a first certain value or more. For example, the first certain value may be 100%, or a value less than 100%. The light shielding regions 61 are parts that shield light incident on the parallax barrier 6 so as not to pass through. In other words, the light shielding regions 61 prevent an image displayed on the display panel 5 from reaching the eyes of the user. The light shielding region 61 may shield light at transmittance of a second certain value or less. For example, the second certain value may be 0%, or a value greater than and close to 0%. The first certain value may be several times or more, for example, 10 times or more, greater than the second certain value.

In FIG. 3, the light transmitting regions 62 and the light shielding regions 61 alternate with each other. The lines indicating the edges of the light transmitting regions 62 extend in a direction inclined from the y direction by a certain angle θ. The lines indicating the edges of the light transmitting regions 62 can also be regarded as the edges of the light transmitting regions 62. The certain angle θ is also referred to as "barrier inclination angle". θ may be an angle greater than 0 degrees and less than 90 degrees. If the edge of the light transmitting region 62 extends in the y direction in FIG. 3 and coincides with the arrangement direction of the subpixels 11, moire tends to be recognized in the display image due to errors contained in the arrangement of the subpixels 11 and the dimensions of the light transmitting regions 62. If the edge of the light transmitting region 62 extends in the direction having the certain angle with respect to the y direction in FIG. 3, moire is hardly recognized in the display image regardless errors contained in the arrangement of the subpixels 11 and the dimensions of the light transmitting regions 62.

The parallax barrier 6 may be composed of a film or a plate member having transmittance of less than the second certain value. In this case, the light shielding regions 61 are formed by the film or plate member, and the light transmitting regions 62 are formed by openings in the film or plate member. The film may be made of resin, or made of other material. The plate member may be made of resin, metal, or the like, or made of other material. The parallax barrier 6 is not limited to a film or a plate member, and may be composed of any other type of member. The parallax barrier 6 may be composed of a light shielding substrate. The parallax barrier 6 may be composed of a substrate containing a light shielding additive.

The parallax barrier 6 may be composed of a liquid crystal shutter. The liquid crystal shutter can control the transmittance of light according to an applied voltage. The liquid crystal shutter may be made up of pixels, and control the transmittance of light in each pixel. The liquid crystal shutter may form a region with high transmittance of light or a region with low transmittance of light, in any shape. In the case where the parallax barrier 6 is composed of a liquid crystal shutter, the light transmitting regions 62 may be regions having transmittance of the first certain value or more. In the case where the parallax barrier 6 is composed of a liquid crystal shutter, the light shielding regions 61 may be regions having transmittance of the second certain value or less.

In FIG. 2, the outline of the parallax barrier 6 as seen from the eyes of the user is indicated on the display surface 51. Image light that has passed through the light transmitting regions 62 of the parallax barrier 6 in FIG. 2 reaches the eyes of the user. Left-eye visible regions 52 on the display surface 51 as strip regions corresponding to the light transmitting regions 62 are visible to the left eye of the user. Image light corresponding to the light shielding regions 61 of the parallax barrier 6 is shielded before reaching the eyes of the user. The light shielding regions 61 of the parallax barrier 6 shield part of image light. Left-eye light shielding regions 53 on the display surface 51 corresponding to the light shielding regions 61 are hardly visible to the left eye of the user. In FIG. 2, the display surface 51 located behind the light shielding regions 61 of the parallax barrier 6 is shown for illustrative purposes.

As can be understood from FIG. 1, when an image is viewed from the right eye of the user in the three-dimensional display system 1 of an ideal configuration, the left-eye light shielding regions 53 on the display surface 51 corresponding to the light transmitting regions 62 are at least partially visible to the user. As a result of image light being shielded by the light shielding regions 61 of the parallax barrier 6, the left-eye visible regions 52 on the display surface 51 corresponding to the light shielding regions 61 are at least partially not visible to the right eye of the user. The left-eye light shielding regions 53 include right-eye visible regions visible to the right eye. The left-eye light shielding regions 53 may approximately match the right-eye visible regions visible to the right eye. The left-eye visible regions 52 are included in right-eye light shielding regions not visible to the right eye. The left-eye visible regions 52 may approximately match the right-eye light shielding regions.

By displaying images having parallax in the left-eye visible regions 52 visible to the left eye and the right-eye visible regions (included in the left-eye light shielding regions 53) visible to the right eye, it is possible to display an image that can be recognized as three-dimensional to the user's view. Hereafter, an image to be project onto the left eye is referred to as "left-eye image", and an image to be project onto the right eye as "right-eye image". As described above, the parallax barrier 6 selectively transmits at least part of the left-eye image displayed in the left-eye visible regions 52 in the direction of the optical path toward the left eye of the user. The parallax barrier 6 also selectively transmits at least part of the right-eye image displayed in the left-eye light shielding regions 53 in the direction of the optical path toward the right eye of the user.

The controller 7 is connected to each component in the three-dimensional display system 1, and controls each component. The controller 7 is implemented, for example, as a processor. The controller 7 may include one or more processors. The processors may include a general-purpose processor that performs a specific function by reading a specific program, and a dedicated processor dedicated to a specific process. The dedicated processor may include an application specific integrated circuit (ASIC). Each processor may include a programmable logic device (PLD). The PLD may include a field-programmable gate array (FPGA). The controller 7 may be any of a system on a chip (SoC) or a system in a package (SiP) in which one or more processors cooperate with each other. The controller 7 may include memory, and store various information, programs for operating each component in the three-dimensional display system 1, and the like in the memory. The memory may be, for example, semiconductor memory. The memory may function as work memory of the controller 7.

The controller 7 determines first subpixels 11L for displaying a left-eye image and second subpixels 11R for displaying a right-eye image from among the subpixels 11, depending on the positions of the left and right eyes of the user and the structures of the display panel 5 and the parallax barrier 6. The parallax barrier 6 causes the first subpixels 11L to be visible to the left eye of the user. The parallax barrier 6 causes the second subpixels 11R to be visible to the right eye of the user. A method of arranging the first subpixels 11L and the second subpixels 11R will be described below, with reference to FIG. 2.

FIG. 2 illustrates an example in which the light shielding regions 61 and the light transmitting regions 62 of the parallax barrier 6 are equal in width in the x direction. That is, the barrier opening ratio of the three-dimensional display apparatus 3 is 50%. In this case, the left-eye light shielding regions 53 can approximately match the right-eye visible regions. The barrier opening ratio of the three-dimensional display apparatus 3 is, however, not limited to 50%. To reduce crosstalk, the width of the light shielding regions 61 in the x direction may be greater than the width of the light transmitting regions 62 in the x direction. Crosstalk is a phenomenon whereby part of a left-eye image is incident on the right eye of the user and/or part of a right-eye image is incident on the left eye of the user. In the case where the width of the light shielding regions 61 in the x direction is greater than the width of the light transmitting regions 62 in the x direction, the barrier opening ratio is less than 50%.

In FIG. 2, numbers 1 to 26 are assigned to the subpixels 11 for illustrative purposes. Subpixels 11 of numbers 1 to 13 in FIG. 2 each have at least half area belonging to the left-eye visible regions 52, and therefore are set as first subpixels 11L for displaying the left-eye image. Subpixels 11 of numbers 14 to 26 in FIG. 2 each have at least half area belonging to the left-eye light shielding regions 53, and therefore are set as second subpixels 11R for displaying the right-eye image. Since the barrier opening ratio is 50% in FIG. 2, the half area is used as a threshold in this example, but the determination method is not limited to such. In the case where one subpixel 11 has a wider left-eye visible region 52 than a right-eye visible region, the subpixel can be regarded as a left-eye visible region 52. In the case where one subpixel 11 has a wider right-eye visible region than a left-eye visible region 52, the subpixel can be regarded as a right-eye visible region.

The first subpixels 11L and the second subpixels 11R can be arranged according to the following rule.

First, a subpixel 11 in the column on the most negative side in the x direction is assigned number 1. In FIG. 2, the top rightmost subpixel 11 is assigned number 1. For example, the subpixel 11 assigned number 1 is a subpixel 11 on the most negative side (the top end in FIG. 2) in the y direction of the arrangement of successive first subpixels 11L in which the left-eye image is to be displayed, at a reference position. The reference position denotes a state in which the display panel 5, the parallax barrier 6, and the eyes of the user are at a reference position. The reference position can correspond to the positional relationships among the display panel 5, the parallax barrier 6, and the user when the eyes of the user view the center of the display panel 5 and the parallax barrier 6 from the front.

In the column assigned number 1, numbers 1 to 2r (r is a positive integer) are assigned to the respective subpixels 11 in ascending order in the y direction. Herein, r is a first certain number. The first certain number r can be regarded as the number of subpixels 11 allocated to one eye. After the number reaches 2r, numbering returns to 1. Thus, numbers 1 to 2r are repeatedly assigned to subpixels 11 in the same column. In the example in FIG. 2, r is 13.

A number obtained by adding t (t is a positive integer less than or equal to r) to the number of each subpixel 11 in the column to which the numbers have been assigned is assigned to an adjacent subpixel 11 in a column adjacent in the x direction (the left in FIG. 2). Herein, t is a second certain number. The second certain number t can be regarded as the number of subpixels 11 through which the boundary between the left-eye visible region 52 and the left-eye light shielding region 53 passes in the y direction while advancing in the x direction by one pixel. In the case where the number obtained by adding the second certain number t is more than 2r, a number obtained by subtracting 2r from the number obtained by adding the second certain number t is assigned to the adjacent subpixel 11. This operation is repeated for adjacent columns in sequence. In the example in FIG. 2, the second certain number t is 9.

When the eyes of the user are at the reference position with respect to the display panel 5 and the parallax barrier 6, of the subpixels 11 assigned numbers as described above, subpixels 11 of numbers 1 to r are the first subpixels 11L for displaying the left-eye image, and subpixels 11 of numbers r+1 to 2r are the second subpixels 11R for displaying the right-eye image.

When the length of the subpixel 11 of a pixel in the y direction is denoted as "vertical pitch Vp" and the length of the subpixel 11 in the x direction is denoted as "horizontal pitch Hp", the second certain number t and the barrier inclination angle θ satisfy Formula (1-1):

$$\tan \theta = Hp/tVp \qquad \text{Formula (1-1)}.$$

The horizontal pitch Hp of the subpixel 11 is also referred to as "pixel pitch".

The arrangement interval of the left-eye visible region 52 and the left-eye light shielding region 53 in the horizontal direction is referred to as "image pitch k". The image pitch k is equal to the width of the region combining adjacent left-eye visible region 52 and left-eye light shielding region 53 in the x direction. That is, the image pitch k is the pitch in the x direction with which the left-eye image and the right-eye image are displayed. The image pitch k is the pitch in the x direction of the light shielding region 61 and the light transmitting region 62 on the display surface 51 as viewed by the user.

As illustrated in FIG. 4, the first subpixels 11L corresponding to numbers 1 to 13 and the second subpixels 11R corresponding to numbers 14 to 26 are separated by imaginary display boundaries 15 passing along the boundaries between the first subpixels 11L and the second subpixels 11R. The display boundaries 15 are indicated by thick lines in FIG. 4. The display boundaries 15 have a stepped shape with periodic steps.

Figure 5:
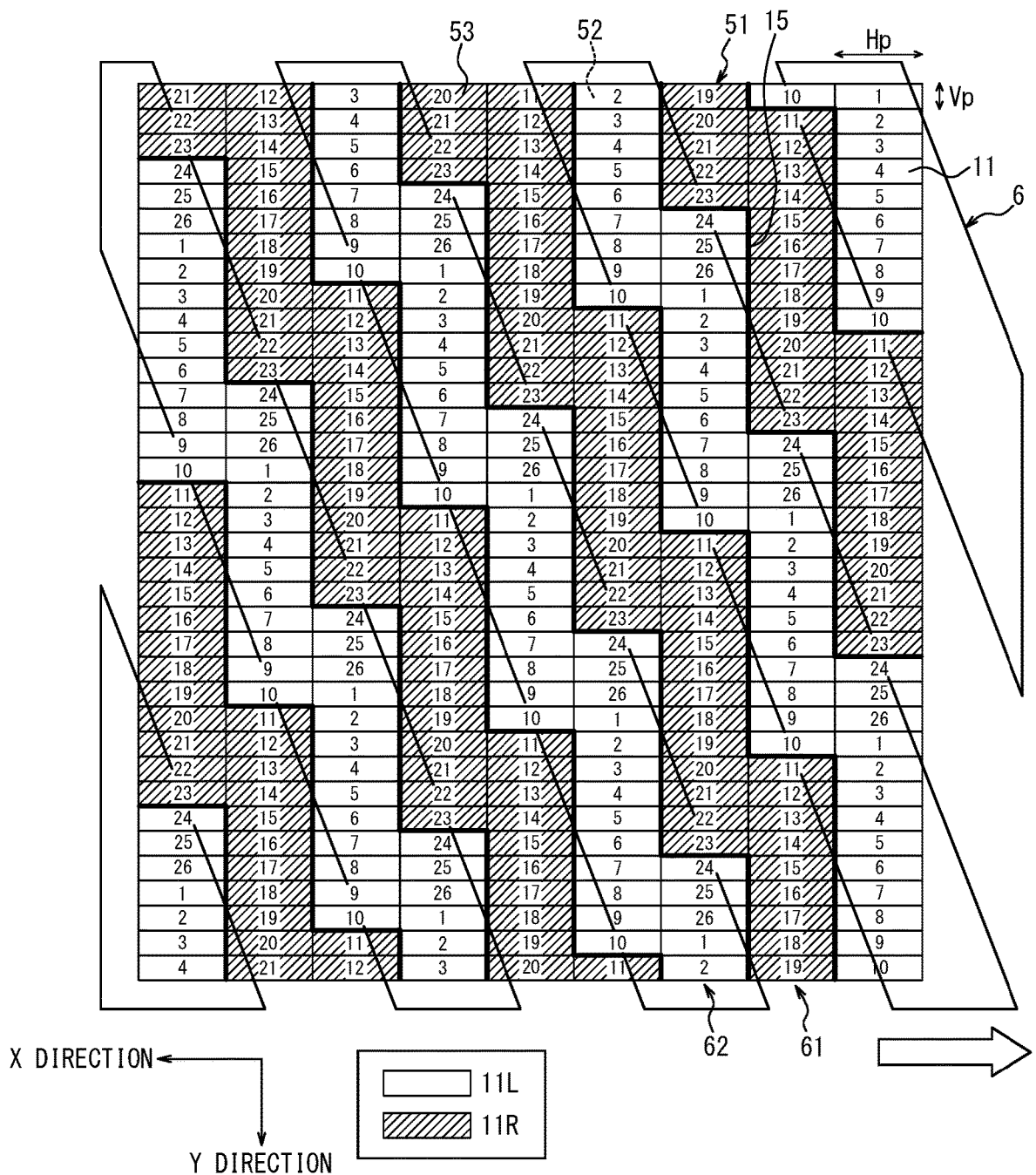
FIG. 5 is a diagram illustrating a display change of subpixels when the positions of the eyes of the user change with respect to the display panel in FIG. 2.

The controller 7 can move the display boundaries 15 based on the positions of the eyes of the user detected by the detection apparatus 2. FIG. 5 illustrates the position of the display boundaries 15 in the case where the position of the parallax barrier 6 as seen from the eyes of the user is relatively displaced from the position in FIG. 2 to the negative side (arrow direction) in the x direction. Such movement can be made in the case where the eyes of the user move relatively to the left. In FIG. 5, the same subpixels 11 as in FIGS. 2 and 4 are given the same numbers. As illustrated in FIG. 5, when the positions of the eyes of the user change, the controller 7 displaces the display boundaries 15 to replace part of the first subpixels 11L and part of the second subpixels 11R with each other. For example, in FIG. 5, the first subpixels 11L of numbers 11 to 13 for displaying the left-eye image in FIGS. 2 and 4 have changed to the second subpixels 11R for displaying the right-eye image. Moreover, the second subpixels 11R of numbers 24 to 26 for displaying the right-eye image in FIGS. 2 and 4 have changed to the first subpixels 11L for displaying the left-eye image. The display boundaries 15 as a whole are displaced to the negative side (upward direction in FIG. 5) in the y direction by 3 times the vertical pitch Vp. The number of first subpixels 11L and second subpixels 11R replaced by the controller 7 differs depending on the displacement amount of the positions of the eyes of the user.

As illustrated in FIG. 4, the first certain number r of first subpixels 11L and the first certain number r of second subpixels 11R are successively arranged in each column. Between two adjacent columns, the regions in which the first subpixels 11L and the second subpixels 11R are arranged are displaced by the second certain number t of subpixels 11 in the y direction. The first certain number r may be greater than the second certain number t and may not be a multiple of the second certain number t. In the case where the first certain number r is not a multiple of the second certain number t, the display boundary 15 of the same shape is periodically repeated in an oblique direction inclined with respect to both the y direction and the x direction, as indicated by the arrows in FIG. 4. In the below-described comparative example in FIG. 7, on the other hand, the display boundary 15 of the same shape is periodically repeated in the x direction.

Figure 6:
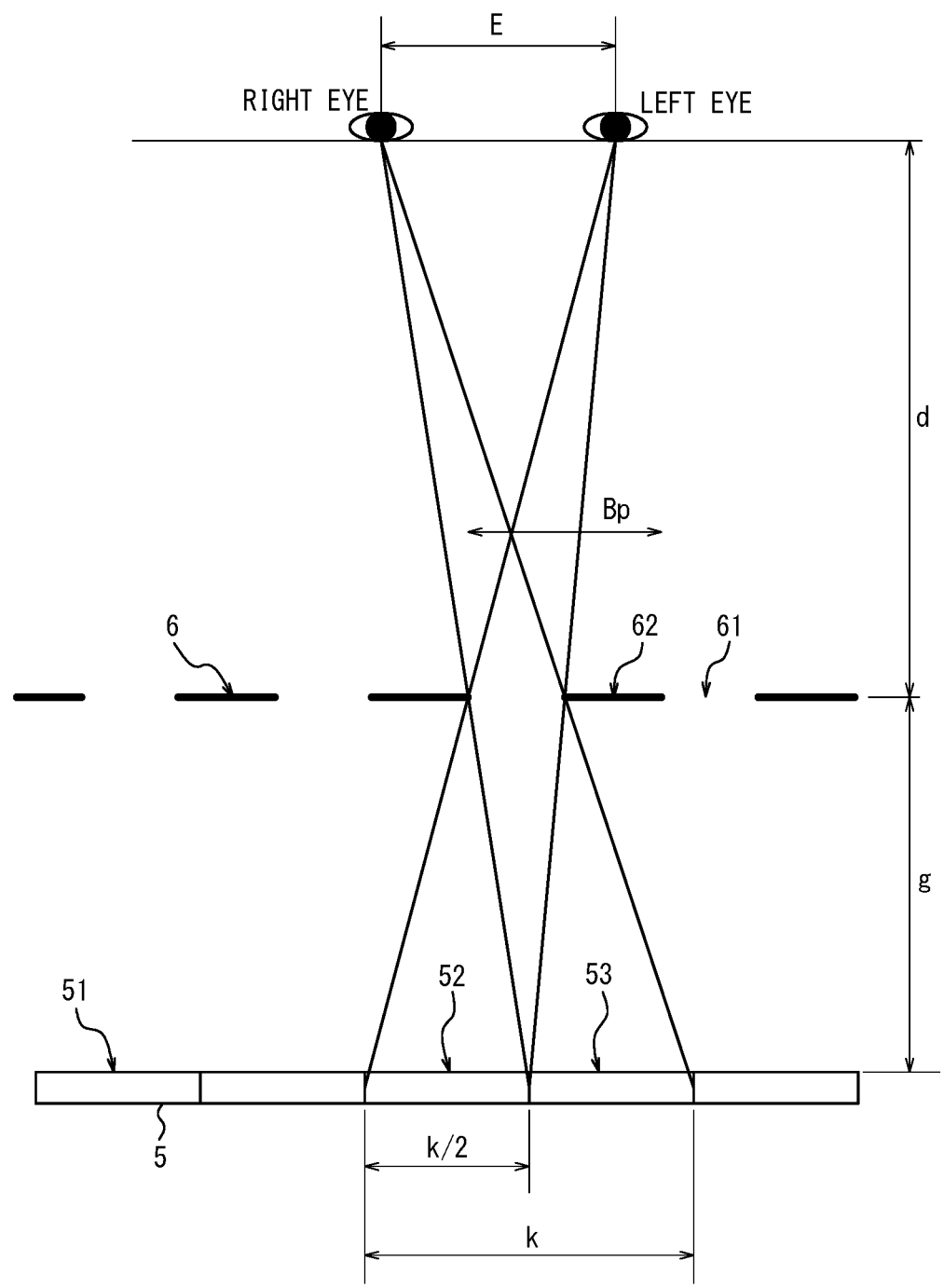
FIG. 6 is a schematic diagram illustrating the relationships among the interocular distance, the optimum viewing distance, the gap, the barrier pitch, and the image pitch.

The advantage of setting the first certain number r and the second certain number t as described above is a high degree of freedom in setting the optimum viewing distance (optimum viewing distance (OVD)). The optimum viewing distance of the three-dimensional display apparatus 3 will be described below, with reference to FIG. 6. The barrier pitch Bp, the gap g, the optimum viewing distance d, the user's interocular distance E, and the image pitch k satisfy the following Formulas (1-2) and (1-3):

$$E:d=k/2:g \qquad \text{Formula (1-2)}$$

$$d:Bp=(d+g):k \qquad \text{Formula (1-3),}$$

where the barrier pitch Bp is the pitch of the light transmitting region 62 of the parallax barrier 6 in the x direction, and the gap g is the spacing between the display surface 51 and the parallax barrier 6. The gap g corresponds to a certain distance. From Formulas (1-2) and (1-3), it is preferable that the image pitch k can be set finely, in order to set the optimum viewing distance d finely.

The capability of the three-dimensional display apparatus 3 and the three-dimensional display system 1 according to the present disclosure to finely set the image pitch k as compared with a comparative example will be described below, with reference to FIGS. 7 to 9.

Figure 7:
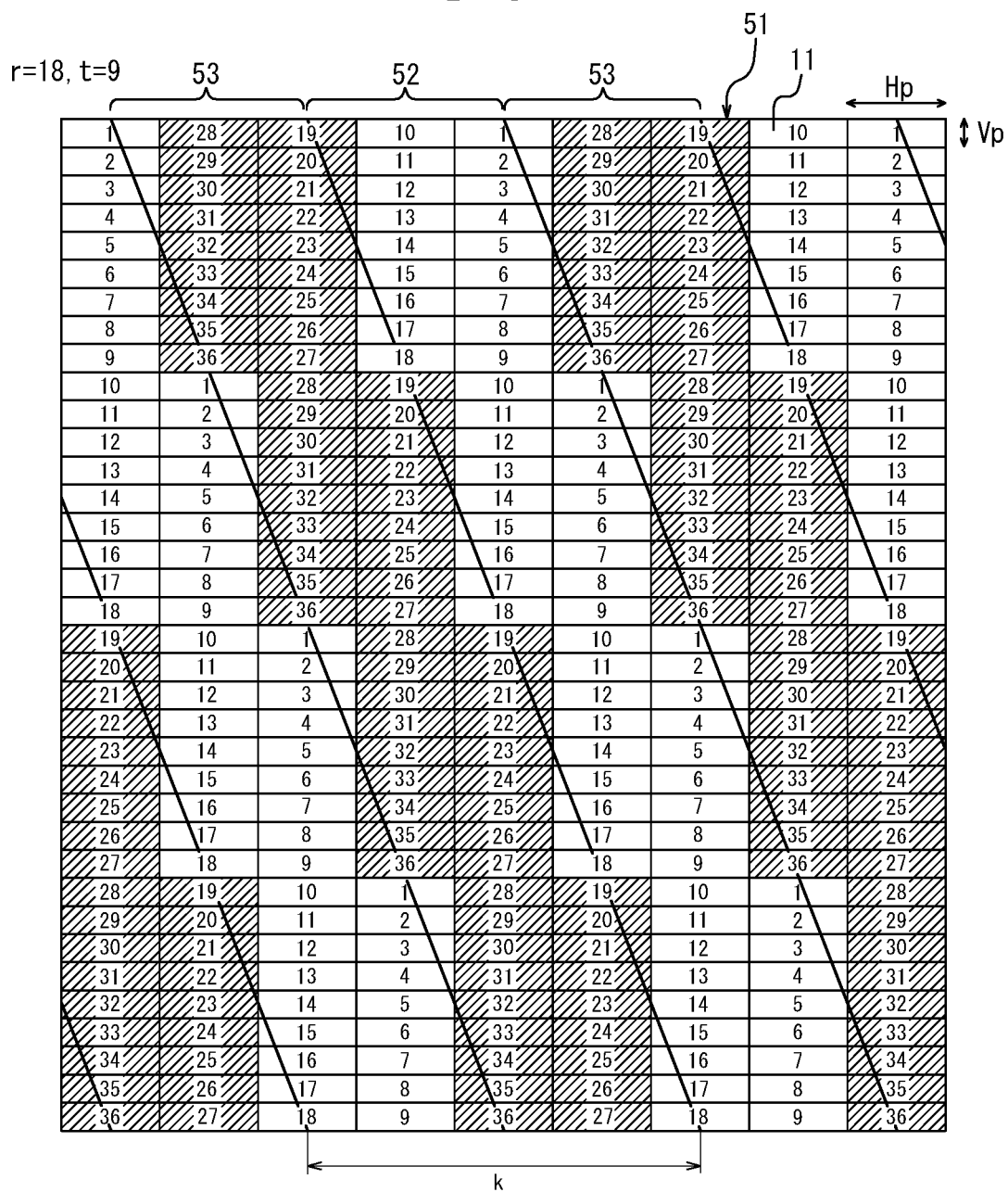
FIG. 7 is a diagram illustrating a comparative example of subpixel arrangement on a display surface.

FIG. 7 is a diagram illustrating an arrangement of the first subpixels 11L and the second subpixels 11R on the display surface 51 of a three-dimensional display apparatus according to a comparative example. In FIG. 7, the boundary lines between the left-eye visible regions 52 and the left-eye light shielding regions 53 are indicated by straight lines extending in an oblique direction. In the arrangement of the subpixels 11 in FIG. 7, the first certain number r=18, and the second certain number t=9. Numbers 1 to 18 are assigned to the first subpixels 11L, and numbers 19 to 36 are assigned to the second subpixels 11R. As illustrated in FIG. 7, when the arrangement of the first subpixels 11L and the second subpixels 11R is determined so that r=2t, the value of the image pitch k is limited to 4 times the horizontal pitch Hp of the subpixel 11.

In the case of providing a display panel 5 having subpixels 11, an easiest structure is to set the image pitch k to an integral multiple of the horizontal pitch Hp of the subpixel 11 as illustrated in FIG. 7. With this structure, two first subpixels 11L and two second subpixels 11R constantly alternate regularly in the x direction. In a three-dimensional display apparatus having a parallax barrier 6 extending in a diagonal direction of subpixels in PTL 1, too, the image pitch k is an integral multiple of the horizontal pitch Hp. Moreover, displacing the display boundaries 15 in the horizontal direction to provide parallax in the x direction helps intuitive understanding of the user.

However, as a result of extensive examination, the inventors discovered that the method according to the present disclosure enables arrangement of the first subpixels 11L for the left eye and the second subpixels 11R for the right eye without limiting the image pitch k to an integral multiple of the horizontal pitch Hp. Thus, the image pitch k can be set more finely than in the case where the image pitch k is set on a horizontal pitch Hp basis. The image pitch k is determined by the following formula:

$$k=Hp \times 2r/t \qquad \text{Formula (1-4).}$$

That is, the image pitch k is approximately equal to a value obtained by multiplying, by the horizontal pitch Hp which is the pitch of the subpixel 11 in the first direction, the quotient obtained by dividing twice the first certain number r by the second certain number t. Once the image pitch k has been determined, the barrier pitch Bp can be determined based on the image pitch k, the optimum viewing distance d, and the gap g. The arrangement of the subpixels 11 in FIG. 2 is based on this idea. FIGS. 8 and 9 illustrate other examples of arrangement of the subpixels 11 on the display surface 51 according to an embodiment of the present disclosure.

Figure 8:
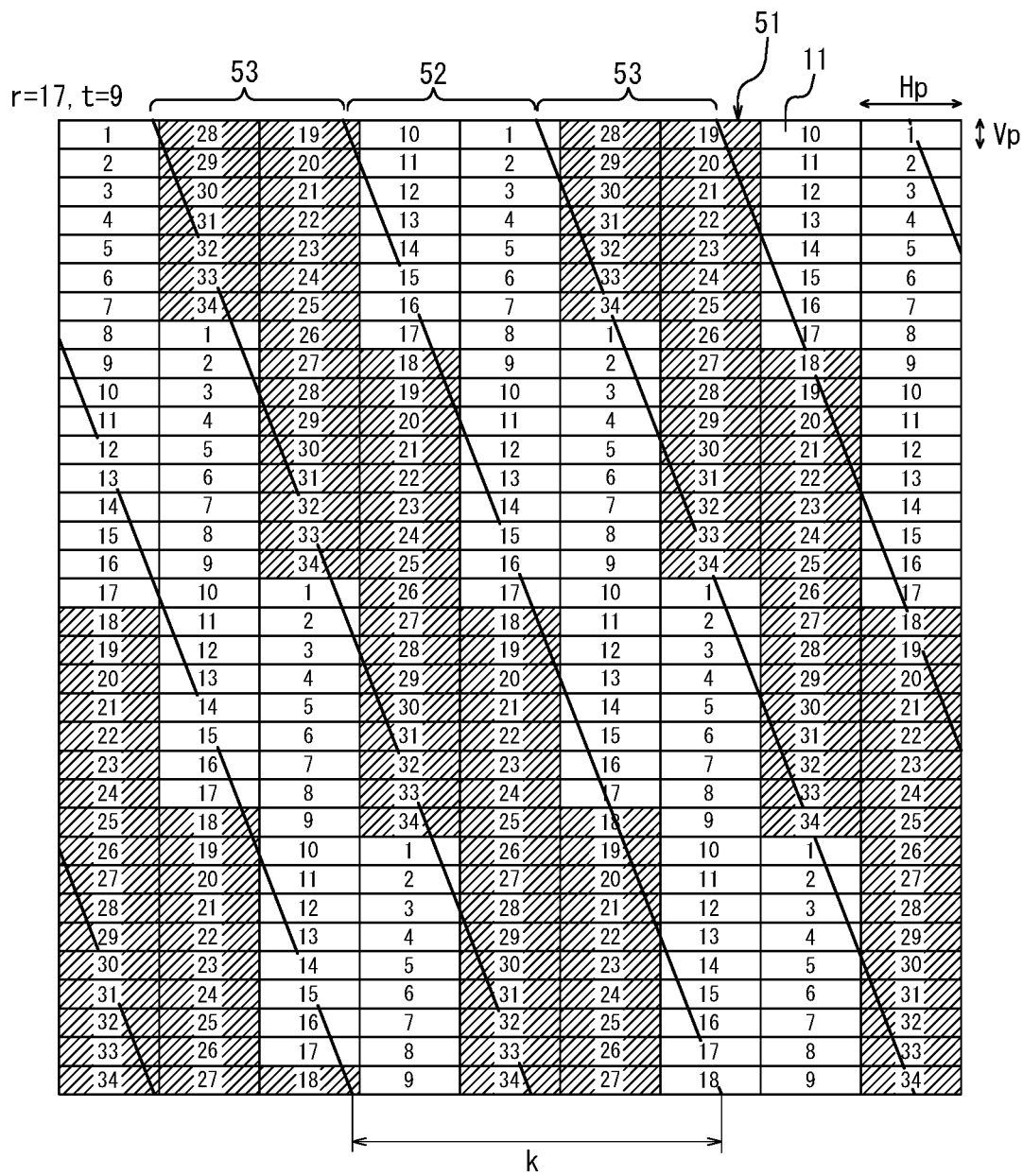
FIG. 8 is a diagram illustrating a first example of another subpixel arrangement on the display surface.

FIG. 8 illustrates arrangement of the subpixels 11 on the display surface 51 designed with the first certain number r=17 and the second certain number t=9. The first certain number r is greater than the second certain number t and is not an integral multiple of the second certain number t. With this arrangement of the subpixels 11, the image pitch k is 34/9 (about 3.78) times the horizontal pitch Hp.

Figure 9:
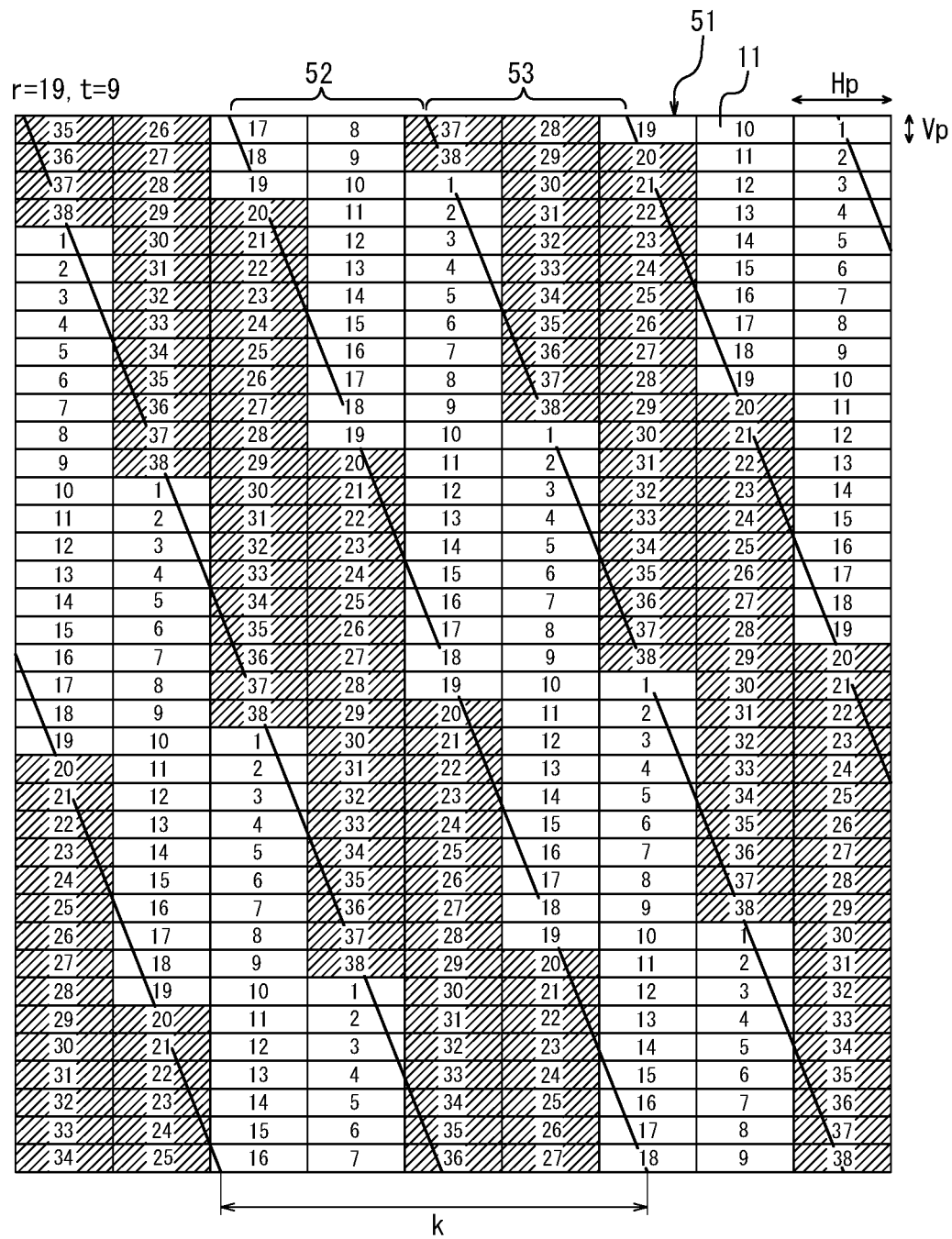
FIG. 9 is a diagram illustrating a second example of another subpixel arrangement on the display surface.

FIG. 9 illustrates arrangement of the subpixels 11 on the display surface 51 designed with the first certain number r=19 and the second certain number t=9. The first certain number r is greater than the second certain number t and is not an integral multiple of the second certain number t. With this arrangement of the subpixels 11, the image pitch k is 38/9 (about 4.22) times the horizontal pitch Hp.

In FIGS. 8 and 9, the image pitch k is a non-integral multiple of the horizontal pitch Hp. By setting the first certain number r and the second certain number t as appropriate in this way, the image pitch k can be set more finely. Thus, the three-dimensional display apparatus 3 according to the present disclosure can set the optimum viewing distance with a higher degree of freedom.

In the foregoing embodiment, the horizontal pitch Hp of the subpixel 11 in the x direction which is the parallax direction is longer than the vertical pitch Vp of the subpixel 11. In the case where the subpixels 11 are arranged in this way, if the image pitch k is limited to an integral multiple of the horizontal pitch Hp, the degree of freedom in setting the optimum viewing distance is particularly low as compared with the case where the horizontal pitch Hp of the subpixel 11 is shorter than the vertical pitch Vp of the subpixel 11, which imposes design constraints. The three-dimensional display system 1 according to the present disclosure can reduce constraints in setting the optimum viewing distance in the case where the subpixels 11 are longer in the parallax direction, and therefore is particularly effective.

Figure 10:
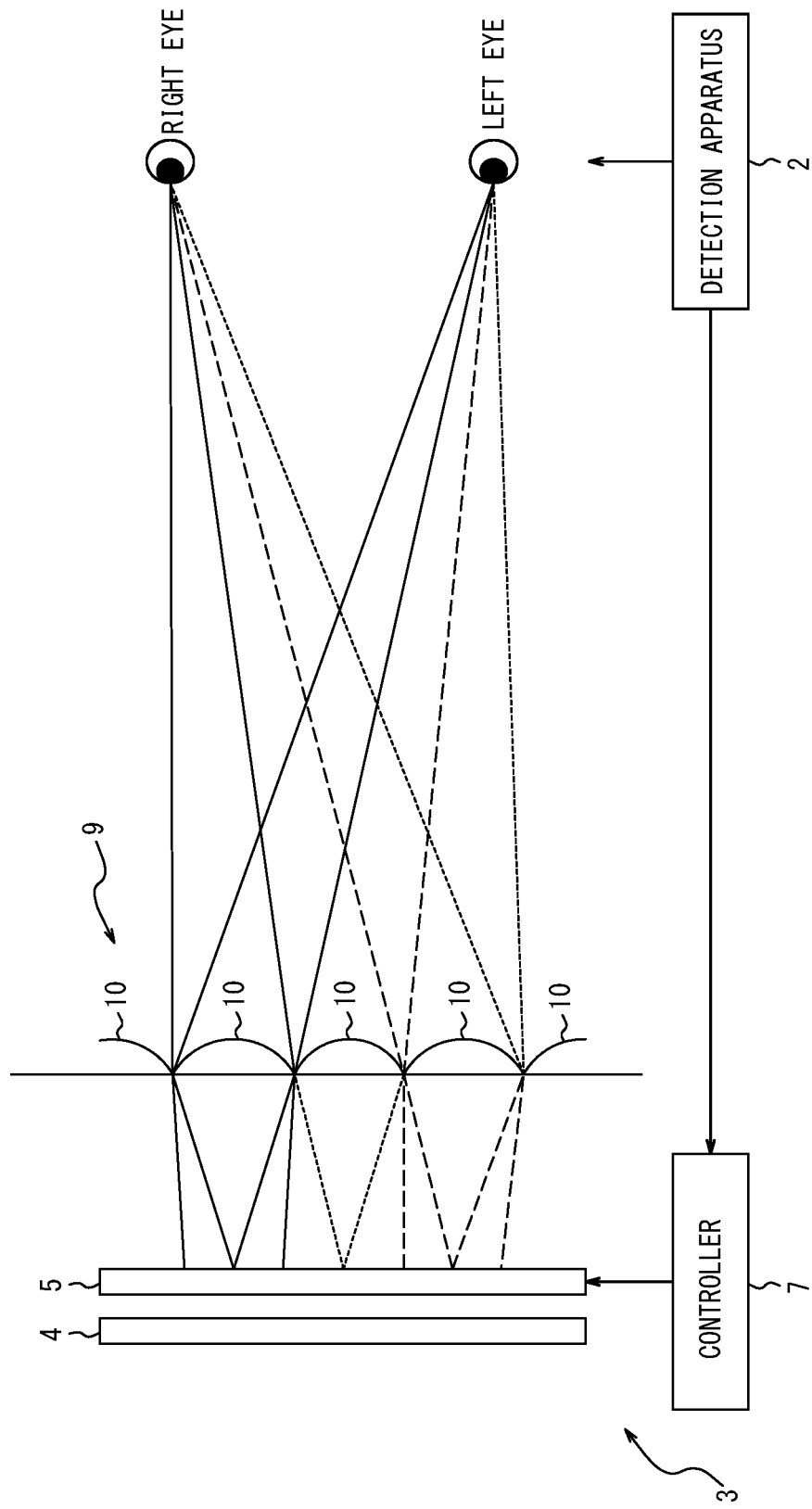
FIG. 10 is a schematic diagram of a three-dimensional display apparatus in the case where an optical element is a lenticular lens.

FIG. 10 illustrates a three-dimensional display system according to one of embodiments. In the foregoing embodiment, the three-dimensional display apparatus 3 includes the parallax barrier 6 as an optical element. The three-dimensional display apparatus 3 may include a lenticular lens 9 as an optical element, instead of the parallax barrier 6. In this case, the lenticular lens 9 may be formed by arranging cylindrical lenses 10 extending in an oblique direction with respect to the horizontal direction and the y direction. In the case where the lenticular lens 9 is used as an optical element, the same advantageous effects as in the case where the parallax barrier 6 is used as an optical element can be achieved.

Figure 11:
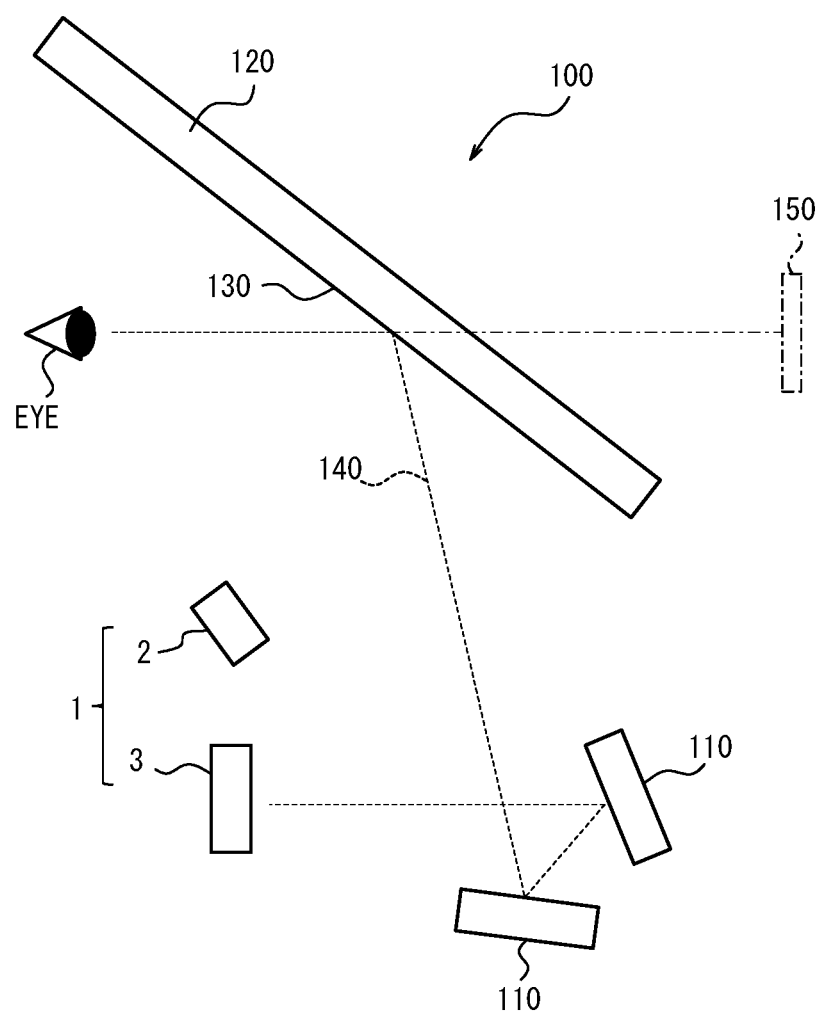
FIG. 11 is a schematic diagram of a head up display (HUD) system according to an embodiment.

In one of embodiments, the three-dimensional display system 1 may be equipped in a head up display 100, as illustrated in FIG. 11. The head up display 100 can be abbreviated as "HUD". The HUD 100 includes the three-dimensional display system 1, optical members 110, and a projection target member 120 having a projection target surface 130. The optical members 110 and the projection target member 120 are included in an optical system that projects a virtual image to form in the field of view of the user. The HUD 100 causes image light emitted from the three-dimensional display system 1 to reach the projection target member 120 via the optical members 110. The HUD 100 causes the image light reflected off the projection target member 120 to reach the left and right eyes of the user. Thus, the HUD 100 causes the image light to travel from the three-dimensional display system 1 to the left and right eyes of the user along an optical path 140 indicated by dashed lines. The user can view the image light that has reached along the optical path 140, as the virtual image 150. The three-dimensional display system 1 can provide stereoscopic vision according to the movement of the user, by controlling the display depending on the positions of the left and right eyes of the user.

Figure 12:
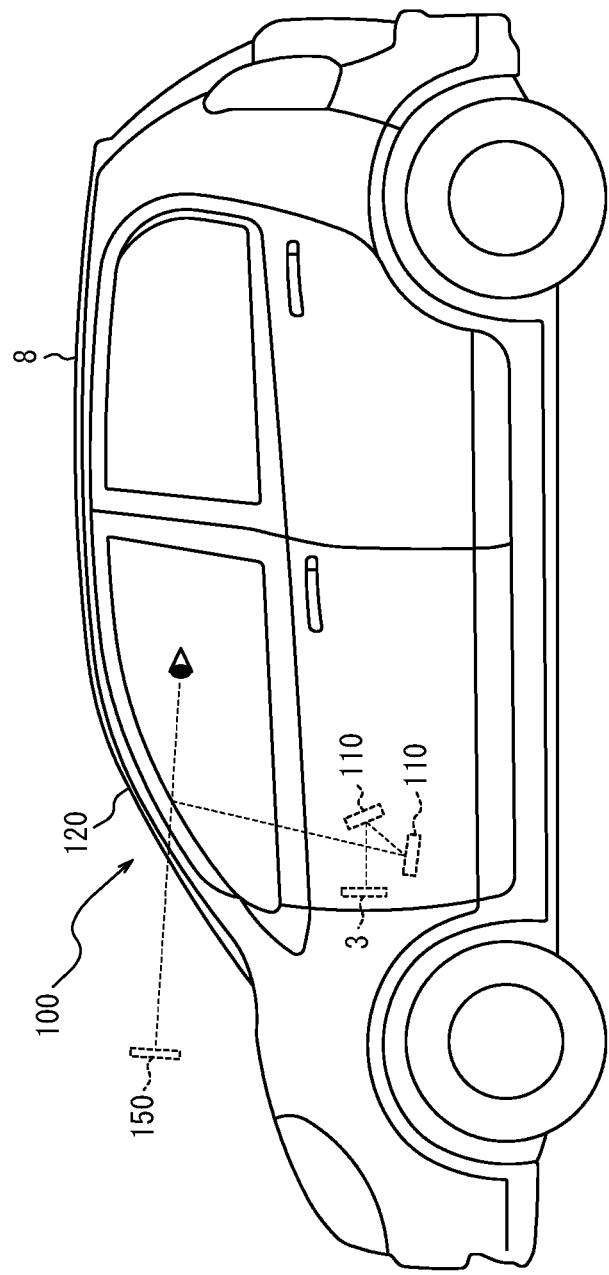
FIG. 12 is a diagram illustrating an example of a vehicle equipped with the HUD system illustrated in FIG. 11.

As illustrated in FIG. 12, the HUD 100, the three-dimensional display system 1, and the three-dimensional display apparatus 3 may be equipped in a mobile object. The HUD 100 and the three-dimensional display system 1 have part of their structure shared with another apparatus or component included in the mobile object. For example, the mobile object may use a windshield as part of the HUD 100 and the three-dimensional display system 1. In the case where part of the structure is shared with another apparatus or component included in the mobile object, the other structure can be referred to as "HUD module" or "three-dimensional display component".

The term "mobile object" in the present disclosure encompasses vehicles, ships, and aircraft. Vehicles in the present disclosure include motor vehicles and industrial vehicles but are not limited to such, and may also include railed vehicles, domestic vehicles, and fixed-wing airplanes running on runways. Motor vehicles include cars, trucks, buses, two-wheeled vehicles, and trolleybuses but are not limited to such, and may also include other vehicles that run on roads. Industrial vehicles include industrial vehicles for agriculture and construction. Industrial vehicles include forklifts and golf carts, but are not limited to such. Industrial vehicles for agriculture include tractors, cultivators, transplanters, binders, combines, and lawn mowers, but are not limited to such. Industrial vehicles for construction include bulldozers, scrapers, power shovels, crane trucks, dump trucks, and road rollers, but are not limited to such. Vehicles include human-powered vehicles. The classifications of vehicles are not limited to the above-mentioned examples. For example, motor vehicles may include industrial vehicles that can run on roads. The same type of vehicle may belong to classifications. Ships in the present disclosure include personal watercraft, boats, and tankers. Aircraft in the present disclosure include fixed-wing airplanes and rotary-wing airplanes.

Figure 13:
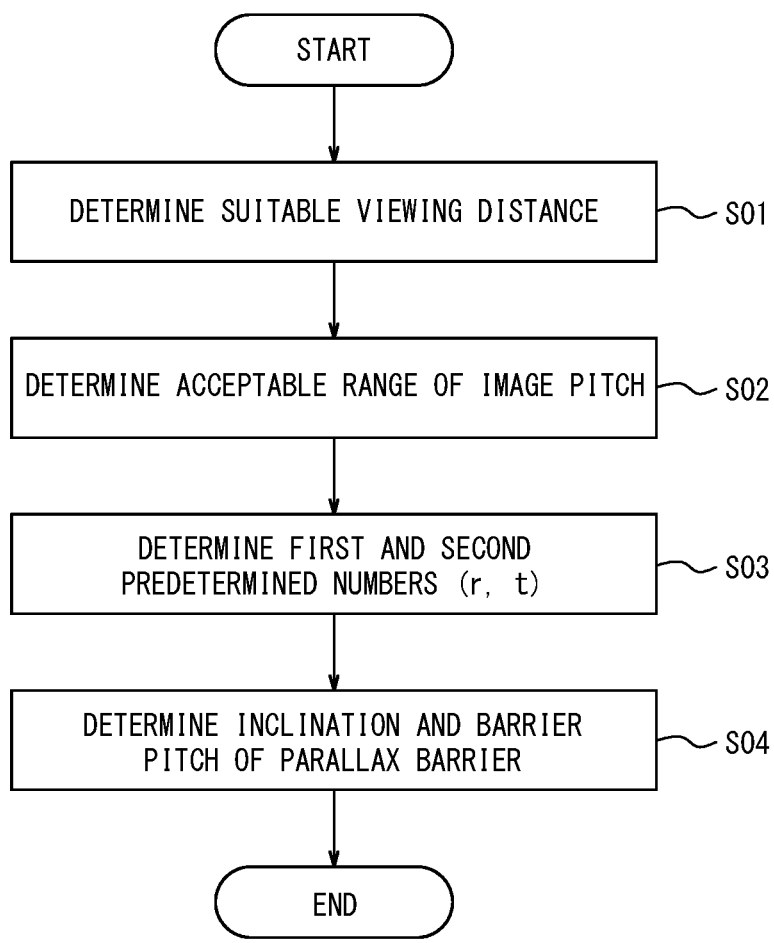
FIG. 13 is a flowchart illustrating a three-dimensional display apparatus design method.

A method of designing the three-dimensional display apparatus 3, the three-dimensional display system 1, and the HUD 100 (hereafter referred to as "three-dimensional display apparatus, etc.") according to the present disclosure will be described below, with reference to FIG. 13. The method of designing the three-dimensional display apparatus, etc. includes a method of designing the arrangement of the subpixels 11 of the display panel 5, the shape of the parallax barrier 6, and the like.

The three-dimensional display apparatus, etc. according to the present disclosure are used in various use environments. Accordingly, the specifications required for the distance from the parallax barrier 6 to the eyes of the user depend on the use environment to a certain extent. For example, in the case where the HUD is equipped in a vehicle, the position of the head of the driver as the user is limited to a certain range. Further, in the case where the HUD is used in a game machine such as a pachinko machine or a slot machine, the distance from the display screen of the game machine to the eyes of the user is limited to a certain extent. Hence, in the design of the three-dimensional display apparatus, etc. according to the present disclosure, the optimum viewing distance d depending on the use is determined first (step S01). The optimum viewing distance may be determined as a distance having a certain range.

Next, the acceptable range of the image pitch k is determined based on parameters such as the optimum viewing distance d determined in step S01, the average interocular distance E of the user, and the adoptable range of the gap g between the display surface 51 and the parallax barrier 6 (step S02). Here, with the design method according to the present disclosure, the image pitch k need not be limited to an integral multiple of the horizontal pitch Hp of the display panel 5.

Next, the first certain number r and the second certain number t which are positive integers are determined so that the image pitch k is in the range of the image pitch k determined in step S02 (step S03). The relationship of the foregoing Formula (1-4) holds between the image pitch k and the first certain number r and the second certain number t. The determined first certain number r and second certain number t are stored in and used by the controller 7. When using the three-dimensional display apparatus, etc., the controller 7 uses the first certain number r and the second certain number t in order to assign the first subpixels 11L and the second subpixels 11R to the subpixels 11 on the display surface 51 of the display panel 5.

After the first certain number r and the second certain number t are determined, the barrier inclination angle θ of the parallax barrier 6 can be calculated based on the foregoing formula:

$$\tan θ = Hp/tVp \quad \text{Formula (1-1)}.$$

In addition, the barrier pitch Bp of the parallax barrier 6 is determined from the image pitch k, the optimum viewing distance d, and the gap g. The shape of the parallax barrier 6 is thus determined (step S04).

In this way, the arrangement of the subpixels 11 and the shape of the parallax barrier 6 in the three-dimensional display apparatus, etc. are determined. Consequently, the three-dimensional display apparatus, etc. can be formed according to the desired optimum viewing distance.

Embodiment 2

When, in a three-dimensional display system, an opening of a parallax barrier is arranged in a diagonal direction of subpixels, crosstalk tends to occur depending on the position of the observer's eyes. Crosstalk is a phenomenon that image light for the left eye mixes in image light for the right eye and reaches the right eye, and image light for the right eye mixes in image light for the left eye and reaches the left eye. If the opening of the parallax barrier is narrowed to prevent crosstalk, the image becomes darker. A three-dimensional display system 1001 according to some of embodiments of the present disclosure can reduce crosstalk while suppressing moire and maintaining the opening ratio.

Embodiment 2-1

Figure 14:
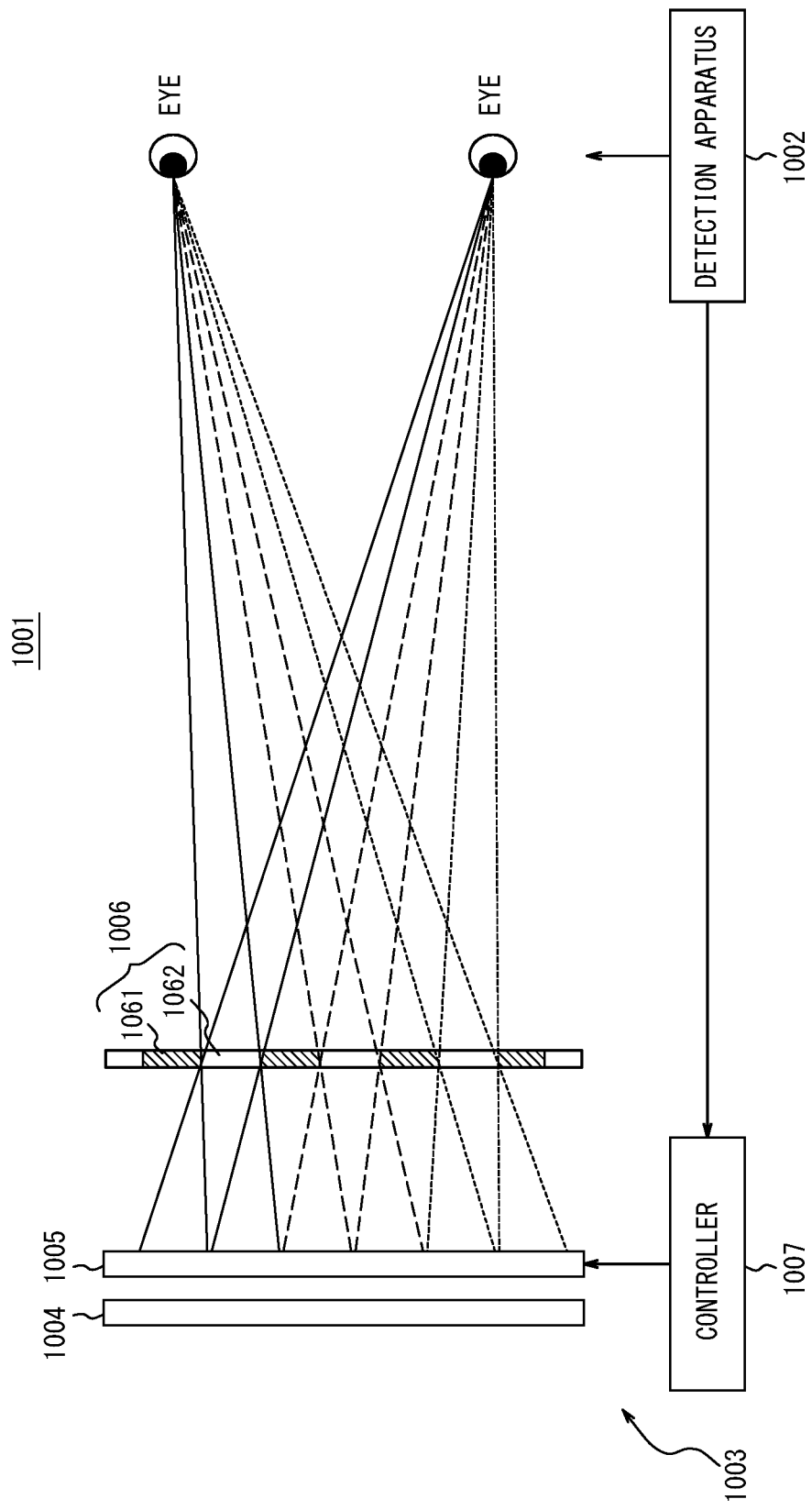
FIG. 14 is a schematic diagram of a three-dimensional display system according to a first embodiment.

The three-dimensional display system 1001 according to an embodiment of the present disclosure includes a detection apparatus 1002 and a three-dimensional display apparatus 1003, as illustrated in FIG. 14. The three-dimensional display apparatus 1003 includes an irradiation unit 1004, a display panel 1005, a parallax barrier 1006 as an optical element, and a controller 1007.

Figure 15:
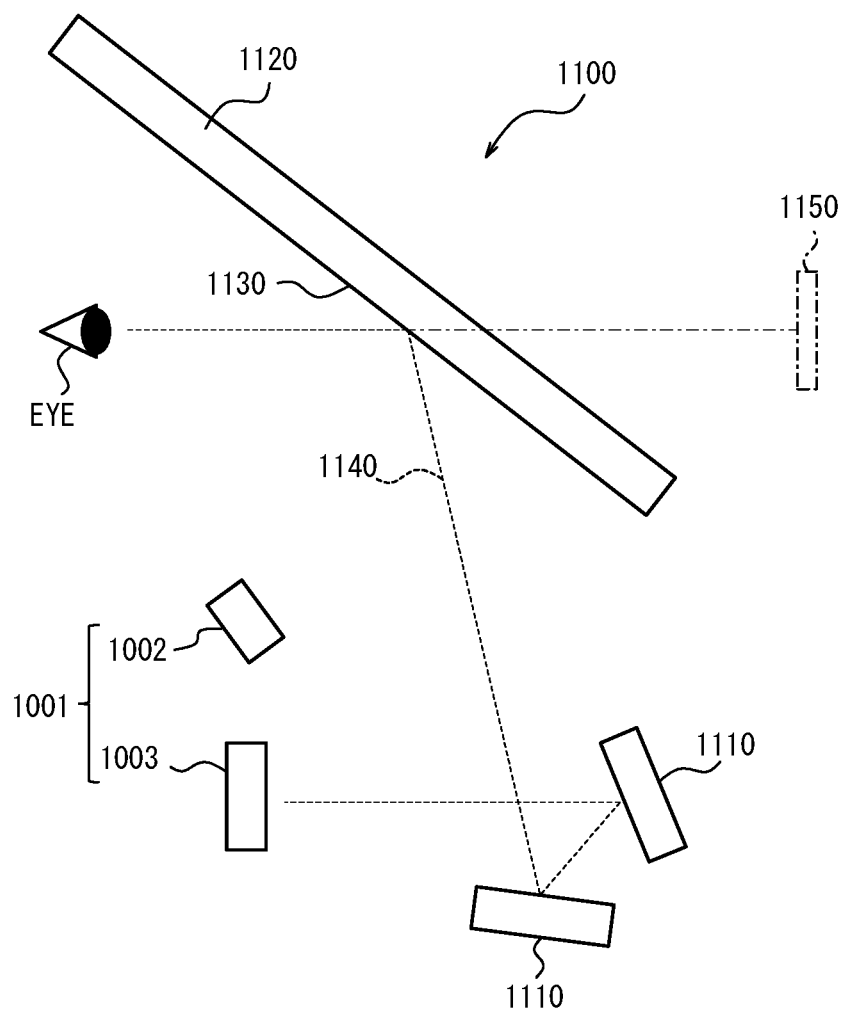
FIG. 15 is a diagram illustrating an example of a HUD equipped with the three-dimensional display system according to the first embodiment.

The three-dimensional display system 1001 may be equipped in a head up display 1100, as illustrated in FIG. 15. The head up display 1100 can be abbreviated as "HUD". The HUD 1100 includes the three-dimensional display system 1001, optical members 1110, and a projection target member 1120 having a projection target surface 1130. The HUD 1100 causes image light emitted from the three-dimensional display system 1001 to reach the projection target member 1120 via the optical members 1110. The HUD 1100 causes the image light reflected off the projection target member 1120 to reach the left and right eyes of the user. Thus, the HUD 1100 causes the image light to travel from the three-dimensional display system 1001 to the left and right eyes of the user along an optical path 1140 indicated by dashed lines. The user can view the image light that has reached along the optical path 1140, as the virtual image 1150. The three-dimensional display system 1001 can provide stereoscopic vision according to the movement of the user, by controlling the display depending on the positions of the left and right eyes of the user.

Figure 16:
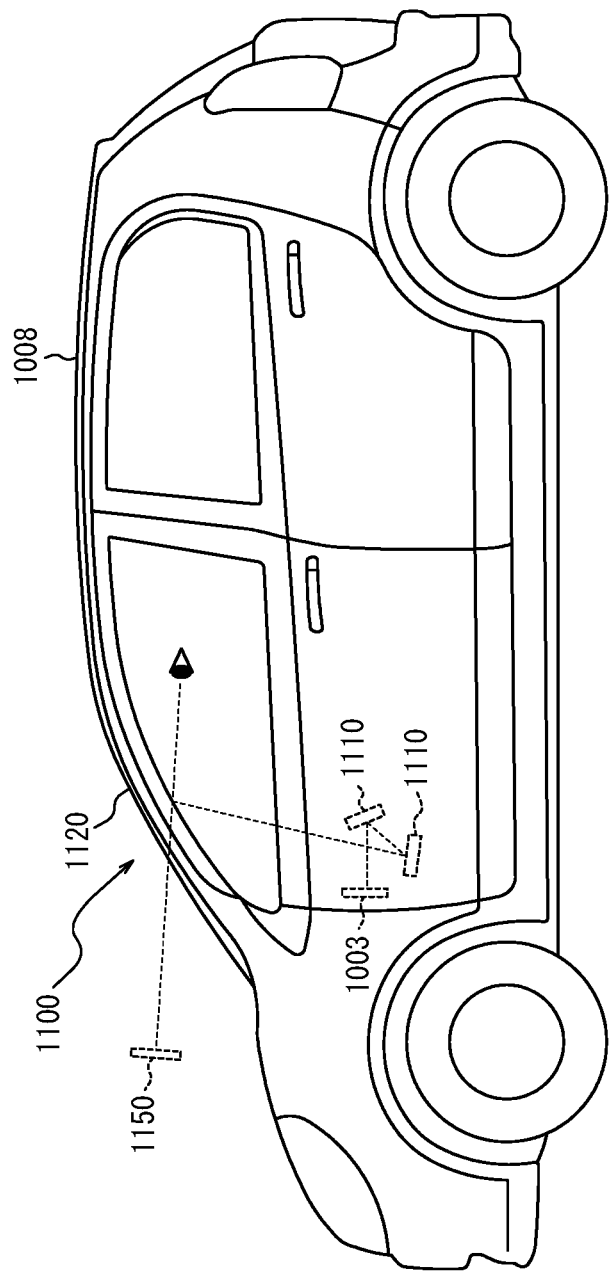
FIG. 16 is a diagram illustrating an example of a vehicle equipped with the HUD illustrated in FIG. 15.

As illustrated in FIG. 16, the HUD 1100 and the three-dimensional display system 1001 may be equipped in a mobile object 1008. The HUD 1100 and the three-dimensional display system 1001 have part of their structure shared with another apparatus or component included in the mobile object. For example, the mobile object 1008 may use a windshield as part of the HUD 1100 and the three-dimensional display system 1001. In the case where part of the structure is shared with another apparatus or component included in the mobile object, the other structure can be referred to as "HUD module" or "three-dimensional display component". The three-dimensional display system 1001 and the three-dimensional display apparatus 1003 may be equipped in the mobile object.

The detection apparatus 1002 detects the position of any of the left and right eyes of the user, and outputs the detected position to a controller 1007. The detection apparatus 1002 may include, for example, a camera. The detection apparatus 1002 may capture an image of the face of the user by the camera. The detection apparatus 1002 may detect the position of at least one of the left and right eyes from the image captured by the camera. The detection apparatus 1002 may detect the position of at least one of the left and right eyes as coordinates in a three-dimensional space, from an image captured by one camera. The detection apparatus 1002 may detect the position of at least one of the left and right eyes as coordinates in a three-dimensional space, from images captured by two or more cameras.

The detection apparatus 1002 may be connected to an external camera, instead of including a camera. The detection apparatus 1002 may include an input terminal to which a signal from the external camera is input. The external camera may be directly connected to the input terminal. The external camera may be indirectly connected to the input terminal via a shared network. The detection apparatus 1002 not including a camera may include an input terminal to which a video signal from a camera is input. The detection apparatus 1002 not including a camera may detect the position of at least one of the left and right eyes from the video signal input to the input terminal.

The detection apparatus 1002 may include, for example, a sensor. The sensor may be an ultrasonic sensor, an optical sensor, or the like. The detection apparatus 1002 may detect the position of the head of the user by the sensor, and detect the position of at least one of the left and right eyes based on the position of the head. The detection apparatus 1002 may detect the position of at least one of the left and right eyes as coordinates in a three-dimensional space by one or more sensors.

The detection apparatus 1002 may detect the moving distance of the left and right eyes along the eyeball arrangement direction, based on the detection result of the position of at least one of the left and right eyes.

The three-dimensional display system 1001 may not include the detection apparatus 1002. In the case where the three-dimensional display system 1001 does not include the detection apparatus 1002, the controller 1007 may include an input terminal to which a signal from an external detection apparatus is input. The external detection apparatus may be connected to the input terminal. The external detection apparatus may use an electrical signal and an optical signal as transmission signals to the input terminal. The external detection apparatus may be indirectly connected to the input terminal via a shared network. The controller 1007 may receive position coordinates indicating the position of at least one of the left and right eyes acquired from the external detection apparatus. The controller 1007 may calculate the moving distance of the left and right eyes along the horizontal direction, based on the position coordinates.

An irradiation unit 1004 is located on the side of one surface of the display panel 1005, and irradiates the display panel 1005 in a planar manner. The irradiation unit 1004 may include a light source, a light guide, a diffuser, a diffusion sheet, and the like. The irradiation unit 1004 emits irradiation light by the light source, and homogenizes the irradiation light in the surface direction of the display panel 1005 by the light guide, the diffuser, the diffusion sheet, or the like. The irradiation unit 1004 emits the homogenized light toward the display panel 1005.

Figure 17:
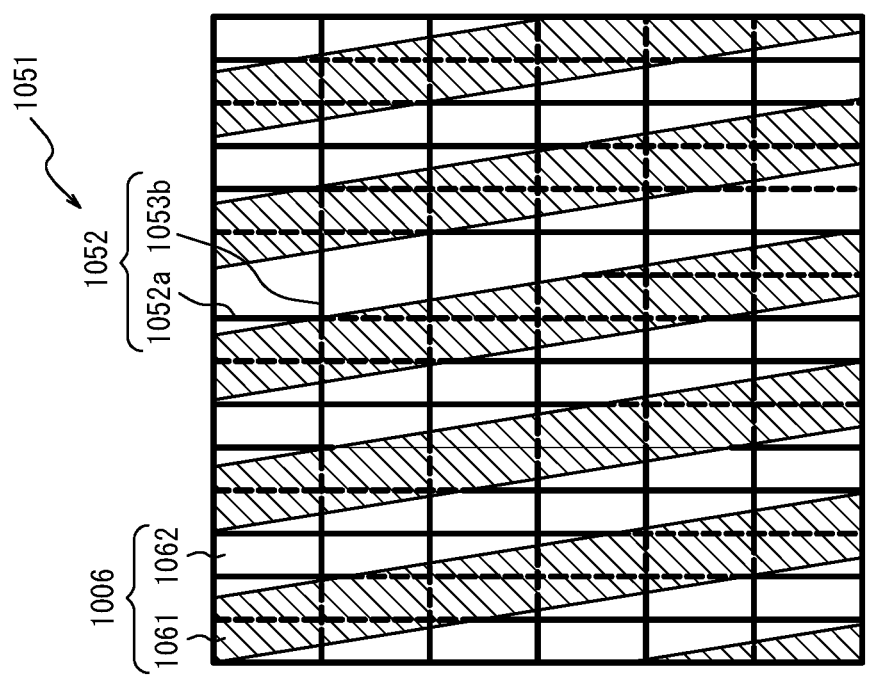
FIG. 17 is a diagram of a display panel and an optical element in FIG. 14 as seen from the optical element.

As the display panel 1005, a display panel such as a transmissive liquid crystal display panel may be used. The display panel 1005 has, on a plate surface, division regions divided in the horizontal direction and the vertical direction by a grid-like black matrix 1052, as illustrated in FIG. 17. The division regions can be referred to as "display surface 1051". Each of the division regions corresponds to one subpixel. The black matrix 1052 divides the division regions by first black lines 1052a extending in the vertical direction and second black lines 1052b extending in the horizontal direction. In the black matrix 1052, the first black lines 1052a are arranged in the horizontal direction with a constant pitch as an example, and the second black lines 1052b are arranged in the vertical direction with a constant pitch as an example. The subpixels is arranged in a matrix in the horizontal direction and the vertical direction. Each subpixel corresponds to any of R, G, and B. Three subpixels of R, G, and B as a set can constitute one pixel. One pixel can be referred to as a single pixel. The horizontal direction is, for example, the direction in which subpixels constituting one pixel are arranged. The vertical direction is, for example, the direction in which subpixels of the same color are arranged. The display panel 1005 is not limited to a transmissive liquid crystal panel, and may be any other display panel such as an organic EL. In the case where a light-emitting display panel is used as the display panel 1005, the irradiation unit 1004 is unnecessary.

The parallax barrier 1006 defines the light ray direction of image light emitted from the subpixels. The parallax barrier 1006 changes, for each of open regions 1062 extending in a certain direction on the display apparatus, the light ray direction which is the propagation direction of image light emitted from the subpixel, as illustrated in FIG. 17. The parallax barrier 1006 determines the visible range of image light emitted from the subpixels. The parallax barrier 1006 is located on the side of the display panel 1005 opposite to the irradiation unit 1004, as illustrated in FIG. 14. The parallax barrier 1006 may be located on the same side of the display panel 1005 as the irradiation unit 1004.

Specifically, the parallax barrier 1006 has light shielding surfaces 1061 that shield image light. Two adjacent light shielding surfaces 1061 of the light shielding surfaces 1061 define an open region 1062 located therebetween. The open region 1062 has higher light transmittance than the light shielding surface 1061. The light shielding surface 1061 has lower light transmittance than the open region 1062.

The open regions 1062 are parts that transmit light incident on the parallax barrier 1006. The open regions 1062 may transmit light at transmittance of a first certain value or more. For example, the first certain value may be 100%, or a value close to 100%. The light shielding surfaces 1061 are parts that shield light incident on the parallax barrier 1006 so as not to pass through. In other words, the light shielding surfaces 1061 block an image displayed on the display panel 1005. The light shielding surface 1061 may shield light at transmittance of a second certain value or less. For example, the second certain value may be 0%, or a value close to 0%.

The open regions 1062 and the light shielding surfaces 1061 alternate with each other in the horizontal direction and the vertical direction. The edges of the open regions 1062 define, for each of strip regions extending in a certain direction on the display surface 1051, the light ray direction of image light emitted from the subpixel. The edge of each strip region traverses the subpixels, and the length of a one pixel section of the edge along the horizontal direction is shorter than the length of the one pixel section of the edge along the vertical direction If the line indicating the edge of the open region 1062 extends in the vertical direction, moire tends to be recognized in the display image due to errors contained in the arrangement of the subpixels 1011 and the dimensions of the open regions 1062. If the line indicating the edge of the open region 1062 extends in a direction having a certain angle with respect to the vertical direction, moire is hardly recognized in the display image regardless errors contained in the arrangement of the subpixels 1011 and the dimensions of the open regions 1062.

The parallax barrier 1006 may be composed of a film or a plate member having transmittance of less than the second certain value. In this case, the light shielding surfaces 1061 are formed by the film or plate member, and the open regions 1062 are formed by openings in the film or plate member. The film may be made of resin, or made of other material. The plate member may be made of resin, metal, or the like, or made of other material. The parallax barrier 1006 is not limited to a film or a plate member, and may be composed of any other type of member. The parallax barrier 1006 may have a light shielding substrate. The parallax barrier 1006 may have a substrate containing a light shielding additive.

The parallax barrier 1006 may be composed of a liquid crystal shutter. The liquid crystal shutter can control the transmittance of light according to an applied voltage. The liquid crystal shutter may be made up of pixels, and control the transmittance of light in each pixel. The liquid crystal shutter may form a region with high transmittance of light or a region with low transmittance of light, in any shape. In the case where the parallax barrier 1006 is composed of a liquid crystal shutter, the open regions 1062 may be regions having transmittance of the first certain value or more. In the case where the parallax barrier 1006 is composed of a liquid crystal shutter, the light shielding surfaces 1061 may be regions having transmittance of the second certain value or less.

The parallax barrier 1006 causes image light emitted from the subpixels in part of the open regions 1062 to propagate to the position of the right eye of the user, and causes image light emitted from the subpixels in the other part of the open regions 1062 to propagate to the position of the left eye of the user. The parallax barrier 1006 is located at a certain distance away from the display surface 1051. The parallax barrier 1006 includes the light shielding surfaces 1061 arranged in a slit shape.

Image light that has passed through the open regions 1062 of the parallax barrier 1006 reaches the eyes of the user. Visible regions 1053a as strip regions in FIG. 18A corresponding to the open regions 1062 are visible to the left eye of the user. Meanwhile, the light shielding surfaces 1061 of the parallax barrier 1006 shield image light before reaching the eyes of the user. Light shielding regions 1054a corresponding to the light shielding surfaces 1061 are not visible to the left eye of the user.

The controller 1007 is connected to each component in the three-dimensional display system 1001, and controls each component. The controller 1007 is implemented, for example, as a processor. The controller 1007 may include one or more processors. The processors may include a general-purpose processor that performs a specific function by reading a specific program, and a dedicated processor dedicated to a specific process. The dedicated processor may include an application specific integrated circuit (ASIC). Each processor may include a programmable logic device (PLD). The PLD may include a field-programmable gate array (FPGA). The controller 1007 may be any of a system on a chip (SoC) or a system in a package (SiP) in which one or more processors cooperate with each other. The controller 1007 may include memory, and store various information, programs for operating each component in the three-dimensional display system 1001, and the like in the memory. The memory may be, for example, semiconductor memory. The memory may function as work memory of the controller 1007.

The controller 1007 determines subpixels for displaying a left-eye image and subpixels for displaying a right-eye image, depending on the positions of the eyes of the user and the structures of the display panel 1005 and the parallax barrier 1006. To describe a method whereby the controller 1007 determines the subpixels for displaying each image, the display panel 1005 and the parallax barrier 1006 will be described in detail below.

Figure 18A:
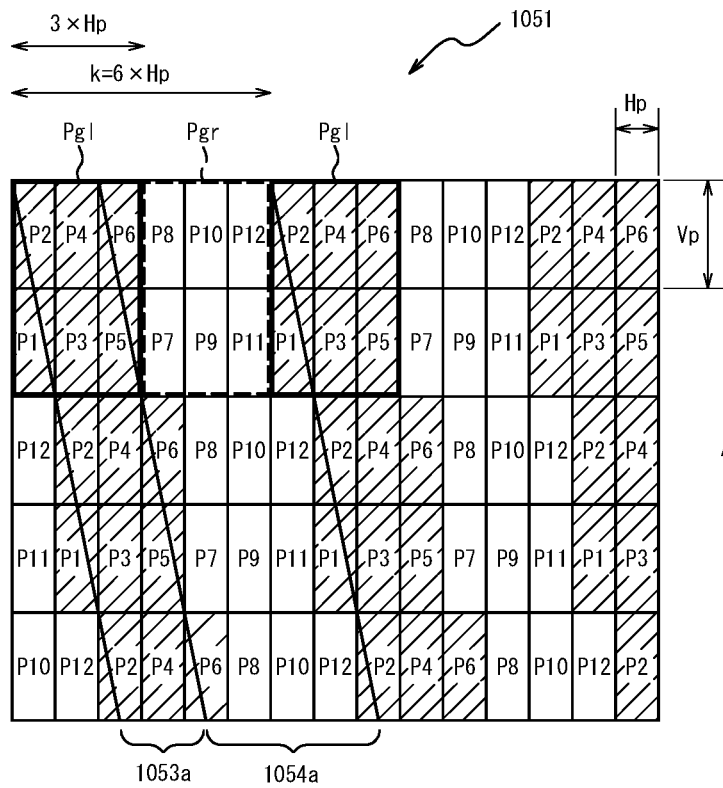
FIG. 18A is a schematic diagram of a display apparatus of a three-dimensional display apparatus according to the first embodiment, illustrating a visible region of a display surface at a reference position.
Figure 18B:
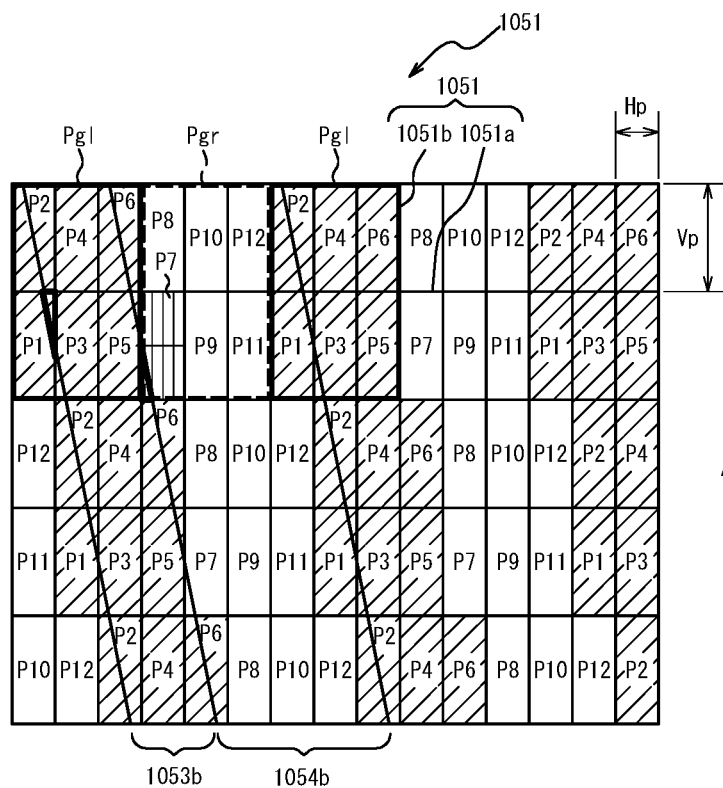
FIG. 18B is a schematic diagram of the display apparatus of the three-dimensional display apparatus according to the first embodiment, illustrating the visible region of the display surface at a displacement position.

As illustrated in FIGS. 18A and 18B, the length in the horizontal direction of a subpixel P displayed on the display surface 1051 of the display panel 1005 is denoted by Hp, and the length in the vertical direction of the subpixel P is denoted by Vp. In this case, the absolute value of the inclination of a straight line formed by the edge of the visible region 1053 which is a region on an image that passes through the open region 1062 and is visible to the left eye is represented by $b \times Vp/(a \times Hp)$, using integers a and b ($b \geq 2$ and $b > a$). In the example in FIG. 18A, $a=1$, and $b=2$. That is, the inclination of two straight lines defining the open region 1062 of the display surface 1051 with respect to the horizontal direction is $2 \times Vp/(1 \times Hp)$.

On the display surface 1051, a left-eye image is displayed in a first subpixel group Pgl including ($n \times b$) subpixels P1 to Pm (hereafter, $n \times b = m$) in which n subpixels are successively arranged in the horizontal direction and b subpixels are successively arranged in the vertical direction. Herein, m is a value satisfying $m \geq a+b+1$. On the display surface 1051, a first subpixel group Pgl arranged in the same way is located at a position adjacent to the foregoing first subpixel group Pgl in the vertical direction and shifted by one subpixel in the horizontal direction, and a left-eye image is displayed therein.

Further, on the display surface 1051, a right-eye image is displayed in a second subpixel group Pgr including m subpixels P(m+1) to P(2×m) that is adjacent to the first subpixel group Pgl in the horizontal direction and in which n subpixels are successively arranged in the horizontal direction as with the first subpixel group Pgl. Thus, n left-eye images are successively displayed in the horizontal direction, and n right-eye images are successively displayed in the horizontal direction so as to be adjacent to the left-eye images. The image pitch k which is the arrangement interval of the visible region 1053 in the horizontal direction is therefore represented by $2n \times Hp$.

In the example in FIG. 18A, on the display surface 1051, a left-eye image is displayed in a first subpixel group Pgl including six subpixels P1 to P6 in which three subpixels are successively arranged in the horizontal direction and two subpixels are successively arranged in the vertical direction. On the display surface 1051, a different left-eye image is displayed in a subpixel group Pgl arranged in the same way and located at a position adjacent to the foregoing first subpixel group Pgl in the vertical direction and shifted by one subpixel in the horizontal direction. Further, on the display surface 1051, a right-eye image is displayed in a second subpixel group Pgr including six subpixels P7 to P12 that is adjacent to the first subpixel group Pgl in the horizontal direction and in which three subpixels are successively arranged in the horizontal direction and two subpixels are successively arranged in the vertical direction.

Figure 19:
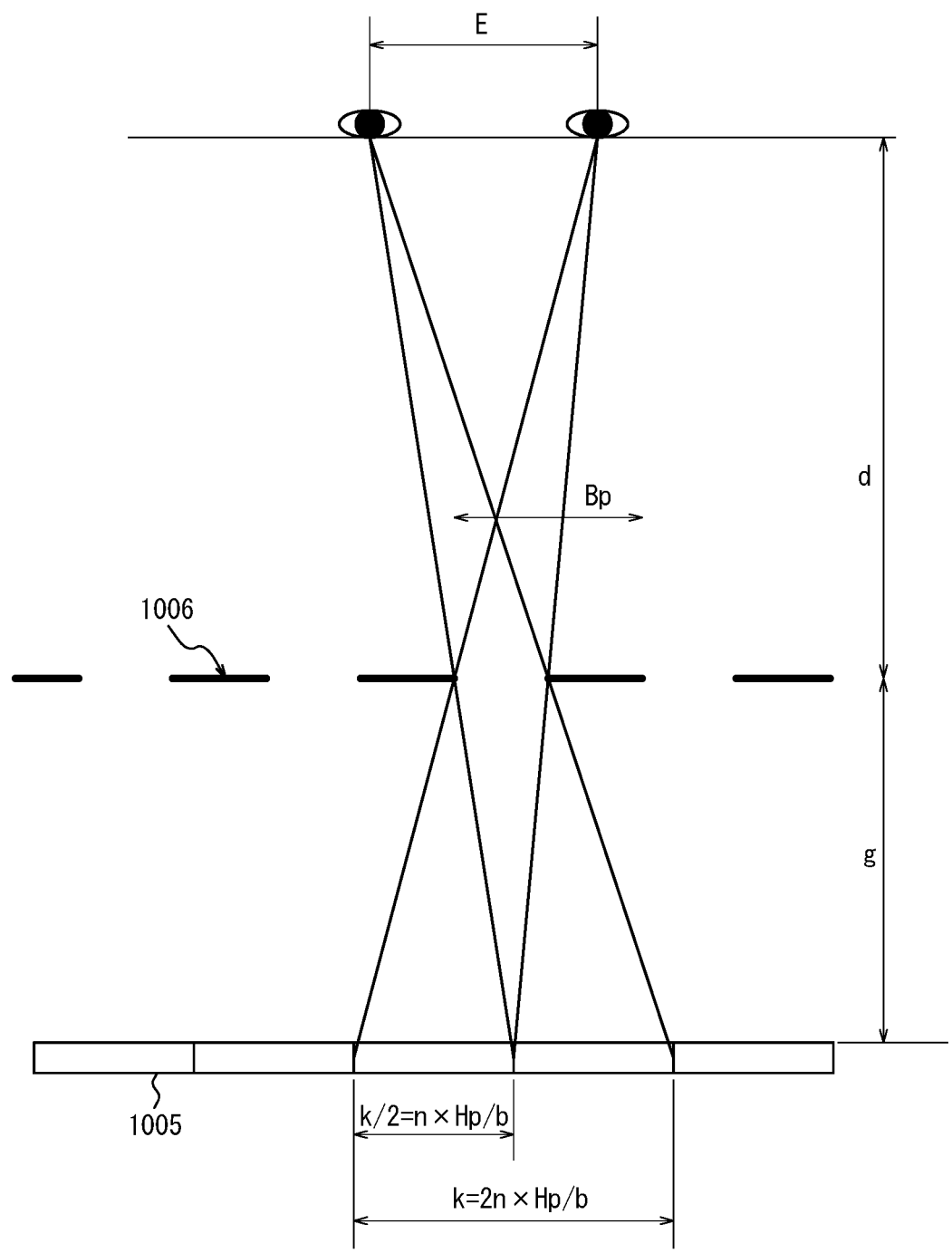
FIG. 19 is a schematic diagram illustrating the relationships among the interocular distance, the optimum viewing distance, the gap, the barrier pitch, and the image pitch.

As illustrated in FIG. 19, the barrier pitch Bp which is the arrangement interval of the open region 1062 of the parallax barrier 1006 and the gap g between the display surface 1051 and the parallax barrier 1006 are defined so as to satisfy the following Formulas (2-1) and (2-2), where d is the optimum viewing distance and E is the user's interocular distance:

$$E:d=(n \times Hp):g \qquad \text{Formula (2-1)}$$

$$d:Bp=(d+g):(2 \times n \times Hp) \qquad \text{Formula (2-2).}$$

The barrier opening width Bw is the width of the open region 1062. When $m=n \times b$ as mentioned above, the barrier opening width Bw is defined depending on the optimum viewing distance d and the gap g so that the width of the visible region 1053 in the horizontal direction is $(m-2) \times Hp/b$.

In the example in FIG. 18A, the number of each of left-eye images and right-eye images arranged in the horizontal direction is 3, and the number of each of left-eye images and right-eye images arranged in the vertical direction is 2. Accordingly, $n=3$ and $b=2$, and $m=3 \times 2=6$. The barrier pitch Bp and the barrier opening width Bw are defined so that the image pitch k is $(2m \times Hp)/b=2 \times 6 \times Hp/2=6 \times Hp$ and the width of the visible region 1053 is $(m-2) \times Hp/b=(6-2) \times Hp/2=2 \times Hp$.

The barrier opening ratio which is the ratio of the width of the visible region 1053 to the image pitch k is $((m-2) \times Hp/b)/((2n \times Hp)/b)=(m-2)/(2m)$. In the example in FIG. 18A, the barrier opening ratio is $(2 \times Hp/(6 \times Hp)) \times 100 = 33\%$.

The controller 1007 determines subpixels for displaying a left-eye image and subpixels for displaying a right-eye image, using a displacement from a reference position based on the respective position coordinates of the left and right eyes detected by the detection apparatus 1002. A method whereby the controller 1007 determines the subpixels for displaying the left-eye image using the displacement from the reference position based on the position coordinates of the left eye will be described below. The following description also applies to a method whereby the controller 1007 determines the subpixels for displaying the right-eye image using the displacement from the reference position based on the position coordinates of the right eye.

An image recognized by the left eye of the user in the case where the left eye of the user is at a displacement position in a displacement direction from the reference position will be described below. The displacement direction is a direction along a line connecting the left and right eyes in the case where the user views the display surface 1051 in the direction of the normal to the display surface 1051. The displacement position is the position of the eye of the user displaced from the reference position.

As described earlier with reference to FIG. 18A, at the reference position, the left-eye image is displayed in the subpixels P1 to P6, and the right-eye image is displayed in the subpixels P7 to P12. A visible region 1053b at the displacement position is different from the visible region 1053a at the reference position, as illustrated in FIG. 18B. Specifically, the part of the subpixel P1 included in the visible region 1053b at the displacement position is smaller than the part of the subpixel P1 included in the visible region 1053a at the reference position. Moreover, the visible region 1053b at the displacement position includes a part of the subpixel P7 not included in the visible region 1053a at the reference position. Consequently, at the displacement position, crosstalk caused by mixture of the right-eye image and the left-eye image occurs at the left eye of the user. Specifically, the part of the subpixel P7 included in the visible region 1053b is $\frac{1}{16}$ of the whole subpixel P7. Since the subpixels included in the whole visible region 1053b correspond to four subpixels, the crosstalk value at the left eye is $(\frac{1}{16})/4=1.6\%$.

In the example in FIG. 18B, the area of the subpixel P1 included in the visible region 1053b and the area of the subpixel P7 included in the visible region 1053b are equal. In the case where the visible region 1053 is more to the right than the visible region 1053b illustrated in FIG. 18B, the controller 1007 displays the left-eye image in the subpixel P7 and displays the right-eye image in the subpixel P1. In the case where the position on the display surface 1051 referenced by the user through the open region 1062 is more to the left than in the state illustrated in FIG. 18B, the controller 1007 displays the left-eye image in the subpixel P1 and displays the right-eye image in the subpixel P7. Thus, the crosstalk value at the left eye does not exceed 1.6% in either case. That is, the maximum value of crosstalk is 1.6%.

In other words, the controller 1007 determines the subpixels for displaying the left-eye image so that crosstalk does not exceed the maximum value. Specifically, in the case where the visible region 1053 is more to the left than in the state illustrated in FIG. 18B, the controller 1007 determines the subpixels P1 to P6 for displaying the left-eye image. In the case where the visible region 1053 is more to the right than in the state illustrated in FIG. 18B, the controller 1007 determines the subpixels P2 to P7 for displaying the left-eye image.

Figure 20:
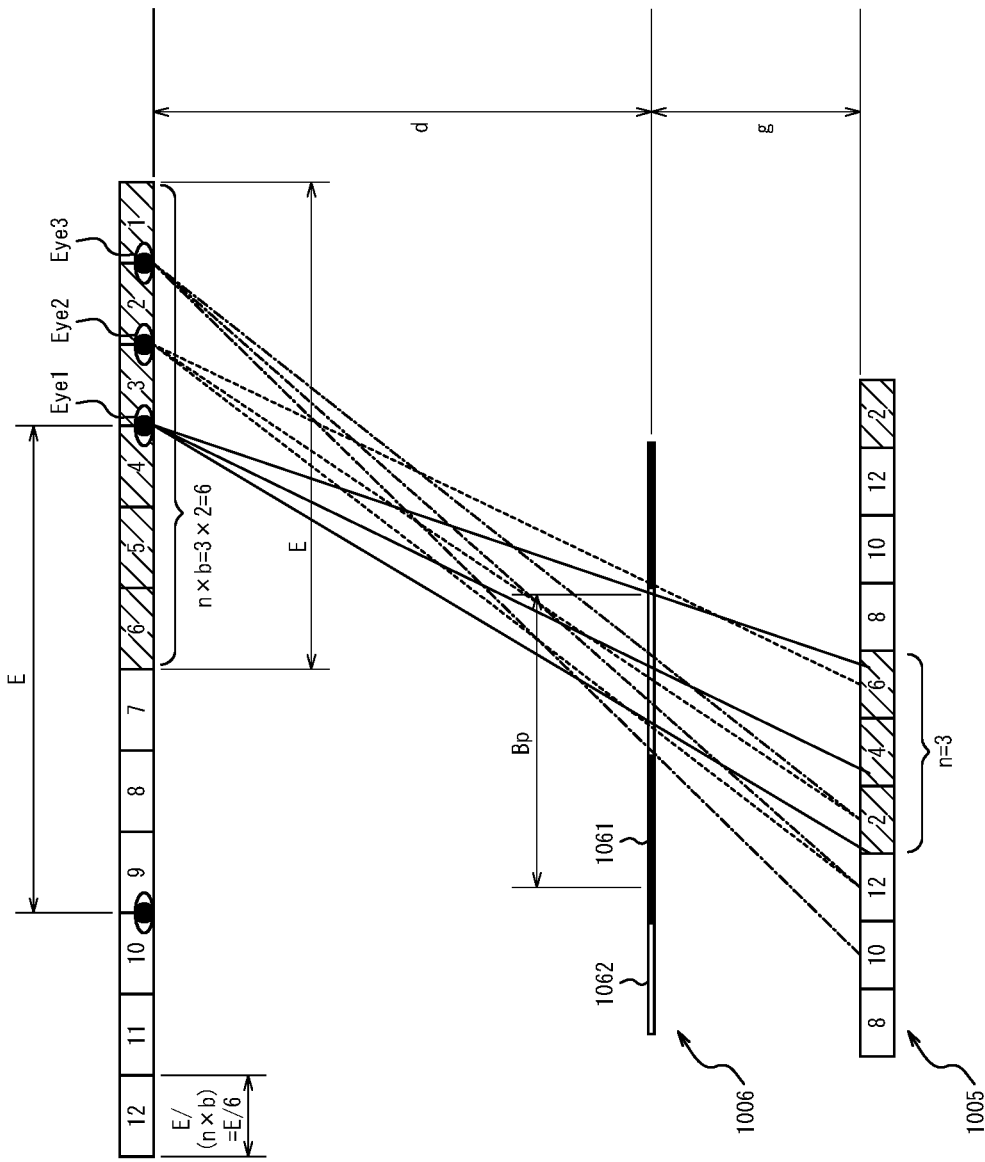
FIG. 20 is a schematic diagram illustrating the relationship between the displacement amount of the eye position and the subpixel displaying an image.

The controller 1007 determines the subpixels for displaying the left-eye image, based on the displacement amount of the left eye in the displacement direction detected by the detection apparatus 1002 and a displacement threshold. The displacement threshold is $E/(n \times b)$, where E is the interocular distance, i.e. the distance between the eyes of the user. When the eye of the user moves in the displacement direction by $E/(n \times b)$, the left-eye image includes the subpixels right adjacent to the subpixels included in the left-eye image before the movement by one subpixel. The displacement amount of the eye of the user is calculated based on the position coordinates of the eye of the user. When the displacement amount of the left eye is greater than or equal to the threshold, the controller 1007 determines the subpixels right adjacent by one subpixel, as the subpixels for displaying the left-eye image, As described above, in each row of the display surface 1051, three subpixels for displaying the left-eye image are successively arranged and, adjacent to the three subpixels, three subpixels for displaying the right-eye image are successively arranged. Accordingly, when the left eye is at a first position Eye1, image light emitted from the subpixels P2, P4, and P6 in a certain row of first subpixels passes through the open region 1062 and reaches the left eye, as illustrated in FIG. 20. The first position Eye1 is a position at which crosstalk is the maximum value as illustrated in FIG. 18B.

When the displacement amount detected by the detection apparatus 1002 is $E/(3 \times 2)$ in the right direction (corresponding to a second position Eye 2 in FIG. 20), the controller 1007 determines the subpixels P12, P2, and P4 left adjacent to the subpixels P2, P4, and P6 respectively, as the subpixels for displaying the left-eye image. Likewise, when the displacement amount is $2 \times E/(3 \times 2)$ in the right direction (corresponding to a third displacement position Eye 3 in FIG. 20), the controller 1007 determines the subpixels P10, P12, and P2 left adjacent to the subpixels P12, P2, and P4 respectively, as the subpixels for displaying the left-eye image. In the case where subpixels of two rows are controlled together as illustrated in, for example, FIGS. 18A and 18B, the controller 1007 performs change for each of the 12 subpixels in the two rows. The controller 1007 displays the left-eye image in the subpixels P1 to P6 at the position Eye1, displays the left-eye image in the subpixels P12 and P1 to P5 at the position Eye 2, and displays the left-eye image in the subpixels P11, P12, and P1 to P4 at the position Eye 3.

As described above, in Embodiment 2-1, the edge of the strip region of the optical element is configured so that its section crossing over the length Hp of one pixel of a subpixel in the horizontal direction is longer than its section crossing over the length Vp of one subpixel of the subpixel in the vertical direction on the display surface 1051. That is, the absolute value of the inclination of the straight line formed by the edge of the visible region 1053 is greater than $1 \times Vp/(1 \times Hp)$.

Figure 21A:
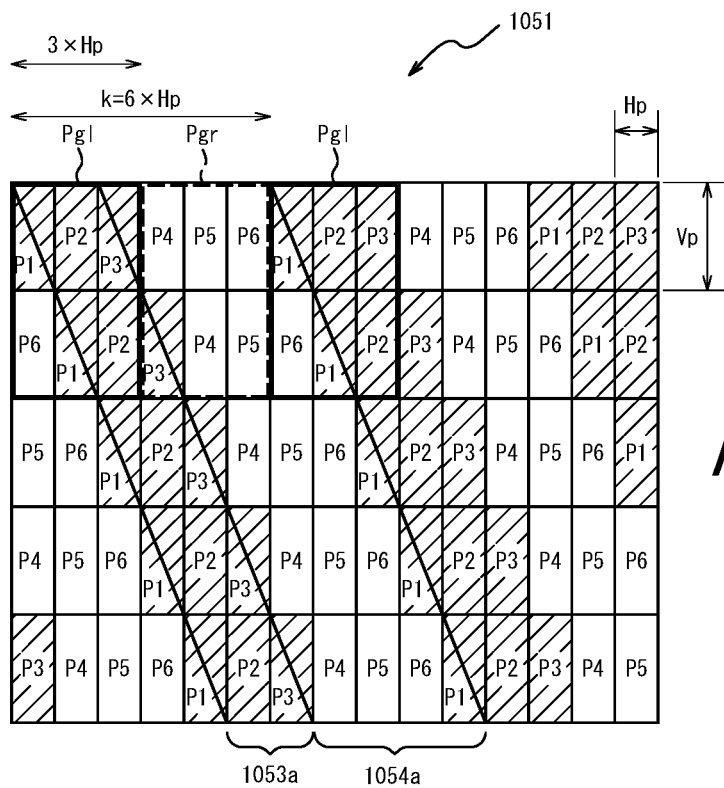
FIG. 21A is a schematic diagram illustrating a visible region of a display surface at a reference position in a conventional three-dimensional display apparatus.

According to conventional techniques, the absolute value of the inclination of the straight line formed by the edge of the visible region 1053 is $1 \times Vp/(1 \times Hp)$. A conventional display surface 1051 having a barrier opening ratio of 33% and designed to prevent crosstalk at a reference position as in Embodiment 2-1 includes a first subpixel group Pgl in which subpixels of one row and three columns for displaying a left-eye image are arranged and a second subpixel group Pgr in which subpixels of one row and three columns for displaying a right-eye image are arranged, as illustrated in FIG. 21A.

Figure 21B:
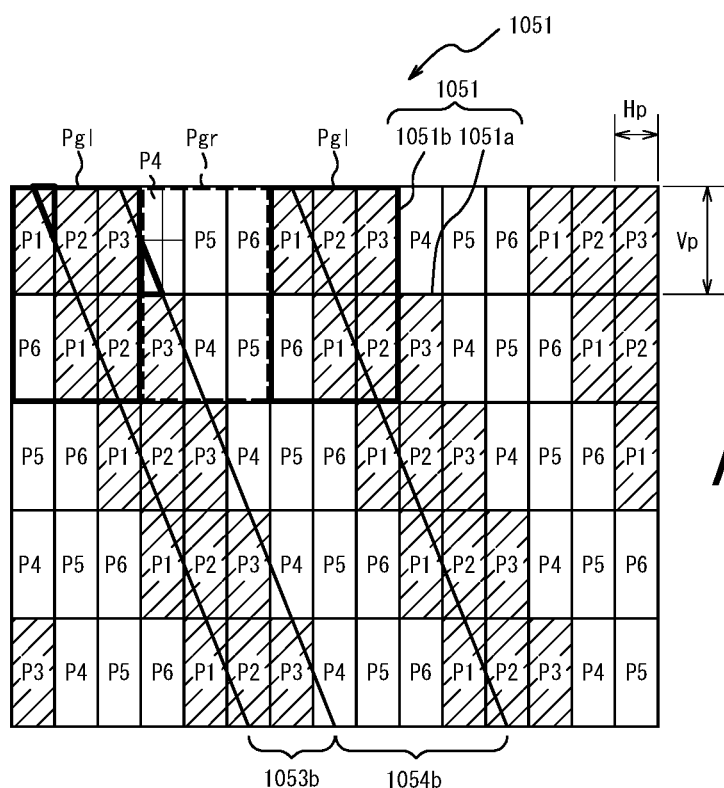
FIG. 21B is a schematic diagram illustrating the visible region of the display surface at a displacement position in the conventional three-dimensional display apparatus.

In this case, a visible region 1053b at a displacement position at which crosstalk is maximum as illustrated in FIG. 21B includes a part of the subpixel P4 for displaying the right-eye image, so that crosstalk caused by mixture of the right-eye image and the left-eye image occurs at the left eye of the user. Specifically, the part of the subpixel P4 included in the visible region 1053b is $\frac{1}{8}$ of the whole subpixel P4. Since the subpixels included in the whole visible region 1053b correspond to two subpixels, the crosstalk value at the left eye is $(\frac{1}{8})/2=6.25\%$. The crosstalk value in Embodiment 2-1 is 1.6%, as mentioned above. Thus, crosstalk is reduced as compared with the crosstalk value of 6.25% of the conventional techniques having the same opening ratio.

Because the absolute value of the inclination of the straight line formed by the edge of the visible region 1053 is greater than $1 \times Vp/(1 \times Hp)$, the proportion of the black matrix 1052 in a subpixel displaying an image that can cause crosstalk at the eye of the user is higher, as a result of which crosstalk is further reduced. Specifically, while the maximum value of crosstalk in this embodiment is 1.6%, the maximum value of crosstalk is actually less than 1.6% because the part of the subpixel P7, which can cause crosstalk, included in the visible region 1053b is partly the black matrix 1052.

Embodiment 2-2 (in the Case where the Barrier Opening Ratio is 25%)

Embodiment 2-2 of the present disclosure will be described below, with reference to drawings. The schematic diagram of Embodiment 2-2 is the same as the schematic diagram of Embodiment 2-1, and accordingly its description is omitted. Moreover, the same description as in Embodiment 2-1 is omitted.

Figure 22A:
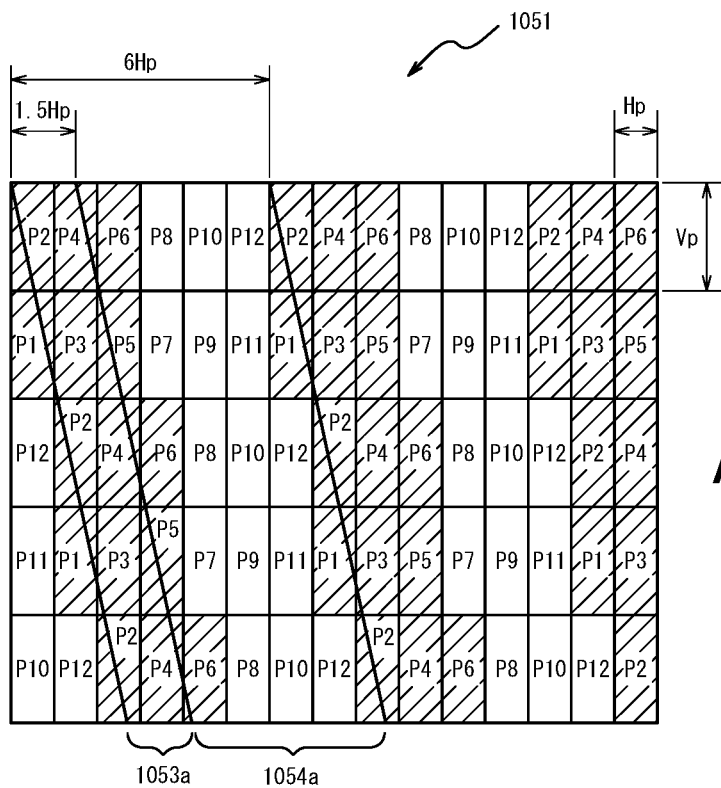
FIG. 22A is a schematic diagram illustrating a visible region of a display surface at a reference position in a three-dimensional display apparatus according to a second embodiment.
Figure 22B:
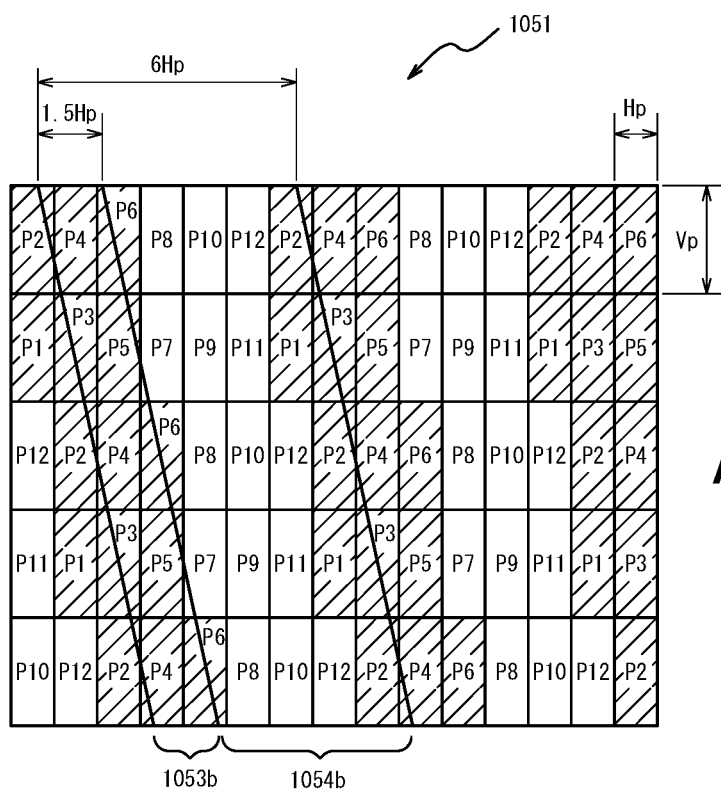
FIG. 22B is a schematic diagram illustrating the visible region of the display surface at a displacement position in the three-dimensional display apparatus according to the second embodiment.

As illustrated in FIGS. 22A and 22B, in Embodiment 2-2, the first subpixel group Pgl and the second subpixel group Pgr each include subpixels arranged in two rows and three columns, as in Embodiment 2-1. That is, n=3 and b=2, and m=n×b=3×2=6. In Embodiment 2-1, the barrier opening width Bw is set so that the visible region 1053a is (m−2)× Hp/b in width. In Embodiment 2-2, the barrier opening width Bw is set so that the visible region 1053a is less than (m−2)×Hp/b in width. Specifically, the barrier pitch Bp and the barrier opening width Bw are defined so that the image pitch k is 2n×Hp=2×3×Hp=6×Hp and the width of the visible region 1053 is less than (m−2)×Hp/b=(6−2)×Hp/2=2×Hp. Here, the barrier opening width Bw is ((m+1)−(a+b+1))Hp/b=((6+1)−(1+2+1))Hp/2=1.5 Hp, i.e. a number obtained by multiplying, by Hp/b, a number obtained by subtracting the value (a+b+1) which is the sum of the maximum number of subpixels that can overlap with the edge of the visible region 1053 and 1 from the value (m+1) which is the sum of the number of subpixels for one eye and 1, to set the start position of the subpixels for the other eye. Hence, in Embodiment 2-2, the barrier opening ratio is (1.5×Hp/(6×Hp))×100=25%.

As illustrated in FIG. 22A, at the reference position, the left-eye image is displayed in the subpixels P1 to P6, and the right-eye image is displayed in the subpixels P7 to P12. A visible region 1053b at the displacement position is different from the visible region 1053a at the reference position, as illustrated in FIG. 22B. Specifically, the part of the subpixel P1 included in the visible region 1053a at the reference position is not included in the visible region 1053b at the displacement position. Moreover, the parts of the subpixels P5 and P6 included in the visible region 1053b at the displacement position are larger than the parts of the subpixels P5 and P6 included in the visible region 1053a at the reference position. Since the left-eye image is displayed in all subpixels included in the visible region 1053b for the left eye, the crosstalk value is 0%.

In the case where the visible region 1053b is further shifted to the right as a result of the eye of the user being further displaced from the state illustrated in FIG. 22B, a part of the subpixel P7 is included, and the subpixel P1 is not included at all. Here, the controller 1007 displays the left-eye image in the subpixel P7, and displays the right-eye image in the subpixel P1. Thus, the left-eye image is displayed in all of the subpixels P2 to P7 referenced by the left eye, so that the crosstalk value is kept at 0%.

As described above, in Embodiment 2-2, the absolute value of the inclination of the straight line formed by the edge of the visible region 1053 is greater than 1×Vp/(1×Hp). It is therefore possible to achieve the same advantageous effect as in Embodiment 2-1, i.e. reduction of crosstalk as compared with the crosstalk value of the conventional techniques having the same opening ratio. In addition, in Embodiment 2-2, the proportion of the black matrix 1052 in a subpixel displaying an image that can cause crosstalk at the eye of the user is higher, as a result of which the same advantageous effect of reducing crosstalk as in Embodiment 2-1 can be achieved.

In Embodiment 2-1, the barrier opening width Bw is set so that the visible region 1053 is less than (m−2)×Hp/b in width. Accordingly, the maximum value of crosstalk can be reduced as compared with Embodiment 2-1.

Embodiment 2-3 (in the Case where Each Subpixel Group is Made Up of Two Rows and Two Columns)

Embodiment 2-3 of the present disclosure will be described below, with reference to drawings. The schematic diagram of Embodiment 2-3 is the same as the schematic diagram of Embodiment 2-1, and accordingly its description is omitted. Moreover, the same description as in Embodiment 2-1 is omitted.

Figure 23A:
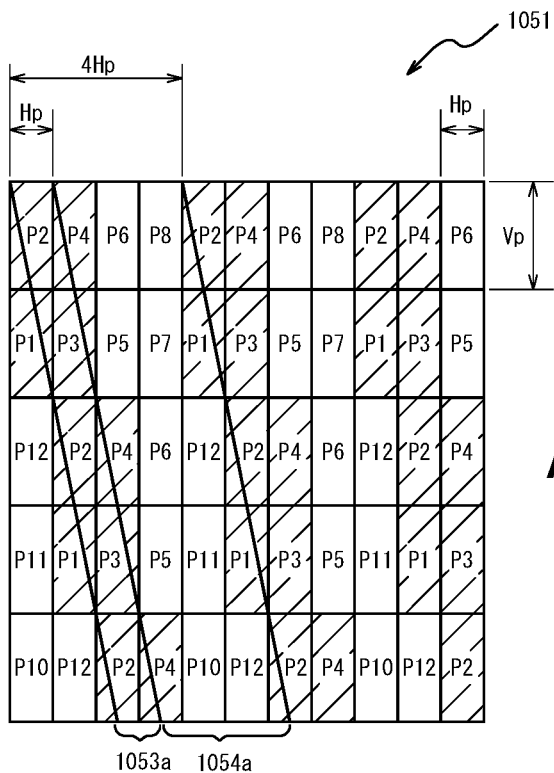
FIG. 23A is a schematic diagram illustrating a visible region of a display surface at a reference position in a three-dimensional display apparatus according to a third embodiment.
Figure 23B:
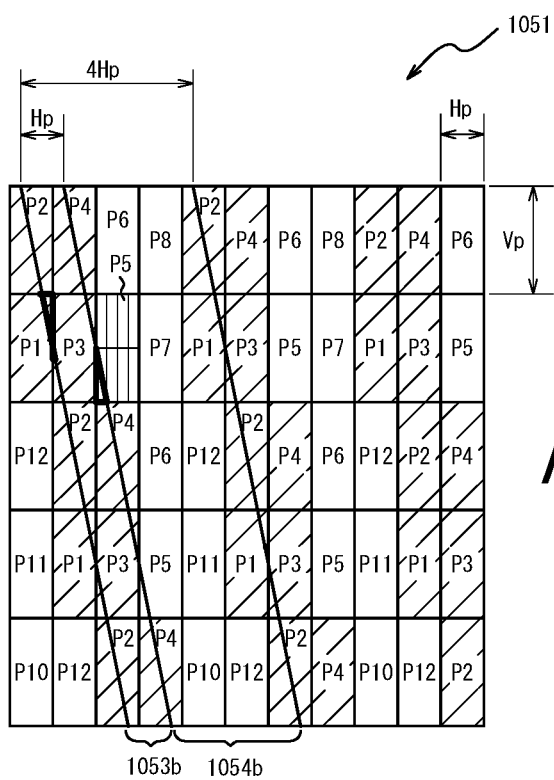
FIG. 23B is a schematic diagram illustrating the visible region of the display surface at a displacement position in the three-dimensional display apparatus according to the third embodiment.

In Embodiment 2-1, the first subpixel group Pgl and the second subpixel group Pgr each include subpixels arranged in two rows and three columns. As illustrated in FIGS. 23A and 23B, in Embodiment 2-3, the first subpixel group Pgl and the second subpixel group Pgr each include subpixels arranged in two rows and two columns. That is, n=2 and b=2, and m=n×b=2×2=4. The barrier pitch Bp and the barrier opening width Bw are defined so that the image pitch k is 2n×Hp=2×2×Hp=4×Hp and the width of the visible region 1053 is (m−2)×Hp/b=(4−2)×Hp/2=1×Hp. Hence, in Embodiment 2-3, the barrier opening ratio is (1×Hp/(4×Hp))×100=25%.

As illustrated in FIG. 23A, at the reference position, the left-eye image is displayed in the subpixels P1 to P4, and the right-eye image is displayed in the subpixels P5 to P8. Here, part of each of the subpixels P1 to P4 is referenced by the left eye, so that the crosstalk value is 0%.

When the left eye is displaced, the subpixels included in the visible region 1053b for the left eye change from the visible region 1053a at the reference position, as illustrated in FIG. 23B. Specifically, the part of the subpixel P1 included in the visible region 1053b at the displacement position is smaller than the part of the subpixel P1 included in the visible region 1053a at the reference position. Moreover, the part of the subpixel P5 not included in the visible region 1053a at the reference position is referenced in the visible region 1053b at the displacement position. The right-eye image is displayed in the subpixel P5. Consequently, at the displacement position, crosstalk caused by mixture of the left-eye image and the right-eye image occurs at the left eye of the user. Specifically, the part of the subpixel P5 included in the visible region 1053b at the displacement position is 1/16 of the whole subpixel P5. Since the subpixels included in the whole visible region 1053b correspond to two subpixels, the crosstalk value at the left eye is (1/16)/2=3.125%.

In the case where the visible region 1053b illustrated in FIG. 23B is further shifted to the right, the visible region 1053b includes a larger part of the subpixel P5, and a smaller part of the subpixel P1. Here, the controller 1007 displays the left-eye image in the subpixel P5, and references the right-eye image in the subpixel P1. Thus, the crosstalk value at the left eye does not exceed 3.125% in either case.

In other words, the controller 1007 determines the subpixels for displaying the left-eye image so that crosstalk does not exceed the maximum value. In the example in FIGS. 23A and 23B, in the case where the visible region 1053 is more to the left than in the state illustrated in FIG. 23B, the controller 1007 determines the subpixels P1 to P4 for displaying the left-eye image. In the case where the visible region 1053 is more to the right than in the state illustrated in FIG. 23B, the controller 1007 determines the subpixels P2 to P5 for displaying the left-eye image.

As described above, in Embodiment 2-3, the absolute value of the inclination of the straight line formed by the edge of the visible region 1053 is greater than $1\times Vp/(1\times Hp)$. It is therefore possible to achieve the same advantageous effect as in Embodiment 2-1, i.e. reduction of crosstalk as compared with the crosstalk value of the conventional techniques having the same opening ratio. In addition, in Embodiment 2-3, the proportion of the black matrix 1052 in a subpixel displaying an image that can cause crosstalk at the eye of the user is higher, as a result of which the same advantageous effect of reducing crosstalk as in Embodiment 2-1 can be achieved.

Embodiment 2-4 (in the Case where a=1, b=3, and Each Subpixel Group is Made Up of Three Rows and Two Columns)

Embodiment 2-4 of the present disclosure will be described below, with reference to drawings. The schematic diagram of Embodiment 2-4 is the same as the schematic diagram of Embodiment 2-1, and accordingly its description is omitted. Moreover, the same description as in Embodiment 2-1 is omitted.

Figure 24A:
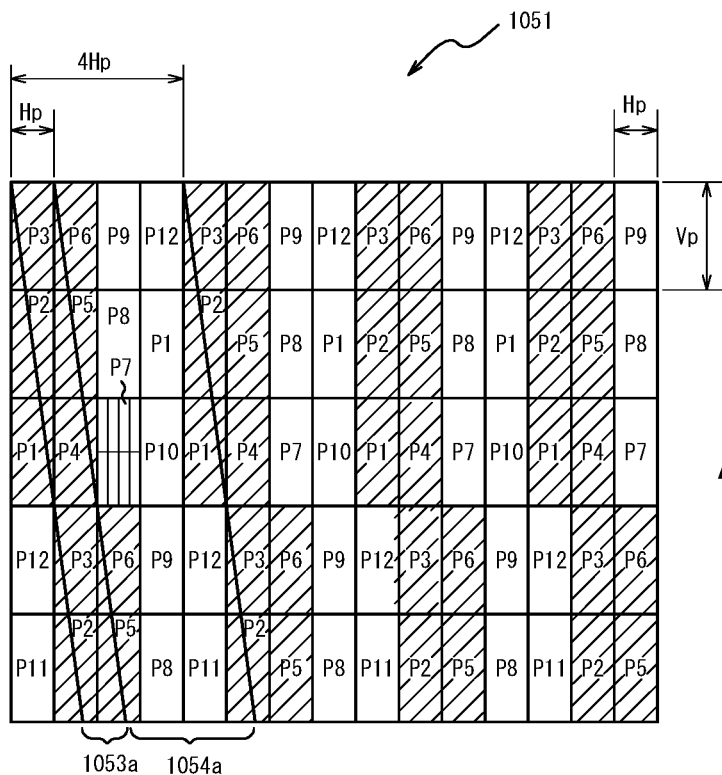
FIG. 24A is a schematic diagram illustrating a visible region of a display surface at a reference position in a three-dimensional display apparatus according to a fourth embodiment.
Figure 24B:
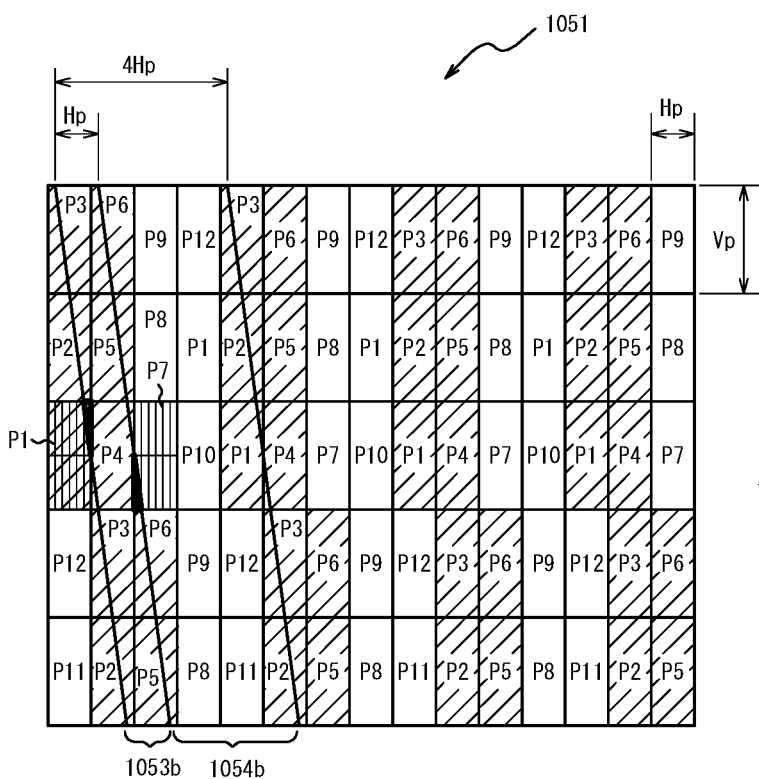
FIG. 24B is a schematic diagram illustrating the visible region of the display surface at a displacement position in the three-dimensional display apparatus according to the fourth embodiment.

Embodiment 2-1 describes the case where a=1 and b=2, i.e. the inclination of the barrier inclination angle is $2\times Vp/(1\times Hp)$. In Embodiment 2-4, a=1 and b=3, i.e. the inclination of the barrier inclination angle is $3\times Vp/(1\times Hp)$, as illustrated in FIGS. 24A and 24B. Moreover, the first subpixel group Pgl and the second subpixel group Pgr each include subpixels arranged in three rows and two columns. That is, n=2 and b=3, and m=n×b=2×3=6. The barrier pitch Bp and the barrier opening width Bw are defined so that the image pitch k is $2n\times Hp=2\times 2=4\times Hp$ and the width of the visible region 1053 is $1\times Hp$ which is less than $(m-2)\times Hp/b=(6-2)\times Hp/3=(4/3)\times Hp$. Hence, in Embodiment 2-4, the barrier opening ratio is $(1\times Hp/(4\times Hp))\times 100=25\%$.

As illustrated in FIG. 24A, at the reference position, the left-eye image is displayed in the subpixels P1 to P6, and the right-eye image is displayed in the subpixels P7 to P12. Here, part of each of the subpixels P1 to P6 for displaying the left-eye image is included in the visible region 1053a for the left eye, so that the crosstalk value is 0%.

When the left eye is displaced, the visible region 1053b for the left eye is different from the visible region 1053a for the left eye at the reference position, as illustrated in FIG. 24B. Specifically, the part of the subpixel P1 included in the visible region 1053b at the displacement position is smaller, and the part of the subpixel P7 not included in the visible region 1053a at the reference position is included in the visible region 1053b at the displacement position. The right-eye image is displayed in the subpixel P7. Consequently, at the displacement position, crosstalk caused by mixture of the left-eye image and the right-eye image occurs at the left eye of the user. Specifically, the part of the subpixel P7 included in the visible region 1053b for the left eye at the displacement position is ¼₄ of the whole subpixel P7. Since the subpixels included in the visible region 1053b for the left eye correspond to three subpixels, the crosstalk value at the left eye is (¼₄)/3=1.39%.

In the case where the visible region 1053b illustrated in FIG. 24B is further shifted to the right, the visible region 1053b for the left eye includes a larger part of the subpixel P7, and a smaller part of the subpixel P1. Here, the controller 1007 displays the left-eye image in the subpixel P7, and references the right-eye image in the subpixel P1. Thus, the crosstalk value at the left eye does not exceed 1.39% in either case.

In other words, the controller 1007 determines the subpixels for displaying the left-eye image so that crosstalk does not exceed the maximum value. In the example in FIGS. 24A and 24B, in the case where the visible region 1053 is more to the left than in the state illustrated in FIG. 24B, the controller 1007 determines the subpixels P1 to P6 for displaying the left-eye image. In the case where the visible region 1053 is more to the right than in the state illustrated in FIG. 24B, the controller 1007 determines the subpixels P2 to P7 for displaying the left-eye image.

As described above, in Embodiment 2-4, the absolute value of the inclination of the straight line formed by the edge of the visible region 1053 is greater than $1\times Vp/(1\times Hp)$. It is therefore possible to achieve the same advantageous effect as in Embodiment 2-1, i.e. reduction of crosstalk as compared with the crosstalk value of the conventional techniques having the same opening ratio. In addition, in Embodiment 2-4, the proportion of the black matrix 1052 in a subpixel displaying an image that can cause crosstalk at the eye of the user is higher, as a result of which the same advantageous effect of reducing crosstalk as in Embodiment 2-1 can be achieved.

Embodiment 2-5 (in the Case where the Barrier Opening Ratio is 50% and Each Subpixel Group is Made Up of Two Rows and Six Columns)

Embodiment 2-5 of the present disclosure will be described below, with reference to drawings. The schematic diagram of Embodiment 2-5 is the same as the schematic diagram of Embodiment 2-1, and accordingly its description is omitted. Moreover, the same description as in Embodiment 2-1 is omitted.

Figure 25A:
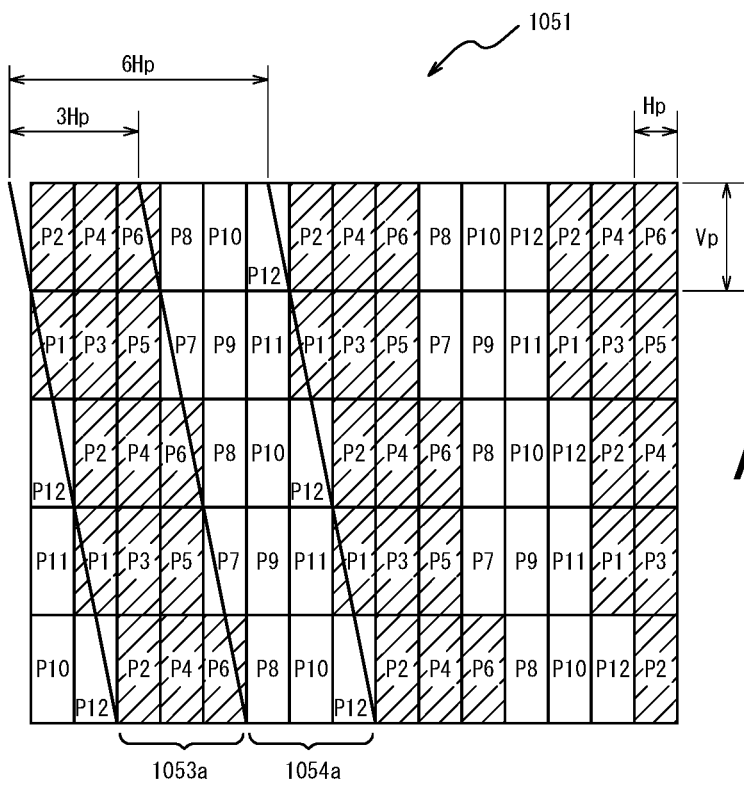
FIG. 25A is a schematic diagram illustrating a visible region of a display surface at a reference position in a three-dimensional display apparatus according to a fifth embodiment.
Figure 25B:
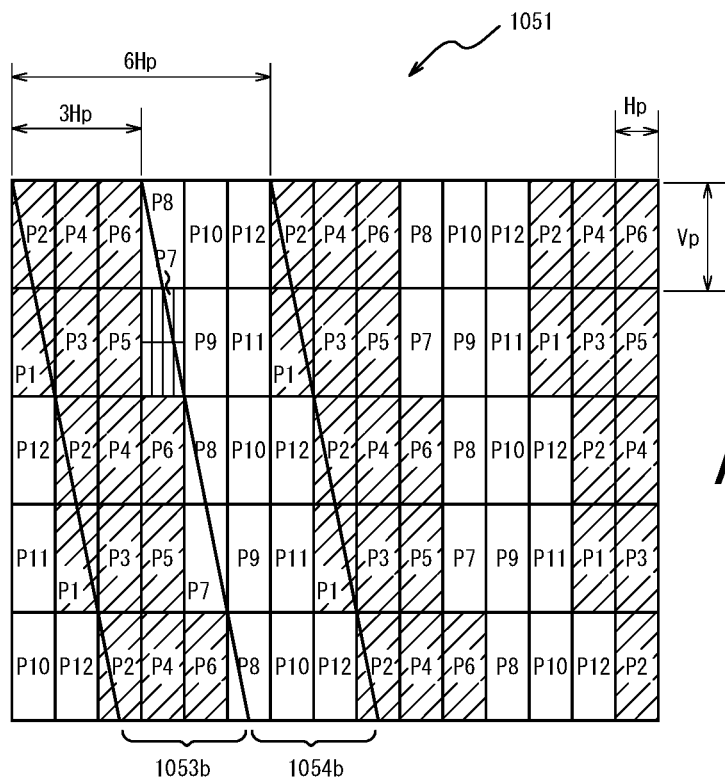
FIG. 25B is a schematic diagram illustrating the visible region of the display surface at a displacement position in the three-dimensional display apparatus according to the fifth embodiment.

In Embodiment 2-1, the barrier opening width Bw is set so that the visible region 1053 is $(m-2)\times Hp/b$ in width. In Embodiment 2-5, the barrier opening width Bw is set so that the visible region 1053 is greater than $(m-2)\times Hp/b$ in width. Specifically, in Embodiment 2-5, the first subpixel group Pgl and the second subpixel group Pgr each include subpixels arranged in two rows and three columns, as illustrated in FIGS. 25A and 25B. That is, n=3 and b=2, and m=n×b=3×2=6. The barrier pitch Bp and the barrier opening width Bw are defined so that the image pitch k is $2n\times Hp=6\times Hp$ and the width of the visible region 1053 is $3\times Hp$ which is greater than $(m-2)\times Hp/b=(6-2)\times Hp/2=2\times Hp$. Hence, in Embodiment 2-5, the barrier opening ratio is $(3\times Hp/(6\times Hp))\times 100=50\%$.

In this case, the visibility factor is 50% corresponding to the barrier opening ratio. As illustrated in FIG. 25A, at the reference position, the left-eye image is displayed in the subpixels P1 to P6, and the right-eye image is displayed in the subpixels P7 to P12. Here, the visible region 1053a for the left eye includes at least part of each of the subpixels P1 to P6 and part of each of the subpixels P12 and P7. Since the right-eye image is displayed in the subpixels P12 and P7, crosstalk occurs at the left eye of the user. The ratio of the part of the subpixel P12 included in the visible region 1053a for the left eye to the whole subpixel P12 is ¼. Likewise, the ratio of the part of the subpixel P7 included in the visible region 1053a to the whole subpixel P7 is ¼. Since the subpixels included in the whole visible region 1053a for the left eye correspond to six subpixels, the crosstalk value at the left eye is (¼+¼)/6=8.3%.

When the left eye is displaced, the visible region 1053b for the left eye is different from the visible region 1053a for the left eye at the reference position, as illustrated in FIG. 25B. Specifically, the parts of the subpixels P1 and P12 included in the visible region 1053b for the left eye at the displacement position are smaller than the parts of the subpixels P1 and P12 included in the visible region 1053a for the left eye at the reference position. Moreover, the part of the subpixel P7 included in the visible region 1053b for the left eye at the displacement position is larger. Further, the visible region 1053b at the displacement position includes the subpixel P8 not included in the visible region 1053a at the reference position. The right-eye image is displayed in the subpixels P12, P7, and P8. Consequently, at the displacement position, crosstalk caused by mixture of the left-eye image and the right-eye image occurs at the left eye of the user. Specifically, the crosstalk value at the left eye is 10.4%.

In the case where the visible region 1053b illustrated in FIG. 25B is further shifted to the right, the part of the subpixel P7 referenced by the left eye is larger, and the part of the subpixel P1 is smaller. Here, the controller 1007 displays the left-eye image in the subpixel P7, and displays the right-eye image in the subpixel P1. Thus, the crosstalk value at the left eye does not exceed 10.4% in either case.

In other words, the controller 1007 determines the subpixels for displaying the left-eye image so that crosstalk does not exceed the maximum value. In the example in FIGS. 25A and 25B, in the case where the visible region 1053 is more to the left than in the state illustrated in FIG. 25B, the controller 1007 determines the subpixels P1 to P6 for displaying the left-eye image. In the case where the visible region 1053 is more to the right than in the state illustrated in FIG. 25B, the controller 1007 determines the subpixels P2 to P7 for displaying the left-eye image.

As described above, in Embodiment 2-5, the absolute value of the inclination of the straight line formed by the edge of the visible region 1053 is greater than $1 \times Vp/(1 \times Hp)$. It is therefore possible to achieve the same advantageous effect as in Embodiment 2-1, i.e. reduction of crosstalk as compared with the crosstalk value of the conventional techniques having the same opening ratio. In addition, in Embodiment 2-5, the proportion of the black matrix 1052 in a subpixel displaying an image that can cause crosstalk at the eye of the user is higher, as a result of which the same advantageous effect of reducing crosstalk as in Embodiment 2-1 can be achieved.

Moreover, in Embodiment 2-5, the visible region 1053 is greater than $(m-2) \times Hp/b$ in width. Thus, the barrier opening ratio is higher than the barrier opening ratio in Embodiment 2-1. The amount of image light emitted from the display surface 1051 and propagated by the optical element 1006 is therefore larger. The user can accordingly recognize more image light.

Embodiment 2-6 (in the Case where the Barrier Opening Ratio is 50% and Each Subpixel Group is Made Up of Two Rows and Six Columns)

Embodiment 2-6 of the present disclosure will be described below, with reference to drawings. The schematic diagram of Embodiment 2-6 is the same as the schematic diagram of Embodiment 2-1, and accordingly its description is omitted. Moreover, the same description as in Embodiment 2-1 is omitted.

Embodiment 2-6 describes the case where the barrier opening ratio is 50%, as in Embodiment 2-5. In Embodiment 2-5, each subpixel group includes subpixels arranged in two rows and three columns. In Embodiment 2-6, each subpixel group includes subpixels arranged in two rows and six columns. That is, n=6 and b=2, and m=n×b=6×2=12. The barrier pitch Bp and the barrier opening width Bw are defined so that the image pitch k is $2n \times Hp = 12 \times Hp$ and the width of the visible region 1053 is $6 \times Hp$ which is greater than $(m-2) \times Hp/b = (12-2) \times Hp/2 = 5 \times Hp$. Hence, in Embodiment 2-6, the barrier opening ratio is $(6 \times Hp/(12 \times Hp)) \times 100 = 50\%$.

Figure 26A:
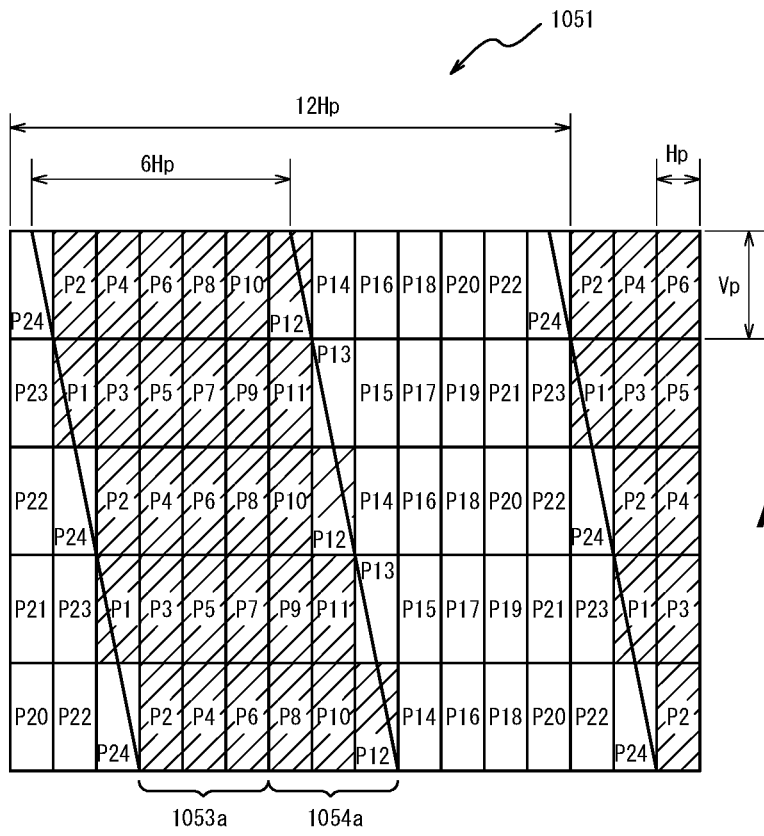
FIG. 26A is a schematic diagram illustrating a visible region of a display surface at a reference position in a three-dimensional display apparatus according to a sixth embodiment.

As illustrated in FIG. 26A, at the reference position, the left-eye image is displayed in the subpixels P1 to P12, and the right-eye image is displayed in the subpixels P13 to P24. Here, the visible region 1053a for the left eye includes at least part of each of the subpixels P1 to P12 and part of each of the subpixels P24 and P13. Since the left-eye image is displayed in the subpixels P1 to P12 and the right-eye image is displayed in the subpixels P24 and P13, crosstalk occurs at the left eye of the user. The ratio of the part of the subpixel P24 included in the visible region 1053a for the left eye to the whole subpixel P24 is ¼. Likewise, the ratio of the part of the subpixel P13 included in the visible region 1053a to the whole subpixel P13 is ¼. Since the subpixels included in the whole visible region 1053 correspond to 12 subpixels, the crosstalk value at the left eye is $(¼+¼)/12 = 4.2\%$.

Figure 26B:
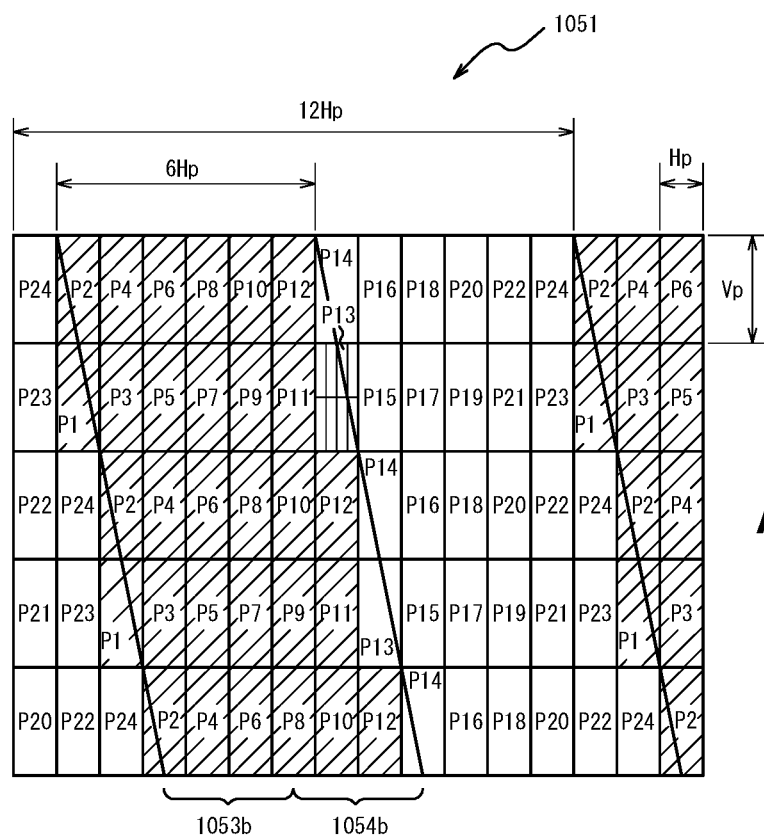
FIG. 26B is a schematic diagram illustrating the visible region of the display surface at a displacement position in the three-dimensional display apparatus according to the sixth embodiment.

When the left eye is displaced, the visible region 1053b for the left eye at the displacement position is different from the visible region 1053a for the left eye at the reference position, as illustrated in FIG. 26B. Specifically, the parts of the subpixels P1 and P2 included in the visible region 1053b for the left eye at the displacement position are smaller than the parts of the subpixels P1 and P2 included in the visible region 1053a for the left eye at the reference position. Moreover, the parts of the subpixels P12 and P13 included in the visible region 1053b for the left eye at the displacement position are larger than the parts of the subpixels P12 and P13 included in the visible region 1053a for the left eye at the reference position. Further, the subpixel P14 not included in the visible region 1053a for the left eye at the reference position is included in the visible region 1053b at the displacement position. The right-eye image is displayed in the subpixels P13 and P14. Consequently, at the displacement position, crosstalk caused by mixture of the left-eye image and the right-eye image occurs at the left eye of the user. Specifically, the crosstalk value at the left eye is 8.3%.

In the case where the visible region 1053b illustrated in FIG. 26B is further shifted to the right, the controller 1007 displays the left-eye image in the subpixel P13, and references the right-eye image in the subpixel P1. Thus, the crosstalk value at the left eye does not exceed 8.3% in either case.

In other words, the controller 1007 determines the subpixels for displaying the left-eye image so that crosstalk does not exceed the maximum value. In the example in FIGS. 26A and 26B, in the case where the visible region 1053 is more to the left than in the state illustrated in FIG. 26B, the controller 1007 determines the subpixels P1 to P12 for displaying the left-eye image. In the case where the visible region 1053 is more to the right than in the state illustrated in FIG. 26B, the controller 1007 determines the subpixels P2 to P13 for displaying the left-eye image.

As described above, in Embodiment 2-6, the absolute value of the inclination of the straight line formed by the edge of the visible region 1053 is greater than $1 \times Vp/(1 \times Hp)$. It is therefore possible to achieve the same advantageous effect as in Embodiment 2-1, i.e. reduction of crosstalk as compared with the crosstalk value of the conventional techniques having the same opening ratio. In addition, in Embodiment 2-6, the proportion of the black matrix 1052 in a subpixel displaying an image that can cause crosstalk at the eye of the user is higher, as a result of which the same advantageous effect of reducing crosstalk as in Embodiment 2-1 can be achieved.

Moreover, in Embodiment 2-6, the barrier opening width Bw is set so that the visible region 1053 is greater than (m−2)×Hp/b in width. Thus, the barrier opening ratio is higher than the barrier opening ratio in Embodiment 2-1. The amount of image light emitted from the display surface 1051 and propagated by the optical element 1006 is therefore larger. The user can accordingly recognize more image light.

Further, in Embodiment 2-6, the image pitch k is higher than the image pitch k in Embodiment 2-5. Hence, even when a pixel displaying an image that can cause crosstalk is included in the visible region 1053*b* as a result of a change in the position of the eye of the user, the crosstalk value can be reduced because the total number of pixels included in the visible region is large.

Figure 27:
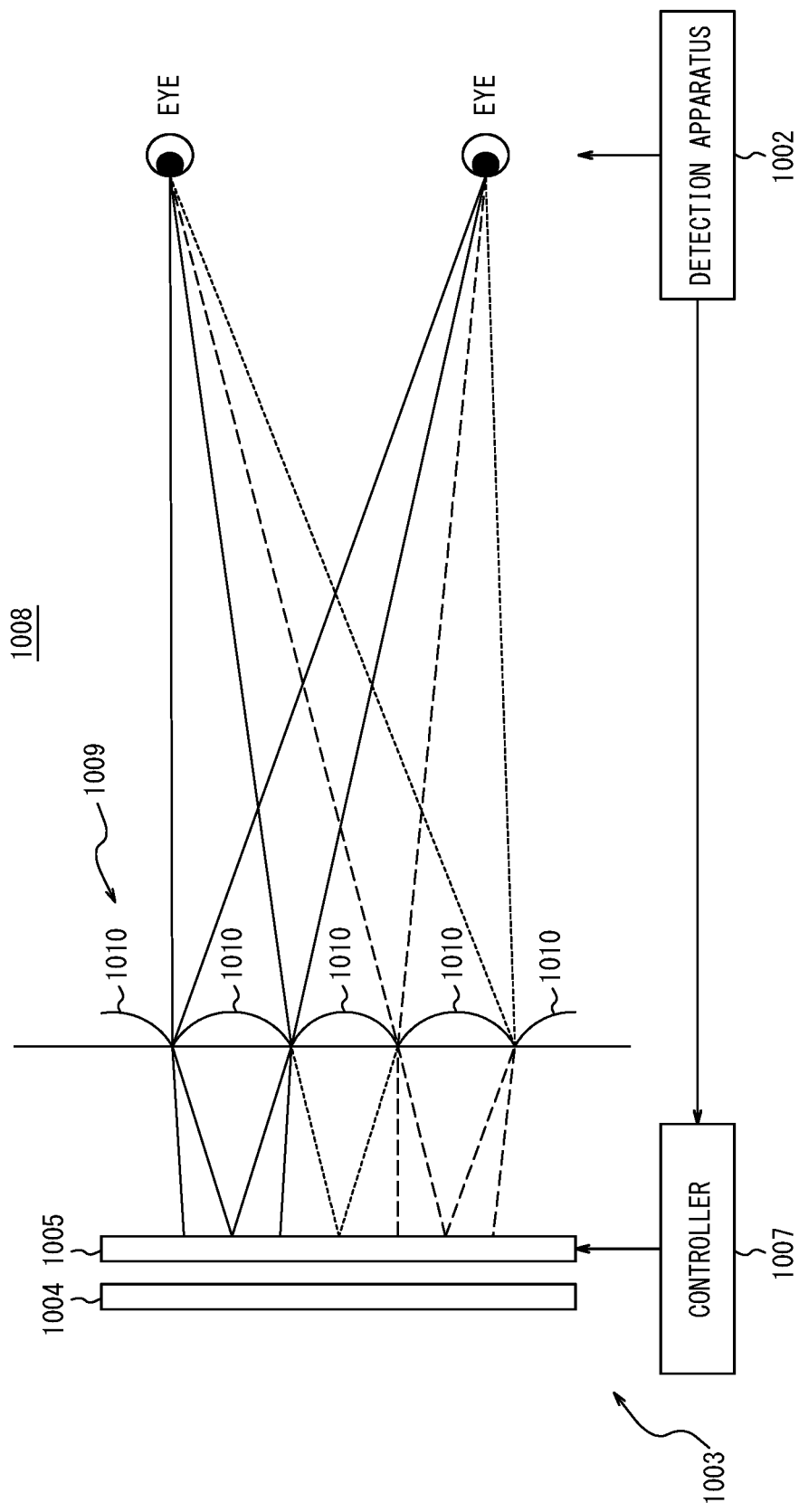
FIG. 27 is a schematic diagram of a three-dimensional display apparatus in the case where an optical element is a lenticular lens.

Although the optical element is the parallax barrier 1006 in the foregoing Embodiments 2-1 to 2-6, the optical element is not limited to such. For example, the optical element included in the three-dimensional display apparatus 1003 may be a lenticular lens 1009. In such a case, the lenticular lens 1009 is formed by arranging, in the horizontal direction on a plane, cylindrical lenses 1010 extending in the vertical direction, as illustrated in FIG. 27.

The lenticular lens 1009 causes image light emitted from the subpixels in part of the visible regions 1053 to propagate to the position of the right eye of the user, and causes image light emitted from the subpixels in the other part of the visible regions 1053 to propagate to the position of the left eye of the user, as with the parallax barrier 1006.

Embodiment 3

It is preferable that a three-dimensional display system can keep providing stereoscopic vision by image processing to a user who changes the observation distance by moving closer to or farther from the three-dimensional display system. A three-dimensional display system 2001 according to one of embodiments of the present disclosure can keep providing stereoscopic vision by image processing regardless of a change in the observation distance of the user.

Figure 28:
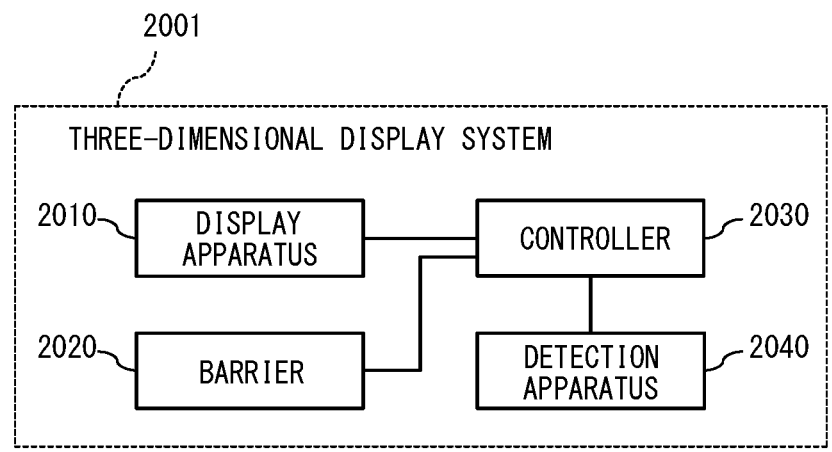
FIG. 28 is a functional block diagram illustrating an example of a three-dimensional display system according to an embodiment.
Figure 29:
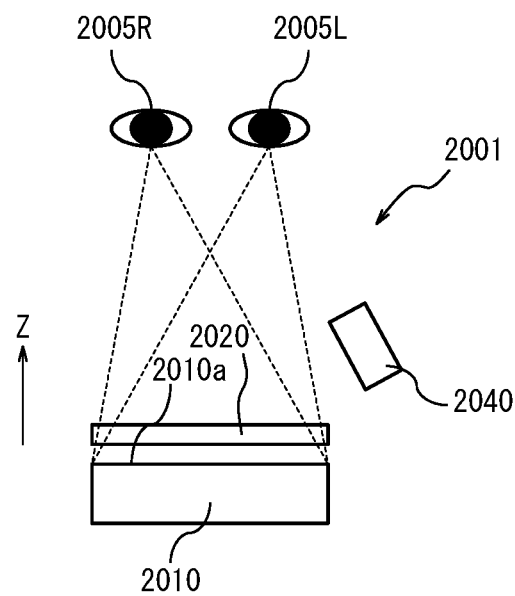
FIG. 29 is a diagram illustrating an example of the structure of a three-dimensional display system according to an embodiment.

As illustrated in FIGS. 28 and 29, the three-dimensional display system 2001 according to an embodiment includes a display apparatus 2010, a barrier 2020, a controller 2030, and a detection apparatus 2040. The three-dimensional display system 2001 displays an image by the display apparatus 2010 and shields part of image light by the barrier 2020, thus allowing different images to be presented to the left eye 2005L of the user and the right eye 2005R of the user. The user views a binocular parallax image with the left eye 2005L and the right eye 2005R, and therefore can stereoscopically view the image. The three-dimensional display system 2001 detects the position of the head of the user by the detection apparatus 2040, and performs head tracking control of controlling image display depending on the position of the head. The head tracking can be abbreviated as "HT". Hereafter, it is assumed that the normal to a display surface 2010*a* for displaying an image in the display apparatus 2010 is along the Z-axis direction. It is also assumed that the user is located in the positive direction of the Z axis with respect to the display apparatus 2010.

The display apparatus 2010 displays a left-eye image to the left eye 2005L of the user, and displays a right-eye image to the right eye 2005R of the user. The display apparatus 2010 may be, for example, a liquid crystal device such as a liquid crystal display (LCD). The display apparatus 2010 may be a self-luminous device such as an organic EL (electro-luminescence) display or an inorganic EL display.

The barrier 2020 is located between the user and the display apparatus 2010. The barrier 2020 causes the left-eye image displayed by the display apparatus 2010 to be visible to the left eye 2005L of the user and not visible to the right eye 2005R of the user. The barrier 2020 causes the right-eye image displayed by the display apparatus 2010 to be visible to the right eye 2005R of the user and not visible to the left eye 2005L of the user. The barrier 2020 may be integrally provided at the display surface 2010*a* of the display apparatus 2010. The barrier 2020 may be provided at a certain distance away from the display apparatus 2010.

The controller 2030 is connected to each component in the three-dimensional display system 2001, and controls each component. The controller 2030 is implemented, for example, as a processor. The controller 2030 may include one or more processors. The processors may include a general-purpose processor that performs a specific function by reading a specific program, and a dedicated processor dedicated to a specific process. The dedicated processor may include an application specific integrated circuit (ASIC). Each processor may include a programmable logic device (PLD). The PLD may include a field-programmable gate array (FPGA). The controller 2030 may be any of a system on a chip (SoC) or a system in a package (SiP) in which one or more processors cooperate with each other. The controller 2030 may include memory, and store various information, programs for operating each component in the three-dimensional display system 2001, and the like in the memory. The memory may be, for example, semiconductor memory. The memory may function as work memory of the controller 2030.

The detection apparatus 2040 detects the position of any of the left eye 2005L and the right eye 2005R of the user, and outputs the detected position to the controller 2030. The detection apparatus 2040 may include, for example, a camera. The detection apparatus 2040 may capture an image of the face of the user by the camera. The detection apparatus 2040 may detect the position of at least one of the left eye 2005L and the right eye 2005R from the image captured by the camera. The detection apparatus 2040 may detect the position of at least one of the left eye 2005L and the right eye 2005R as coordinates in a three-dimensional space, from an image captured by one camera. The detection apparatus 2040 may detect the position of at least one of the left eye 2005L and the right eye 2005R as coordinates in a three-dimensional space, from images captured by two or more cameras.

The detection apparatus 2040 may be connected to an external camera, instead of including a camera. The detection apparatus 2040 may include an input terminal to which a signal from the external camera is input. The external camera may be directly connected to the input terminal. The external camera may be indirectly connected to the input terminal via a shared network. The detection apparatus 2040 not including a camera may include an input terminal to which a video signal from a camera is input. The detection apparatus 2040 not including a camera may detect the position of at least one of the left eye 2005L and the right eye 2005R from the video signal input to the input terminal.

The detection apparatus 2040 may include, for example, a sensor. The sensor may be an ultrasonic sensor, an optical sensor, or the like. The detection apparatus 2040 may detect the position of the head of the user by the sensor, and detect the position of at least one of the left eye 2005L and the right eye 2005R based on the position of the head. The detection apparatus 2040 may detect the position of at least one of the left eye 2005L and the right eye 2005R as coordinates in a three-dimensional space by one or more sensors.

The detection apparatus 2040 detect the distance between at least one of the left eye 2005L and the right eye 2005R and the display surface 2010a of the display apparatus 2010 or the barrier 2020, based on the detection result of the position of at least one of the left eye 2005L and the right eye 2005R. The distance between at least one of the left eye 2005L and the right eye 2005R and the display surface 2010a of the display apparatus 2010 or the barrier 2020 is also referred to as "observation distance". The observation distance is calculated as the difference between the coordinate in the Z-axis direction of at least one of the left eye 2005L and the right eye 2005R and the coordinate in the Z-axis direction of the display surface 2010a of the display apparatus 2010 or the barrier 2020.

The three-dimensional display system 2001 may not include the detection apparatus 2040. In the case where the three-dimensional display system 2001 does not include the detection apparatus 2040, the controller 2030 may include an input terminal to which a signal from an external detection apparatus is input. The external detection apparatus may be connected to the input terminal. The external detection apparatus may use an electrical signal and an optical signal as transmission signals to the input terminal. The external detection apparatus may be indirectly connected to the input terminal via a shared network. The controller 2030 may calculate, based on the detection result of the position of at least one of the left eye 2005L and the right eye 2005R acquired from the external detection apparatus, the moving distance of the at least one of the left eye 2005L and the right eye 2005R. The controller 2030 may calculate the moving distance of at least one of the left eye 2005L and the right eye 2005R along the Z-axis direction. The detection apparatus 2040 may have the start point and the end point of detecting the moving distance, as certain points. The start point of detecting the moving distance may be, for example, the position of at least one of the left eye 2005L and the right eye 2005R when the image displayed by the display apparatus 2010 is changed as a result of HT control. The end point of detecting the moving distance may be the position of at least one of the left eye 2005L and the right eye 2005R when the moving distance is detected.

Figure 30:
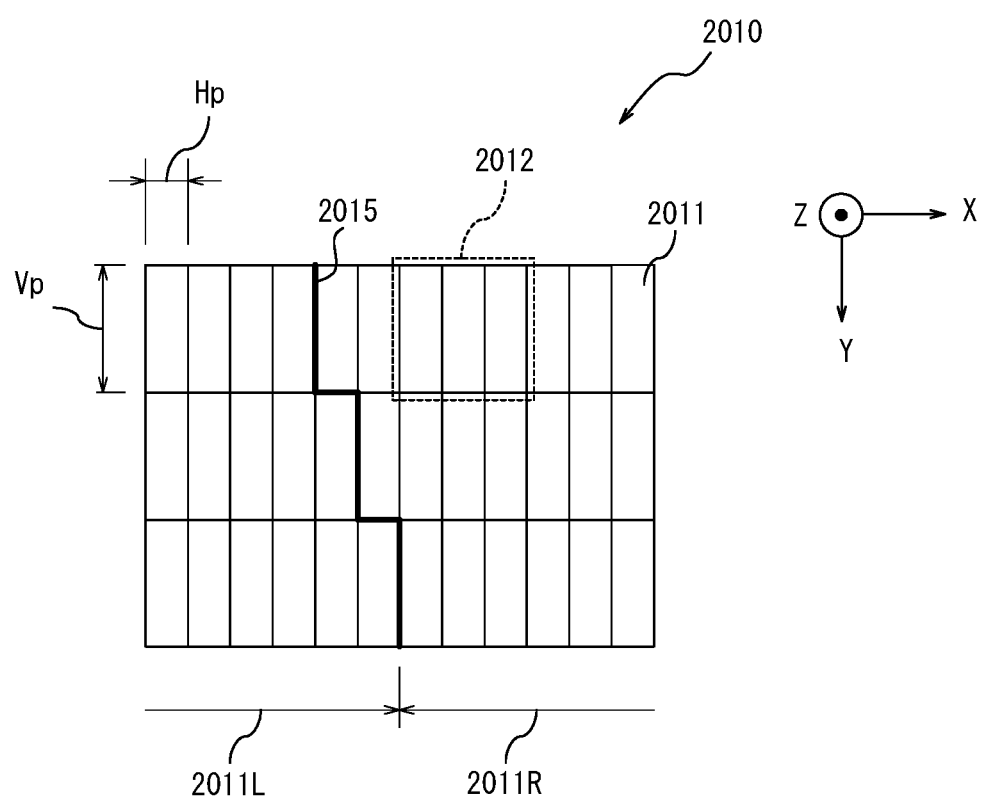
FIG. 30 is a diagram illustrating an example of the structure of a display apparatus.

The display apparatus 2010 includes subpixels 2011, as illustrated in FIG. 30 as an example. The subpixels 2011 are arranged in a grid. The grid axes representing the arrangement of the subpixels 2011 are assumed to be the X axis and the Y axis. The origin point of the X axis and the Y axis may be the center of the display surface 2010a. Each subpixel 2011 has a length in each of the X-axis direction and the Y-axis direction. The respective lengths of the subpixel 2011 in the X-axis direction and the Y-axis direction are denoted by Hp and Vp. Hereafter, it is assumed that Vp>Hp. The X-axis direction is also referred to as "horizontal direction" or "first direction". The Y-axis direction is also referred to as "vertical direction" or "second direction".

Subpixels 2011 may constitute a pixel 2012. In FIG. 30, a pixel 2012 is composed of three subpixels 2011 enclosed by dashed lines. A pixel 2012 may be composed of, for example, subpixels 2011 displaying the colors of R, G, and B. The number of subpixels 2011 constituting a pixel 2012 is not limited to three, and may be two, or four or more. In the case where the display apparatus 2010 is an LCD or an organic EL display or inorganic EL display, each pixel may correspond to a subpixel 2011 or a pixel 2012. In this embodiment, it is assumed that a pixel 2012 is composed of subpixels 2011 arranged in the horizontal direction. In other words, in this embodiment, it is assumed that the horizontal direction is a direction in which subpixels 2011 constituting a pixel 2012 are arranged.

As illustrated in FIG. 30, it is assumed that the display apparatus 2010 is used in a state in which the subpixels 2011 constituting the pixel 2012 are laterally arranged as seen from the user. In this case, the X-axis direction and the Y-axis direction correspond to the lateral direction and the longitudinal direction respectively. The ratio of the longitudinal length and lateral length of the subpixel 2011 as seen from the user is also referred to as the "aspect ratio of the subpixel 2011". In this case, the aspect ratio is Vp/Hp. Hereafter, Vp/Hp is denoted by x (x>1).

The arrangement of the subpixels 2011 is divided by a display boundary 2015 in a stepped shape indicated by thick lines. The subpixels 2011 included in one arrangement separated by the display boundary 2015 is also referred to as "first subpixels 2011L". The subpixels 2011 included in the other arrangement separated by the display boundary 2015 is also referred to as "second subpixels 2011R". The display boundary 2015 is not limited to the shape illustrated in FIG. 30, and may be in other shapes. The display apparatus 2010 displays a left-eye image in the first subpixels 2011L, and a right-eye image in the second subpixels 2011R. The display boundary 2015 is determined by the controller 2030. The display boundary 2015 may include a first display boundary indicating a range in which the first subpixels 2011L are arranged, and a second display boundary indicating a range in which the second subpixels 2011R are arranged. This makes it possible to express subpixels 2011 that are neither the first subpixels 2011L nor the second subpixels 2011R.

Figure 31:
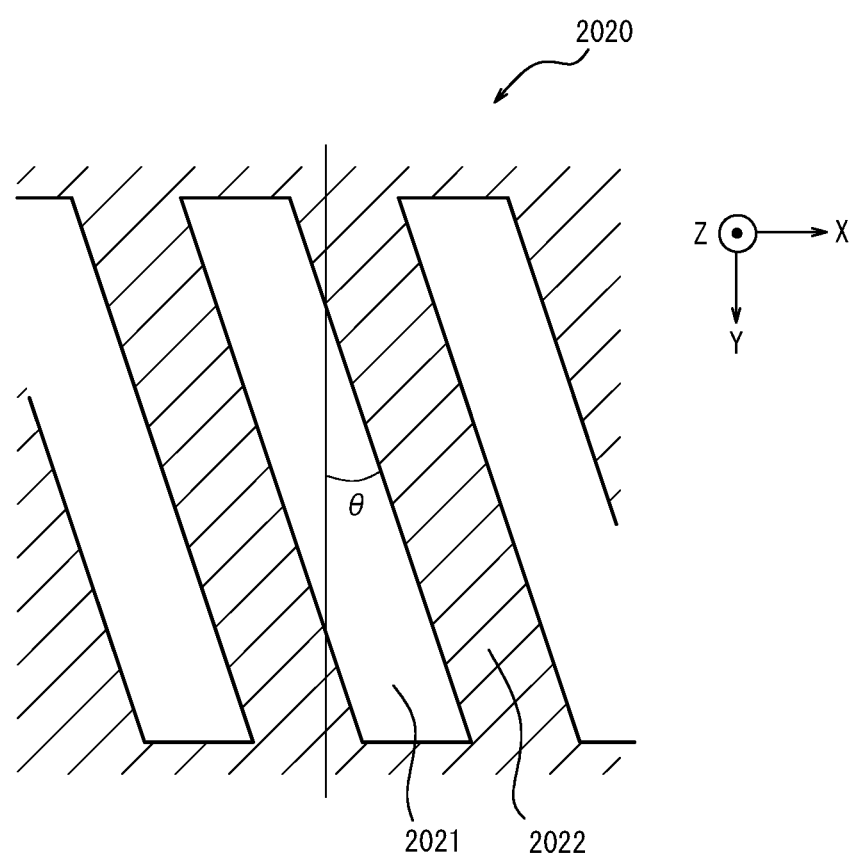
FIG. 31 is a diagram illustrating an example of the structure of a barrier.

The barrier 2020 includes light transmitting regions 2021 and light shielding regions 2022, as illustrated in FIG. 31 as an example. The X axis and the Y axis in FIG. 31 correspond to the directions of the X axis and the Y axis in FIG. 30.

The light transmitting regions 2021 are parts that transmit light incident on the barrier 2020. The light transmitting regions 2021 may transmit light at transmittance of a first certain value or more. For example, the first certain value may be 100%, or a value close to 100%. The light shielding regions 2022 are parts that shield light incident on the barrier 2020 so as not to pass through. In other words, the light shielding regions 2022 shield an image displayed by the display apparatus 2010. The light shielding region 2022 may shield light at transmittance of a second certain value or less. For example, the second certain value may be 0%, or a value close to 0%.

In FIG. 31, the light transmitting regions 2021 and the light shielding regions 2022 alternate with each other in the horizontal direction and the vertical direction. The lines indicating the edges of the light transmitting regions 2021 extend in a direction inclined from the vertical direction by a certain angle θ. The lines indicating the edges of the light transmitting regions 2021 can also be regarded as the edges of the light transmitting regions 2021. The certain angle θ is also referred to as "barrier inclination angle". θ may be an angle greater than 0 degrees and less than 90 degrees. For example, θ may be determined to satisfy $\tan\theta = a \times Hp/b \times Vp$ (a, b: natural numbers). If the edge of the light transmitting region 2021 extends in the Y-axis direction in FIG. 31 and coincides with the arrangement direction of the subpixels 2011, moire tends to be recognized in the display image due to errors contained in the arrangement of the subpixels 2011 and the dimensions of the light transmitting regions 2021. If the edge of the light transmitting region 2021 extends in the direction having the certain angle with respect to the Y-axis direction in FIG. 31, moire is hardly recognized in the display image regardless errors contained in the arrangement of the subpixels 2011 and the dimensions of the light transmitting regions 2021.

The barrier 2020 may be composed of a film or a plate member having transmittance of less than the second certain value. In this case, the light shielding regions 2022 are formed by the film or plate member, and the light transmitting regions 2021 are formed by openings in the film or plate member. The film may be made of resin, or made of other material. The platy member may be made of resin, metal, or the like, or made of other material. The barrier 2020 is not limited to a film or a plate member, and may be composed of any other type of member. The barrier 2020 may be composed of a light shielding substrate. The barrier 2020 may be composed of a substrate containing a light shielding additive.

The barrier 2020 may be composed of a liquid crystal shutter. The liquid crystal shutter can control the transmittance of light according to an applied voltage. The liquid crystal shutter may be made up of pixels, and control the transmittance of light in each pixel. The liquid crystal shutter may form a region with high transmittance of light or a region with low transmittance of light, in any shape. In the case where the barrier 2020 is composed of a liquid crystal shutter, the light transmitting regions 2021 may be regions having transmittance of the first certain value or more. In the case where the barrier 2020 is composed of a liquid crystal shutter, the light shielding regions 2022 may be regions having transmittance of the second certain value or less.

Figure 32:
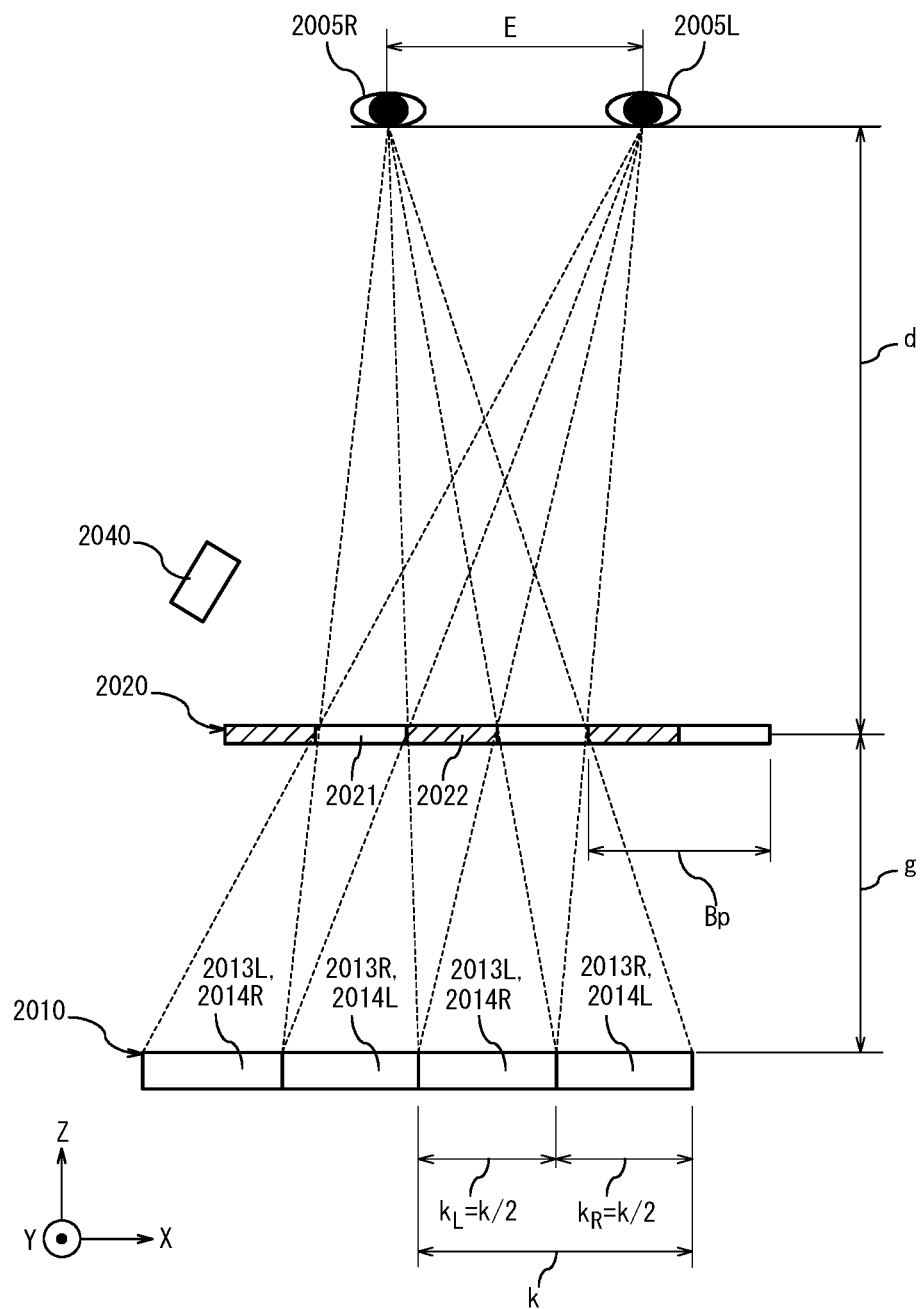
FIG. 32 is a diagram illustrating an example in which the eyes are located at a optimum viewing distance from the barrier.

As illustrated in FIG. 32, it is assumed that the left eye 2005L and the right eye 2005R of the user are located at a optimum viewing distance, denoted by d, from the barrier 2020. The optimum viewing distance is also referred to as "optical viewing distance (OVD)". The left eye 2005L and the right eye 2005R can view an image displayed by the display apparatus 2010 via the barrier 2020. The barrier 2020 includes the light transmitting regions 2021 shown as blank and the light shielding regions 2022 shown as hatched. The light transmitting regions 2021 and the light shielding regions 2022 alternate with each other in the X-axis direction. The pitch with which the light transmitting regions 2021 and the light shielding regions 2022 alternate is denoted by Bp. The distance between the left eye 2005L and the right eye 2005R is also referred to as "interocular distance", and is donated by E. The distance from the barrier 2020 to the display apparatus 2010 is donated by g.

The display apparatus 2010 includes left-eye visible regions 2013L and right-eye visible regions 2013R visible respectively to the left eye 2005L and the right eye 2005R of the user via the light transmitting regions 2021. The display apparatus 2010 includes left-eye light shielding regions 2014L and right-eye light shielding regions 2014R that are made not visible respectively to the left eye 2005L and the right eye 2005R of the user by the light shielding regions 2022. The lines indicating the edges of the left-eye visible regions 2013L and the right-eye visible regions 2013R correspond to the lines indicating the edges of the light transmitting regions 2021. The lines indicating the edges of the left-eye light shielding regions 2014L and the right-eye light shielding regions 2014R correspond to the lines indicating the edges of the light shielding regions 2022. The display boundary 2015 may be located along the line indicating the edge of each of the left-eye visible region 2013L and the right-eye visible region 2013R. That is, the display boundary 2015 may be located along the edge of the light transmitting region 2021.

In the example in FIG. 32, the following assumption is further made. The light transmitting region 2021 and the light shielding region 2022 have the same width, denoted by Bp/2, in the X-axis direction. In the portrait mode, the ratio of the width of the light transmitting region 2021 in the X-axis direction to the width of the light transmitting region 2021 and the light shielding region 2022 in the X-axis direction can be regarded as an opening ratio. In the example in FIG. 32, the opening ratio of the barrier 2020 is (Bp/2)/Bp, i.e. 50%. In the landscape mode, the ratio of the width of the light transmitting region 2021 in the X-axis direction to the width of the light transmitting region 2021 and the light shielding region 2022 in the X-axis direction can be regarded as an opening ratio.

The pitch with which the left-eye visible regions 2013L and the right-eye visible regions 2013R alternate is denoted by k. The left-eye visible region 2013L and the right-eye visible region 2013R respectively have widths $k_L$ and $k_R$ in the X-axis direction. In the portrait mode, the left-eye visible region 2013L includes m subpixels successive along the horizontal direction. In the portrait mode, the right-eye visible region 2013R includes m successive subpixels. When $\tan\theta = a \times Hp/b \times Vp$, k satisfies a formula $k = 2$ mHp/b. In the landscape mode, the left-eye visible region 2013L includes j successive subpixels. In the portrait mode, the right-eye visible region 2013R includes j successive subpixels. When $\tan\theta = (a \times Hp)/(b \times Vp) = (a \times Vp)/(b \times x^2 \times Hp)$, k satisfies a formula $k = 2 \times j \times Vp/(b \times x^2)$. At the OVD, $k_L$ and $k_R$ are both expressed as k/2. At the OVD, the left-eye visible regions 2013L and the right-eye visible regions 2013R alternate without a spacing. At the OVD, the left-eye visible region 2013L and the right-eye light shielding region 2014R overlap with each other. At the OVD, the right-eye visible region 2013R and the left-eye light shielding region 2014L overlap with each other.

The relationships among E, k, d, and g illustrated in FIG. 32 are geometrically determined. The ratio of E and k/2 is equal to the ratio of d and g. In other words, the relationship of Formula (3-1) holds:

$$E:k/2=d:g \quad (3\text{-}1).$$

The relationships among Bp, k, d, and g illustrated in FIG. 32 are geometrically determined. The ratio of Bp and k is equal to the ratio of d and (d+g). In other words, the relationship of Formula (3-2) holds:

$$Bp:k=d:(d+g) \quad (3\text{-}2).$$

In the case where the light transmitting region 2021 and the light shielding region 2022 have different widths, $k_L$ and $k_R$ are each different from k/2. In the case where the light transmitting region 2021 is narrower in width than the light shielding region 2022, $k_L$ and $k_R$ are each less than k/2. In such a case, the left-eye visible region 2013L and the right-eye visible region 2013R are arranged with a spacing. As a result of the left-eye visible region 2013L and the right-eye visible region 2013R being arranged with a spacing, crosstalk caused by a right-eye image reaching the left eye 2005L or a left-eye image reaching the right eye 2005R can be reduced. In the case where the light transmitting region 2021 is greater in width than the light shielding region 2022, $k_L$ and $k_R$ are each greater than k/2. In such a case, the left-eye visible region 2013L and the right-eye visible region 2013R partially overlap with each other. As a result of the left-eye visible region 2013L and the right-eye visible region 2013R partially overlapping with each other, crosstalk occurs. Here, k also represents the pitch of the left-eye visible region 2013L or the right-eye visible region 2013R. Hereafter, the pitch of the left-eye visible region 2013L or the right-eye visible region 2013R is also referred to as "visible region pitch".

In the case where the distance between each of the left eye 2005L and the right eye 2005R and the barrier 2020 is different from the optimum viewing distance, $k_L$ and $k_R$ are each not limited to k/2. For example, in the case where the distance between each of the left eye 2005L and the right eye 2005R and the barrier 2020 is longer than the optimum viewing distance, $k_L$ and $k_R$ are each less than k/2. In such a case, the left-eye visible region 2013L and the right-eye visible region 2013R may be arranged with a spacing. For example, in the case where the distance between each of the left eye 2005L and the right eye 2005R and the barrier 2020 is shorter than the optimum viewing distance, $k_L$ and $k_R$ are each greater than k/2. In such a case, the left-eye visible region 2013L and the right-eye visible region 2013R may partially overlap with each other.

Figure 33:
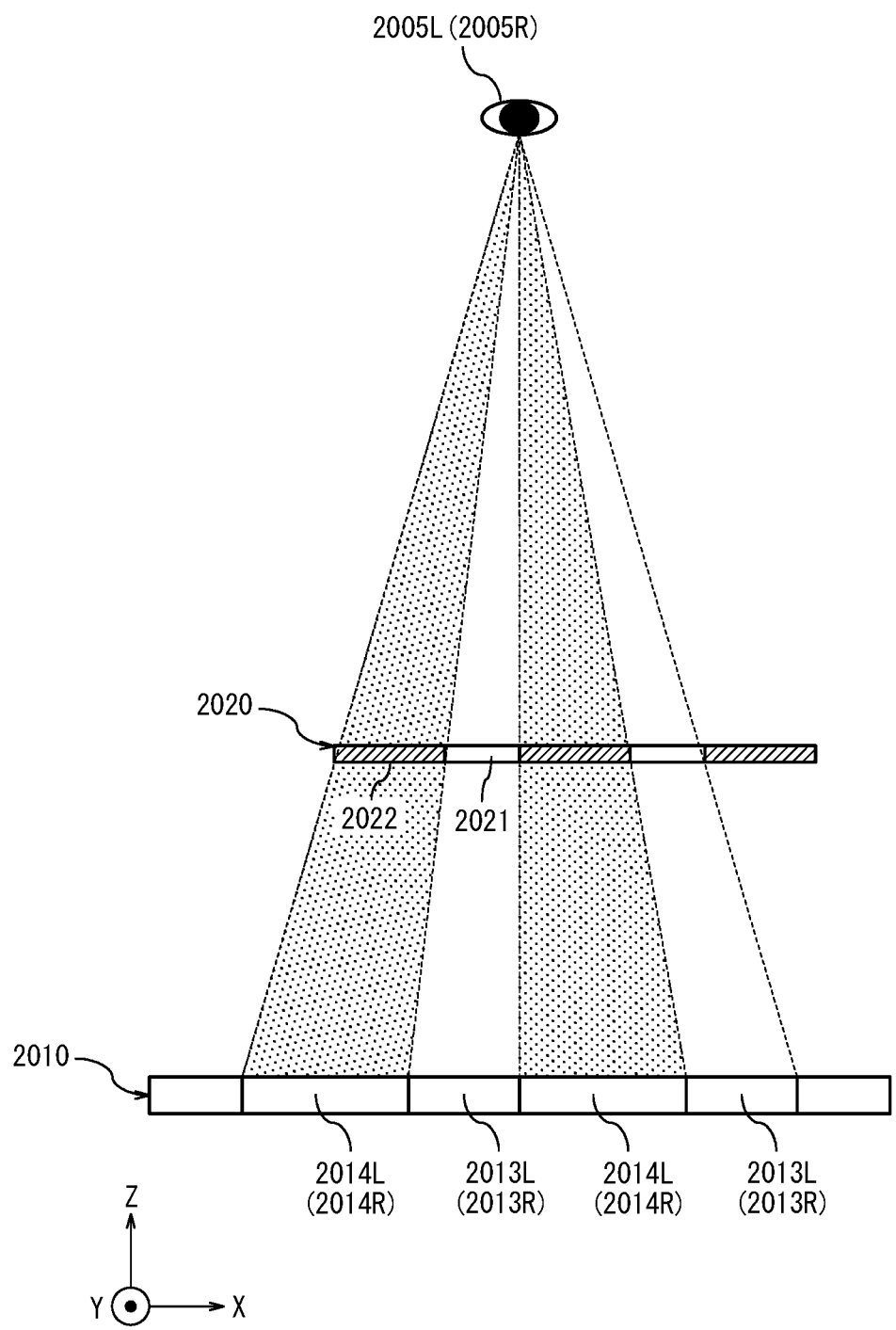
FIG. 33 is a diagram illustrating an example of a visible region and a light shielding region on the display apparatus.

As illustrated in FIG. 33, the display apparatus 2010 as seen from the left eye 2005L has the left-eye visible region 2013L and the left-eye light shielding region 2014L. An image displayed in the left-eye visible region 2013L is visible to the left eye 2005L. Meanwhile, an image displayed in the left-eye light shielding region 2014L shielded by the light shielding region 2022 as indicated by hatching is not visible to the left eye 2005L. In FIG. 33, the left eye 2005L, the left-eye visible region 2013L, and the left-eye light shielding region 2014L can be replaced with the right eye 2005R, the right-eye visible region 2013R, and the right-eye light shielding region 2014R, respectively. The display apparatus 2010 as seen from the right eye 2005R has the right-eye visible region 2013R and the right-eye light shielding region 2014R. An image displayed in the right-eye visible region 2013R is visible to the right eye 2005R. Meanwhile, an image displayed in the right-eye light shielding region 2014R shielded by the light shielding region 2022 as indicated by hatching is not visible to the right eye 2005R.

Figure 34:
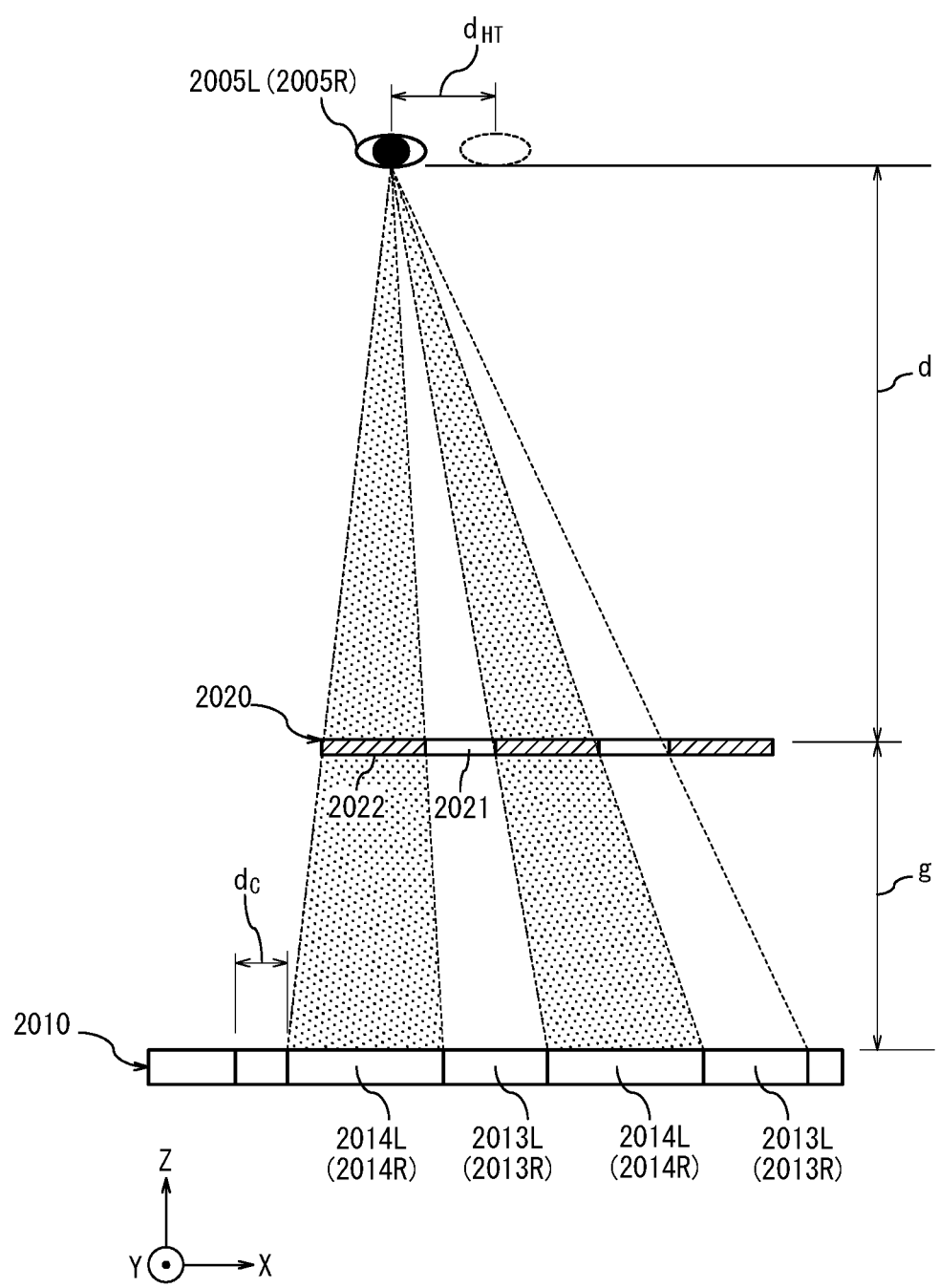
FIG. 34 is a diagram illustrating an example of a visible region and a light shielding region on the display apparatus.

As illustrated in FIG. 34, in the case where the left eye 2005L moves in the negative direction of the X axis by $d_{HT}$, the left-eye visible region 2013L and the left-eye light shielding region 2014L in the display apparatus 2010 move in the positive direction of the X axis by $d_C$. In FIG. 34, the left eye 2005L can be replaced with the right eye 2005R. In the case where the right eye 2005R moves in the negative direction of the X axis by $d_{HT}$, the right-eye visible region 2013R and the right-eye light shielding region 2014R in the display apparatus 2010 move in the positive direction of the X axis by $d_C$.

Figure 35:
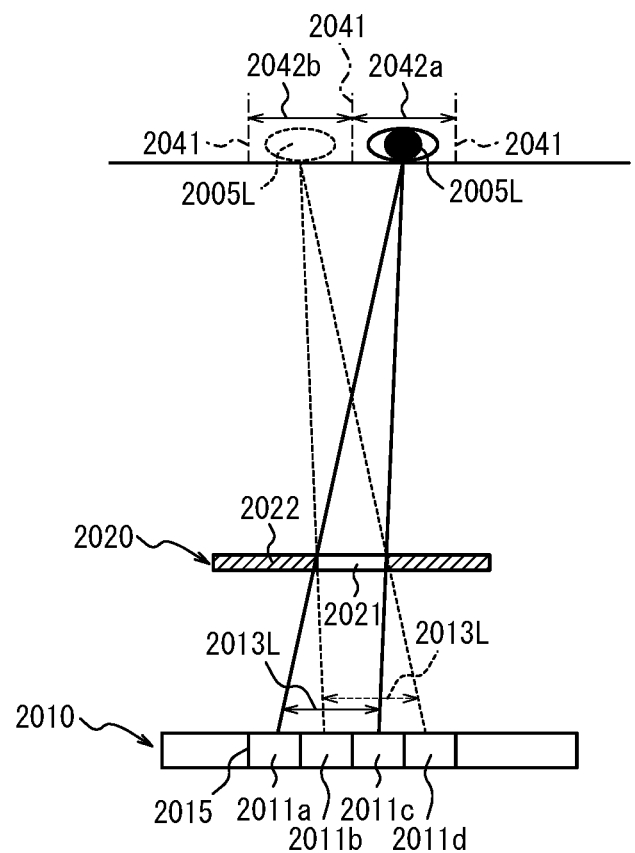
FIG. 35 is a diagram illustrating an example of the correlation between the HT boundary and the display boundary.

As illustrated in FIG. 35, the controller 2030 virtually sets, in a certain plane, head tracking boundaries 2041 arranged in the X-axis direction based on the shape of the light transmitting region 2021 of the barrier 2020. The certain plane is assumed to be parallel to a plane in which the barrier 2020 is located, and away from the barrier 2020 by the OVD. The head tracking boundaries 2041 are also referred to as "HT boundaries 2041". The left eye 2005L or the right eye 2005R is located in any of head tracking regions 2042 defined by the HT boundaries 2041. The head tracking regions 2042 are also referred to as "HT regions 2042".

The first subpixels 2011L included in the left-eye visible region 2013L are determined depending on the HT region 2042 in which the left eye 2005L is located. For example, in the case where the left eye 2005L is located in a HT region 2042a, the left-eye visible region 2013L indicated by the solid arrow includes subpixels 2011a, 2011b, and 2011c. That is, the subpixels 2011a, 2011b, and 2011c are the first subpixels 2011L. In the case where the left eye 2005L is located in a HT region 2042b, the left-eye visible region 2013L indicated by the dashed arrow includes subpixels 2011b, 2011c, and 2011d. That is, the subpixels 2011b, 2011c, and 2011d are the first subpixels 2011L.

The interval of the HT boundaries 2041 is expressed as $I_{HT}=Hp \times d/g$, using Hp in FIG. 30, etc. and d and g in FIG. 34, etc. In FIG. 35, the left eye 2005L can be replaced with the right eye 2005R. The HT boundaries 2041 are assumed for each of the left eye 2005L and the right eye 2005R. The HT region 2042 is assumed for each of the left eye 2005L and the right eye 2005R.

In the case where the left-eye visible region 2013L and the right-eye visible region 2013R move in response to the movement of the left eye 2005L and the right eye 2005R, the three-dimensional display system 2001 moves the image displayed by the display apparatus 2010 to keep providing stereoscopic vision to the user. The controller 2030 acquires the positions of the left eye 2005L and the right eye 2005R from the detection apparatus 2040. Based on the positions of the left eye 2005L and the right eye 2005R, the controller 2030 determines the display boundary 2015 so that the first subpixels 2011L and the second subpixels 2011R are respectively located in the left-eye visible region 2013L and the right-eye visible region 2013R. In other words, when each of the left eye 2005L and the right eye 2005R passes across the HT boundary 2041, the controller 2030 moves the display boundary 2015 in the X-axis direction by one subpixel.

In the case where the distance $d_C$ of the movement of the left-eye visible region 2013L and the right-eye visible region 2013R in response to the movement of the left eye 2005L and the right eye 2005R reaches Hp which is the length of the subpixel 2011 in the horizontal direction, the controller 2030 may move the left-eye image and the and right-eye image displayed by the display apparatus 2010 by one subpixel 2011. In other words, when the moving distance of the left eye 2005L and the right eye 2005R reaches a control distance indicating the condition for moving the display boundary 2015, the controller 2030 may move the display boundary 2015 by one subpixel 2011. In this case, the controller 2030 may acquire, as the moving distance, the distance from the HT boundary 2041 to each of the left eye 2005L and the right eye 2005R. The control distance is expressed as $D_{HT}=(Hp \times d)/(g \times b)$, using d and g in FIGS. 32 and 34.

Figure 36:
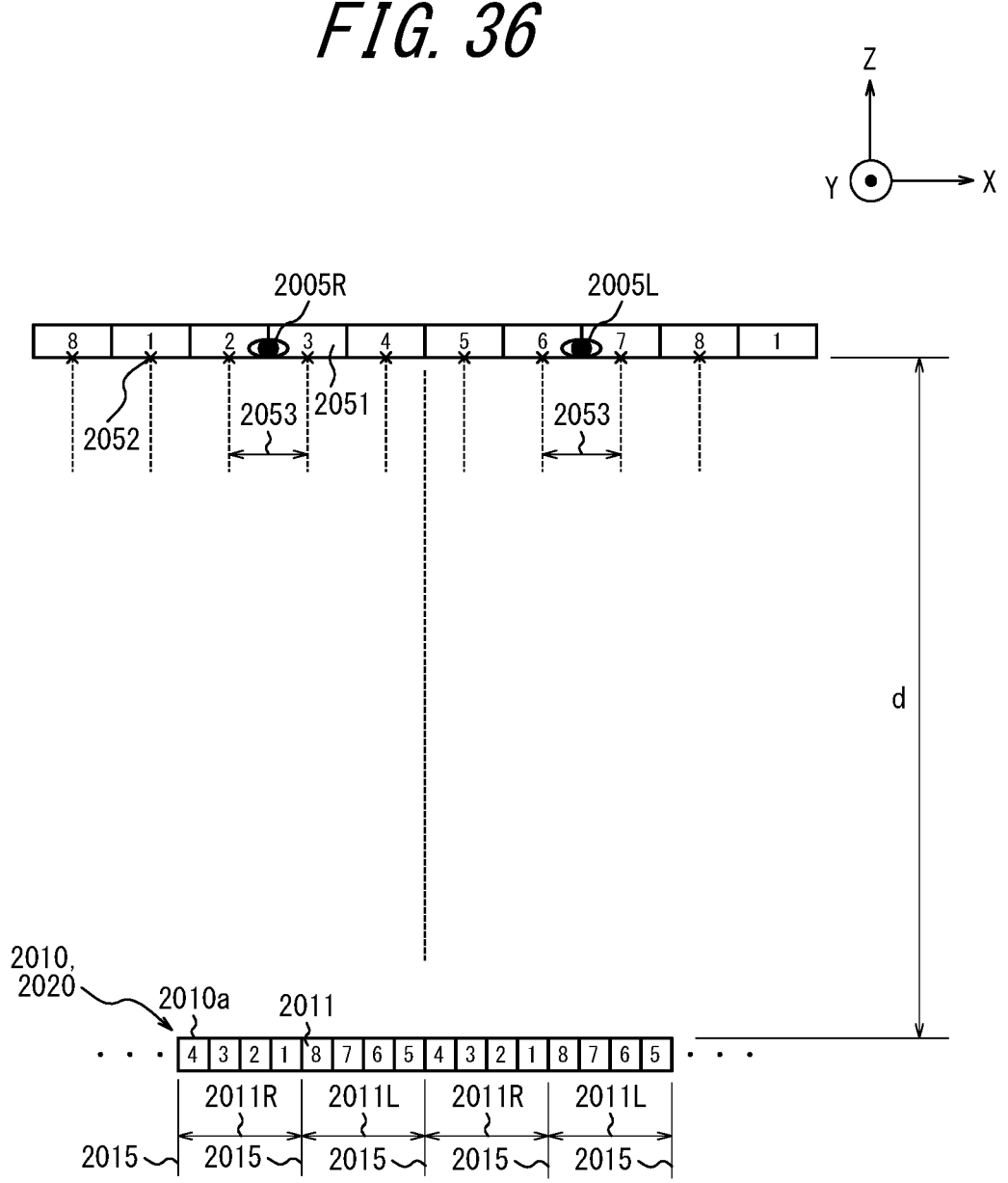
FIG. 36 is a diagram illustrating an example of a dot region and a control region in a optimum viewing distance plane.

As illustrated in FIG. 36, the display apparatus 2010 includes first subpixels 2011L for displaying a left-eye image and second subpixels 2011R for displaying a right-eye image. The first subpixels 2011L and the second subpixels 2011R are separated by the display boundary 2015. Four first subpixels 2011L and four second subpixels 2011R are arranged in the X-axis direction. The eight subpixels 2011 have respective numbers 1 to 8. The number which each subpixel 2011 has is also referred to as the "number of the subpixel 2011". The first subpixels 2011L have numbers 5 to 8. The second subpixels 2011R have numbers 1 to 4. The left-eye image and the right-eye image are repeatedly displayed in a period of eight subpixels 2011. The number of first subpixels 2011L and the number of second subpixels 2011R are the same. The period of the numbers of the subpixels 2011 is twice the number of first subpixels 2011L or second subpixels 2011R successively arranged. The number of first subpixels 2011L or second subpixels 2011R successively arranged may be a certain number. The certain number is not limited to four, and may be three or less, or five or more. The left-eye image and the right-eye image may be repeatedly displayed in a period of the number of subpixels 2011 twice the certain number.

In FIG. 36, it is assumed that the barrier 2020 is included in the display surface 2010a of the display apparatus 2010. It is assumed that the gap g (see FIGS. 32 and 34) between the display apparatus 2010 and the barrier 2020 is sufficiently small as compared with the distance d from the left eye 2005L and the right eye 2005R to the display surface 2010a of the display apparatus 2010 and is negligible. The following description is based on this assumption.

In FIG. 36, the observation distance is assumed to be equal to d indicating the optimum viewing distance. At the positions of the left eye 2005L and the right eye 2005R, regions corresponding to the first subpixels 2011L and the second subpixels 2011R on the display surface 2010a of the display apparatus 2010 are virtually provided. The regions virtually provided at the positions of the left eye 2005L and the right eye 2005R are also referred to as "dot regions 2051". The dot regions 2051 are provided depending on the interocular distance. In FIG. 36, the left-eye image and the right-eye image are displayed in a period of eight subpixels 2011. In this case, four dot regions 2051 are allocated to each of the left eye 2005L and the right eye 2005R. Given that four dot regions 2051 are located between the left eye 2005L and the right eye 2005R, the width of the dot region 2051 in the X-axis direction is calculated at ¼ of the interocular distance. The period in which the left-eye image and the right-eye image are displayed is not limited to eight. The number of dot regions 2051 allocated to each of the left eye 2005L and the right eye 2005R is not limited to four. The width of the dot region 2051 in the X-axis direction is calculated by dividing the interocular distance by the number of dot regions 2051 allocated to each of the left eye 2005L and the right eye 2005R.

The dot regions 2051 have numbers corresponding to the numbers of the subpixels 2011. The dot regions 2051 illustrated in FIG. 36 have numbers 1 to 8. In the case where the right eye 2005R is located between the dot regions 2051 of numbers 2 and 3, the subpixels 2011 of numbers 1, 2, 3, and 4 are the second subpixels 2011R for displaying the right-eye image. In the case where the left eye 2005L is located between the dot regions 2051 of numbers 6 and 7, the subpixels 2011 of numbers 5, 6, 7, and 8 are the first subpixels 2011L for displaying the left-eye image. Thus, the dot regions 2051 correspond to the numbers of the subpixels 2011 included in the right-eye visible region 2013R and the left-eye visible region 2013L. The subpixel 2011 of the number corresponding to the number of the dot region 2051 in which the right eye 2005R is located is included in the right-eye visible region 2013R. The subpixel 2011 of the number corresponding to the number of the dot region 2051 in which the left eye 2005L is located is included in the left-eye visible region 2013L.

At the center of the dot region 2051 in the X-axis direction, a control boundary 2052 indicated by the "x" mark is set. Each region defined by control boundaries 2052 is referred to as "control region 2053". While the left eye 2005L is in the same control region 2053, the numbers of the subpixels 2011 as the first subpixels 2011L are unchanged. Likewise, while the right eye 2005R is in the same control region 2053, the numbers of the subpixels 2011 as the second subpixels 2011R are unchanged. In the case where the left eye 2005L moves to a different control region 2053, the controller 2030 changes the numbers of the subpixels 2011 as the first subpixels 2011L. Likewise, in the case where the right eye 2005R moves to a different control region 2053, the controller 2030 changes the numbers of the subpixels 2011 as the second subpixels 2011R.

For example, suppose the right eye 2005R moves from the control region 2053 including the boundary between the dot regions 2051 of numbers 2 and 3 to the control region 2053 including the boundary between the dot regions 2051 of numbers 3 and 4. In this case, the left eye 2005L moves from the control region 2053 including the boundary between the dot regions 2051 of numbers 6 and 7 to the control region 2053 including the boundary between the dot regions 2051 of numbers 7 and 8. When the left eye 2005L and the right eye 2005R each cross over the control boundary 2052, the controller 2030 changes the position of the display boundary 2015, thus changing the numbers of the subpixels 2011 as the first subpixels 2011L and the second subpixels 2011R. After the movement of the display boundary 2015, the subpixels 2011 of numbers 2, 3, 4, and 5 are the second subpixels 2011R, and the subpixels 2011 of numbers 6, 7, 8, and 1 are the first subpixels 2011L.

In FIG. 36, the dot region 2051 and the control region 2053 are each indicated as a line segment extending in the X-axis direction. The dot region 2051 and the control region 2053 also extend toward the front and back of the surface of paper. Thus, the dot region 2051 and the control region 2053 are planes extending in the X-axis and Y-axis directions. In FIG. 36, the control boundary 2052 is indicated as a midpoint of the line segment representing the dot region 2051 or an end point of the line segment representing the control region 2053. The control boundary 2052 also extends toward the front and back of the surface of paper. Thus, the control boundary 2052 is a line having a component in the Y-axis direction.

The left eye 2005L and the right eye 2005R can move in a plane that is away from the display surface 2010a of the display apparatus 2010 by the optimum viewing distance and perpendicular to the Z-axis direction. The plane that is away from the display surface 2010a by the optimum viewing distance and perpendicular to the Z-axis direction is also referred to as "optimum viewing distance plane 2054" (see FIG. 41). The dot region 2051, the control boundary 2052, and the control region 2053 extend in the same direction as the direction in which the edge of the light transmitting region 2021 of the barrier 2020 extends, in the optimum viewing distance plane 2054.

In the case where the left eye 2005L is away from the display surface 2010a by the optimum viewing distance, the numbers of the subpixels 2011 as the first subpixels 2011L are repeated for all subpixels 2011 of the display surface 2010a. Likewise, in the case where the right eye 2005R is away from the display surface 2010a by the optimum viewing distance, the numbers of the subpixels 2011 as the second subpixels 2011R are repeated for all subpixels 2011 of the display surface 2010a.

Figure 37:
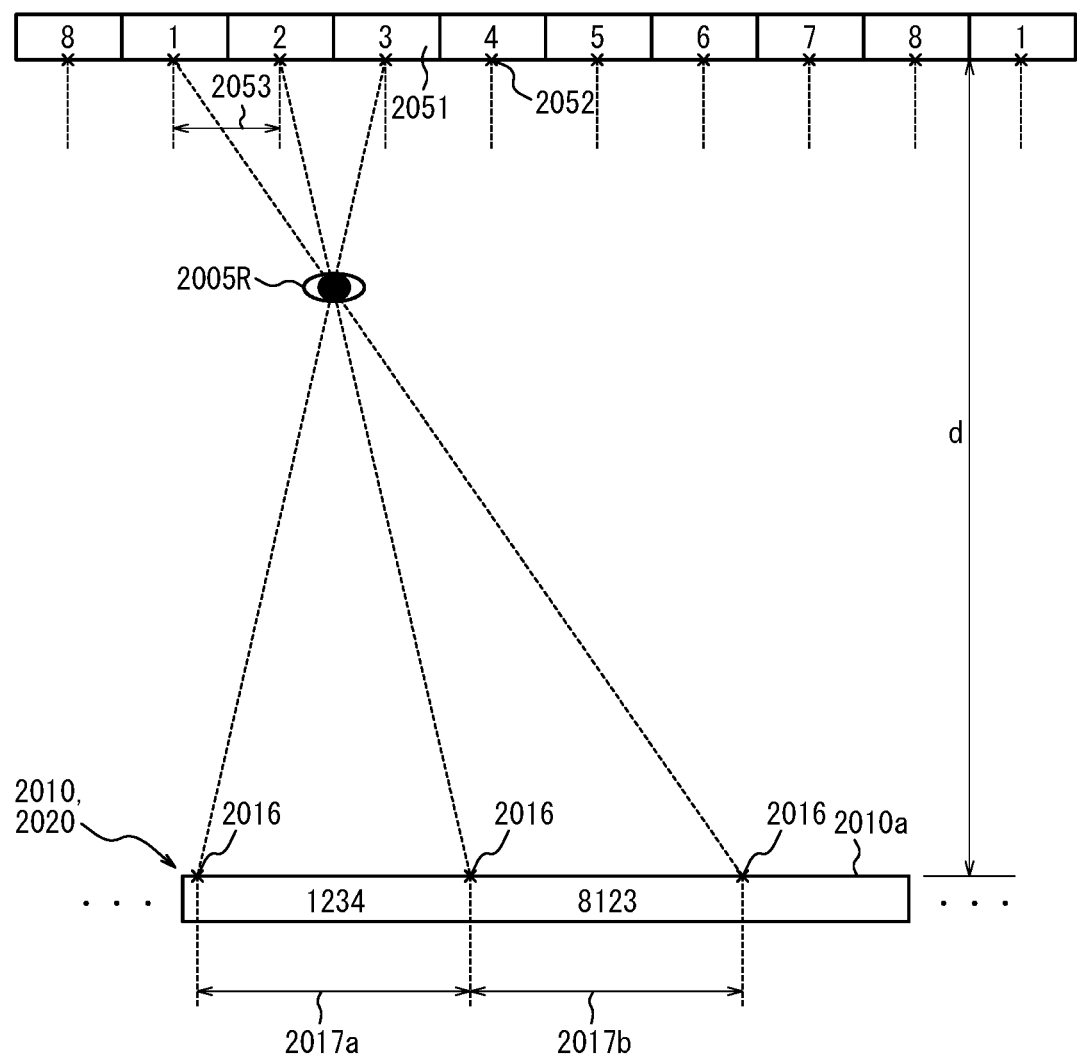
FIG. 37 is a diagram illustrating an example of a right eye display same region in the case where an observation distance is closer than a optimum viewing distance.

As illustrated in FIG. 37, in the case where the observation distance is shorter than the optimum viewing distance, right-eye image same regions 2017 are provided on the display surface 2010a of the display apparatus 2010. The right-eye image same regions 2017 are regions obtained by dividing the display surface 2010a in the horizontal direction. In other words, the controller 2030 divides the display surface 2010a into divided regions arranged in the horizontal direction. The right-eye image same regions 2017 are separated by a right-eye image same boundary 2016. The right-eye image same boundary 2016 is a point at which a line extending from the control boundary 2052 included in each dot region 2051 through the right eye 2005R intersects with the display surface 2010a of the display apparatus 2010. For example, the region defined by the right-eye image same boundaries 2016 specified by the extensions from the control boundaries 2052 respectively included in the dot regions 2051 of numbers 2 and 3 is a right-eye image same region 2017a. The region defined by the right-eye image same boundaries 2016 specified by the extensions from the control boundaries 2052 respectively included in the dot regions 2051 of numbers 1 and 2 is a right-eye image same region 2017b.

The right eye 2005R in FIG. 37 can be replaced with the left eye 2005L. In the case where the right eye 2005R in FIG. 37 can be replaced with the left eye 2005L, the right-eye image same boundary 2016 and the right-eye image same region 2017 are respectively replaced with the left-eye image same boundary and the left-eye image same region. The right-eye image same region 2017 and the left-eye image same region may overlap with each other on the display surface 2010a. The interval of the right-eye image same boundary 2016 or the interval of the left-eye image same boundary along the horizontal direction are also referred to as "certain pitch".

The right-eye visible region 2013R located in the right-eye image same region 2017a includes the subpixels 2011 of numbers 1, 2, 3, and 4. Accordingly, the controller 2030 sets the subpixels 2011 of numbers 1, 2, 3, and 4 as the second subpixels 2011R, in the right-eye image same region 2017a. The right-eye visible region 2013R located in the right-eye image same region 2017b includes the subpixels 2011 of numbers 8, 1, 2, and 3. Accordingly, the controller 2030 sets the subpixels 2011 of numbers 8, 1, 2, and 3 as the second subpixels 2011R, in the right-eye image same region 2017b. Thus, the numbers of the subpixels 2011 as the second subpixels 2011R are different between the right-eye image same regions 2017a and 2017b.

In the case where the display surface 2010a is viewed from the right eye 2005R, the right-eye image same regions 2017 are located on the display surface 2010a. In the case where the display surface 2010a is viewed from the left eye 2005L, the left-eye image same regions are located on the display surface 2010a. The left-eye image same regions are specified depending on the position of the left eye 2005L, as with the right-eye image same regions 2017. The left-eye image same regions are divided regions, as with the right-eye image same regions 2017.

The right-eye visible region 2013R and the left-eye visible region 2013L are located in the right-eye image same regions 2017a and 2017b. The left-eye visible region 2013L located in the right-eye image same regions 2017a and 2017b is simultaneously located in the left-eye image same regions. The numbers of the subpixels 2011 included in the left-eye visible region 2013L are determined depending on the numbers of the dot regions 2051 corresponding to the left-eye image same region.

The numbers of the subpixels 2011 included in the left-eye visible region 2013L may overlap with the numbers of the subpixels 2011 included in the right-eye visible region 2013R. That is, the controller 2030 may be in a state of simultaneously instructing one subpixel 2011 to display a left-eye image and display a right-eye image. In a state of simultaneously instructing one subpixel 2011 to display a left-eye image and display a right-eye image, the controller 2030 may set the subpixel 2011 preferentially as a first subpixel 2011L, or set the subpixel 2011 preferentially as a second subpixel 2011R. In a state of simultaneously instructing one subpixel 2011 to display a left-eye image and display a right-eye image, the controller 2030 may display neither the left-eye image nor the right-eye image in the subpixel 2011.

Meanwhile, there may be a subpixel 2011 not included in any of the right-eye visible region 2013R and the left-eye visible region 2013L. The controller 2030 may display an image to be displayed on the assumption that the right eye 2005R and the left eye 2005L are at the optimum viewing distance, in the subpixel 2011 not included in any of the right-eye visible region 2013R and the left-eye visible region 2013L. The controller 2030 may display neither the right-eye image nor the left-eye image in the subpixel 2011 not included in any of the right-eye visible region 2013R and the left-eye visible region 2013L.

In the right-eye image same region 2017a, the second display boundary indicating the position of the second subpixels 2011R is located between the subpixels 2011 of numbers 8 and 1 and between the subpixels 2011 of numbers 4 and 5. The second display boundary located between the subpixels 2011 of numbers 8 and 1 is periodically provided in the horizontal direction in a period of eight subpixels 2011. The second display boundary located between the subpixels 2011 of numbers 4 and 5 is periodically provided in the horizontal direction in a period of eight subpixels 2011. The display boundary 2015 including the second display boundary can be regarded as being provided in a period of twice the certain number. The periodic arrangement of the display boundary 2015 can be distinguished by a phase indicating the numbers of the subpixels 2011 between which the display boundary 2015 is located. It is assumed that the phase of the display boundary 2015 located between the subpixels 2011 of numbers 8 and 1 is number 1. It is equally assumed that the phase of the display boundary 2015 located between the subpixels 2011 of numbers 4 and 5 is number 5.

In the right-eye image same region 2017b, the second display boundary indicating the position of the second subpixels 2011R is located between the subpixels 2011 of numbers 7 and 8 and between the subpixels 2011 of numbers 3 and 4. Hence, in the right-eye image same region 2017b, the phase of the display boundary 2015 including the second display boundary is number 8 or 4.

The phase of the display boundary 2015 in the right-eye image same region 2017b is shifted by one subpixel 2011 in the negative direction of the X axis with respect to the phase of the display boundary 2015 in the right-eye image same region 2017a. The phase of the display boundary 2015 in the right-eye image same region 2017a is also referred to as "first phase". The phase of the display boundary 2015 in the right-eye image same region 2017b adjacent to the right-eye image same region 2017a is also referred to as "second phase". The second phase may be different from the first phase. The second phase may be shifted by one subpixel 2011 with respect to the first phase.

Figure 38:
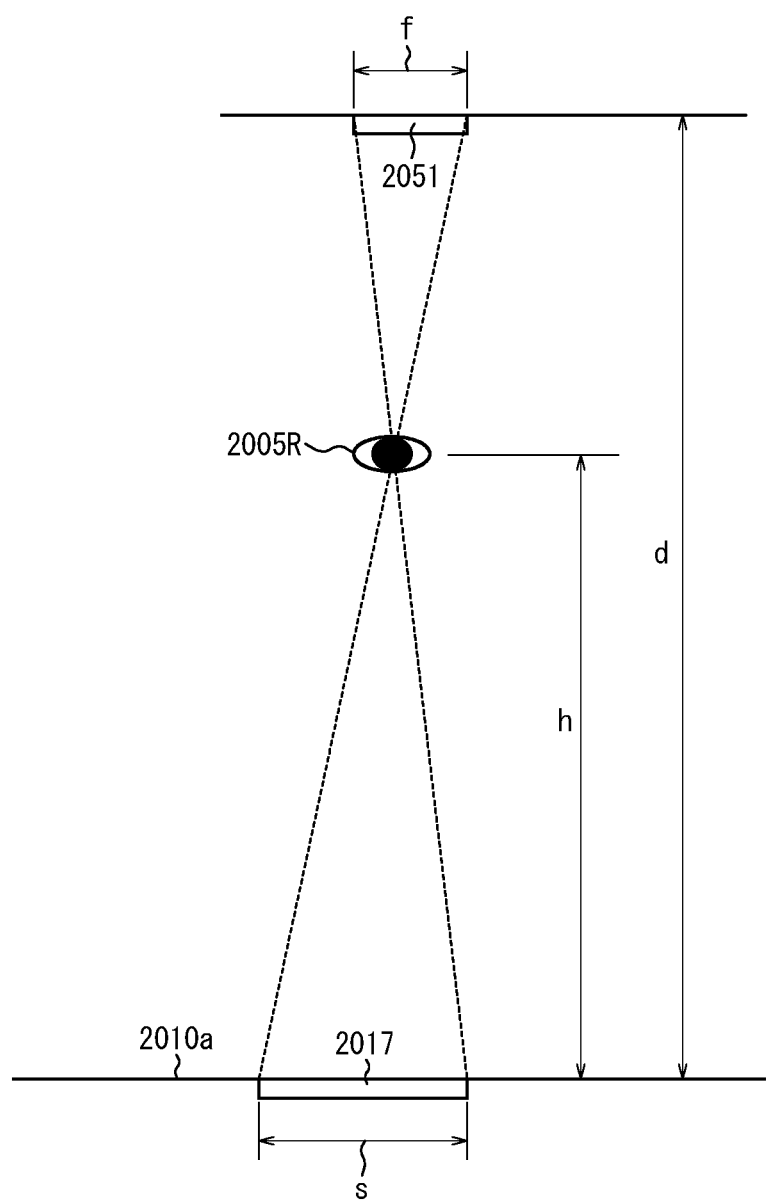
FIG. 38 is a diagram illustrating the width of the right eye display same region in the case where the observation distance is shorter than the optimum viewing distance.

The size of the right-eye image same region 2017 in the X-axis direction in the case where the observation distance is shorter than the optimum viewing distance is expressed by the observation distance and the optimum viewing distance, as illustrated in FIG. 38. The sizes of the dot region 2051 and the right-eye image same region 2017 in the X-axis direction are respectively denoted by f and s. The observation distance and the optimum viewing distance are respectively denoted by h and d. In this case, the size of the right-eye image same region 2017 in the X-axis direction is expressed by the following Formula (3-3):

$$s = f \times h/(d-h) \qquad (3\text{-}3)$$

Figure 39:
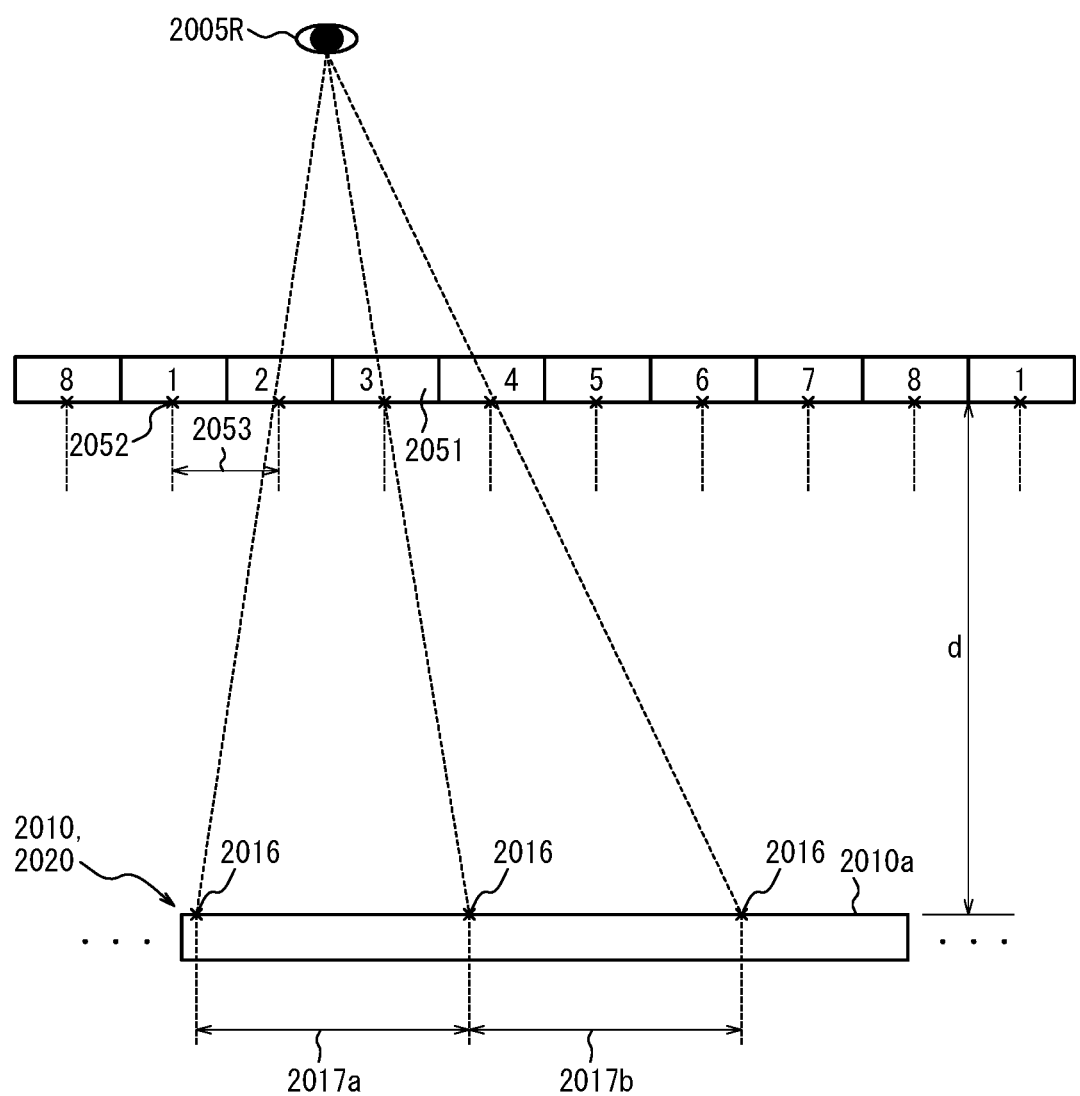
FIG. 39 is a diagram illustrating an example of a right eye display same region in the case where the observation distance is longer than the optimum viewing distance.

As illustrated in FIG. 39, in the case where the observation distance is longer than the optimum viewing distance, too, the right-eye image same regions 2017 are provided on the display surface 2010a of the display apparatus 2010, as in the example in FIG. 37. In FIG. 39, the right-eye image same boundary 2016 is a point at which a line extending from the right eye 2005R through the control boundary 2052 included in each dot region 2051 intersects with the display surface 2010a of the display apparatus 2010. For example, the region defined by the right-eye image same boundaries 2016 specified by the extensions from the right eye 2005R through the control boundaries 2052 respectively included in the dot regions 2051 of numbers 2 and 3 is a right-eye image same region 2017a. The region defined by the right-eye image same boundaries 2016 specified by the extensions from the right eye 2005R through the control boundaries 2052 respectively included in the dot regions 2051 of numbers 3 and 4 is a right-eye image same region 2017c.

In the right-eye image same region 2017a, the subpixels 2011 of numbers 1, 2, 3, and 4 are visible to the right eye 2005R. Accordingly, the controller 2030 sets the subpixels 2011 of numbers 1, 2, 3, and 4 as the second subpixels 2011R, in the right-eye image same region 2017a. In the right-eye image same region 2017c, the subpixels 2011 of numbers 2, 3, 4, and 5 are visible to the right eye 2005R. Accordingly, the controller 2030 sets the subpixels 2011 of numbers 2, 3, 4, and 5 as the second subpixels 2011R, in the right-eye image same region 2017c.

In the right-eye image same region 2017c, the second display boundary indicating the position of the second subpixels 2011R is located between the subpixels 2011 of numbers 1 and 2 and between the subpixels 2011 of numbers 5 and 6. Hence, in the right-eye image same region 2017b, the phase of the display boundary 2015 including the second display boundary is number 2 or 6. The phase of the display boundary 2015 in the right-eye image same region 2017c is shifted by one subpixel 2011 in the positive direction of the X axis with respect to the phase of the display boundary 2015 in the right-eye image same region 2017a. The phase of the display boundary 2015 in the right-eye image same region 2017c adjacent to the right-eye image same region 2017a may be referred to as "second phase". The direction in which the second phase moves with respect to the first phase in the case where the observation distance is shorter than the optimum viewing distance and the direction in which the second phase moves with respect to the first phase in the case where the observation distance is longer than the optimum viewing distance are opposite to each other.

The numbers of the second subpixels 2011R in the right-eye image same region 2017b in FIG. 37 are smaller by 1 than the numbers of the second subpixels 2011R in the right-eye image same region 2017a. On the other hand, the numbers of the second subpixels 2011R in the right-eye image same region 2017c in FIG. 39 are larger by 1 than the numbers of the second subpixels 2011R in the right-eye image same region 2017a. That is, the direction of change of the numbers of the second subpixels 2011R between adjacent right-eye image same regions 2017 is different between in the case where the observation distance is shorter than the optimum viewing distance and in the case where the observation distance is longer than the optimum viewing distance.

Figure 40:
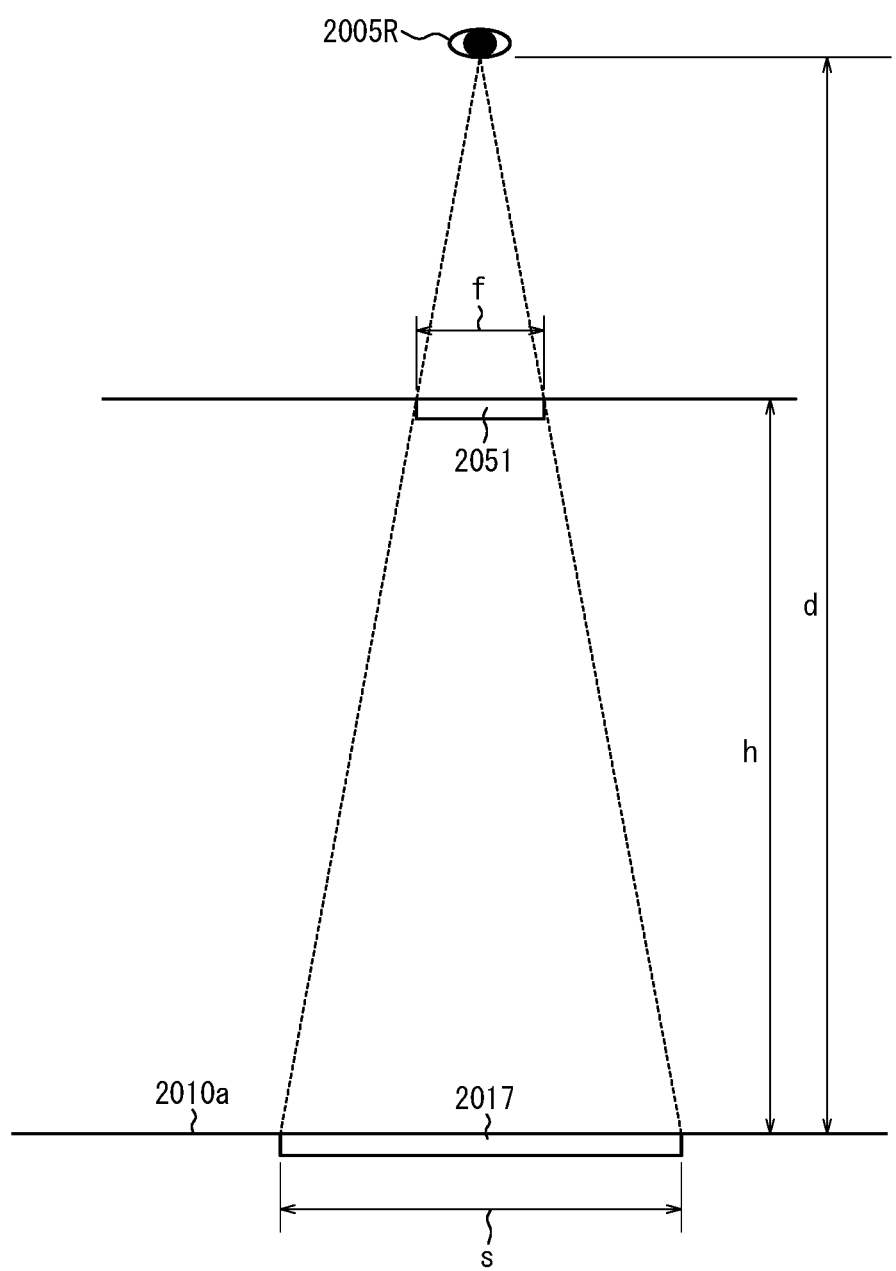
FIG. 40 is a diagram illustrating the width of the right eye display same region in the case where the observation distance is longer than the optimum viewing distance.

The size of the right-eye image same region 2017 in the X-axis direction in the case where the observation distance is longer than the optimum viewing distance is expressed by the observation distance and the optimum viewing distance, as illustrated in FIG. 40. The sizes of the dot region 2051 and the right-eye image same region 2017 in the X-axis direction are respectively denoted by f and s. The observation distance and the optimum viewing distance are respectively denoted by h and d. In this case, the size of the right-eye image same region 2017 in the X-axis direction is expressed by the following Formula (3-4):

$$s = f \times h/(h-d) \qquad (3\text{-}4)$$

In Formula (3-3), (d−h)>0. In Formula (3-4), (h−d)>0. By substituting (d−h) and (h−d) in Formulas (3-3) and (3-4) by |h−d|, the size of the right-eye image same region 2017 in the X-axis direction in each of the case where the observation distance is shorter than the optimum viewing distance and the case where the observation distance is longer than the optimum viewing distance is commonly expressed by the following Formula (3-5):

$$s = f \times h/|h-d| \qquad (3\text{-}5)$$

The three-dimensional display system 2001 according to this embodiment determines the display boundary 2015 in each divided region, in the case where the observation distance is different from the optimum viewing distance. Thus, even in the case where the observation distance is different from the optimum viewing distance, the left-eye image and the right-eye image can be displayed so as to respectively reach the left eye 2005L and the right eye 2005R simply by controlling the image display, without making the barrier 2020 movable. Consequently, tracking the movement of the eyes of the user (head tracking) can be performed easily at low cost. Since stereoscopic vision can be provided regardless of a change in the observation distance, the range in which two-viewpoint stereoscopic vision can be provided to the user can be widened.

Suppose a reference point is located in an X-Y plane away from the display surface 2010a of the display apparatus 2010 by the optimum viewing distance. By virtually providing the reference point, the distribution of the right-eye image same region 2017 or the left-eye image same region on the display surface 2010a of the display apparatus 2010 can be determined easily.

The reference point may be determined depending on an optimal position for the user observing the display surface 2010a of the display apparatus 2010. The optimal position for the user observing the display surface 2010a of the display apparatus 2010 is also referred to as "optimal observation position".

The controller 2030 displays a certain content on the display apparatus 2010, to make the user observe the certain content. The certain content may be, for example, an image in which the right-eye image and the left-eye image are respectively totally white and totally black. When the user is in a position that is considered as optimal for observing the certain content, the controller 2030 acquires the positions of the left eye 2005L and the right eye 2005R from the detection apparatus 2040. The optimal observation position corresponds to the detected positions of the left eye 2005L and the right eye 2005R. The optimal observation position may match the control boundary 2052 in FIG. 36, etc.

The reference point may be determined for each of the left eye 2005L and the right eye 2005R. In this case, the reference point is the optimal observation position corresponding to each of the left eye 2005L and the right eye 2005R. The reference point may be one point common to the left eye 2005L and the right eye 2005R. In this case, for example, the reference point may be a point, such as a midpoint, between the optimal observation position corresponding to the left eye 2005L and the optimal observation position corresponding to the right eye 2005R.

Figure 41:
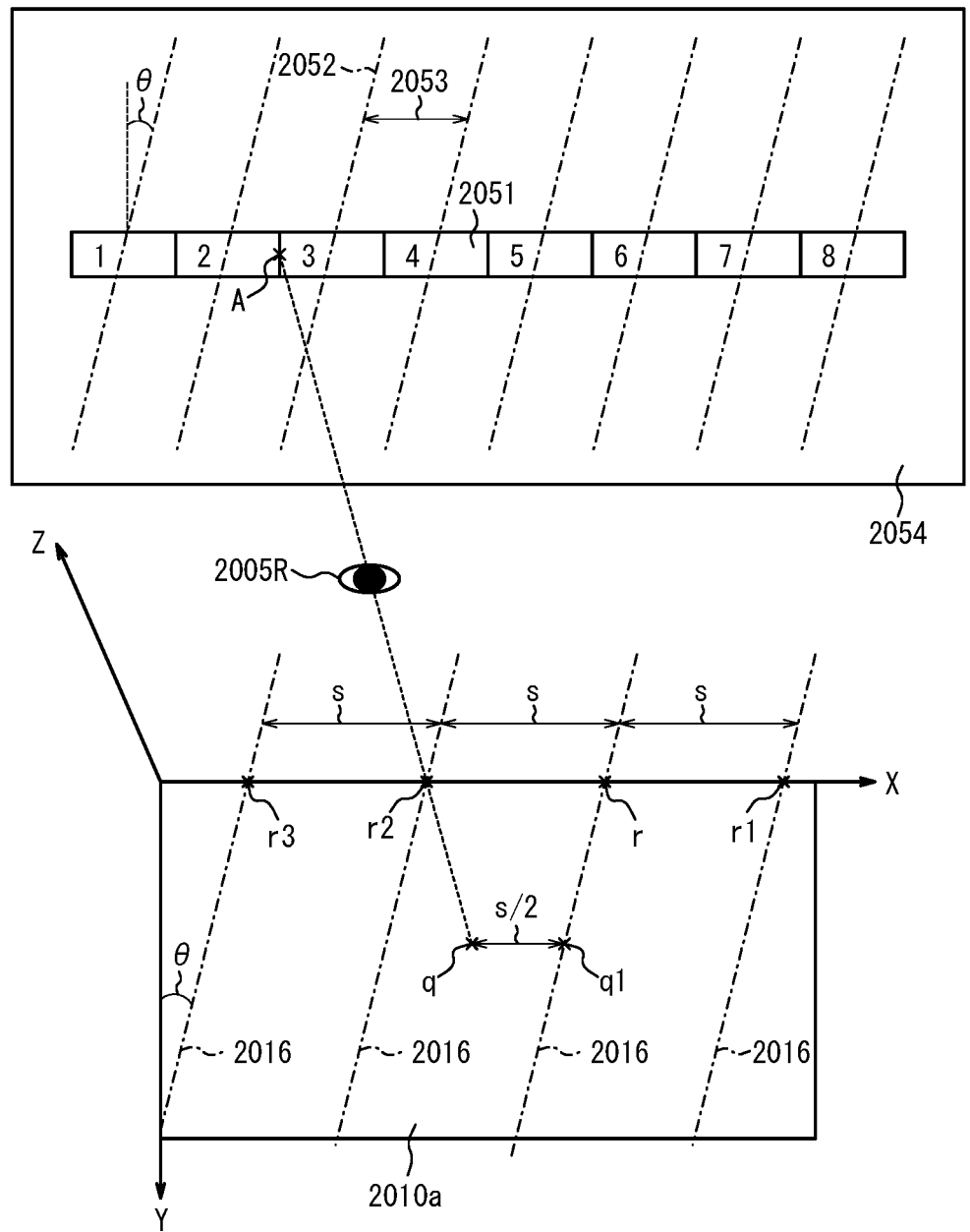
FIG. 41 is a diagram illustrating an example of a right eye display same boundary determination method in the case where the observation distance is shorter than the optimum viewing distance.

In the case where the observation distance is shorter than the optimum viewing distance, the controller 2030 may determine the right-eye image same boundary 2016 using a reference point denoted by A in FIG. 41. The display surface 2010a of the display apparatus 2010 along the X-Y plane is illustrated in the lower part of FIG. 41. The optimum viewing distance plane 2054 away from the display surface 2010a of the display apparatus 2010 in the positive direction of the Z axis by the optimum viewing distance and parallel to the X-Y plane is illustrated in the upper part of FIG. 41. The optimum viewing distance plane 2054 includes the dot regions 2051. The optimum viewing distance plane 2054 includes the control boundaries 2052 that each pass through the dot region 2051 and extends in a direction inclined at the barrier inclination angle with respect to the Y axis. The dot region 2051 extends in a direction along the control boundary 2052, on the optimum viewing distance plane 2054. The right eye 2005R is located between the display surface 2010a and the optimum viewing distance plane 2054 in the Z-axis direction.

In FIG. 41, the controller 2030 calculates q, as an intersection point of a dashed line extending from the reference point through the right eye 2005R and the display surface 2010a. The controller 2030 calculates q1, as a point away from q in the positive direction of the X-axis direction by s/2. Here, s is calculated by the foregoing Formula (3-5). The controller 2030 calculates r, as an intersection point of a dashed-dotted line extending from q1 in a direction inclined by the barrier inclination angle with respect to the Y axis and the X axis. The controller 2030 sets a straight line through q1 and r, as the right-eye image same boundary 2016. The controller 2030 calculates r1, r2, and r3, as points away from r in the positive and negative directions of the X axis by s. The controller 2030 sets lines through r1, r2, and r3 and parallel to a straight line through q1 and r, each as the right-eye image same boundary 2016. The right-eye image same boundary 2016 extends along the edge of the light transmitting region 2021 of the barrier 2020.

Figure 42:
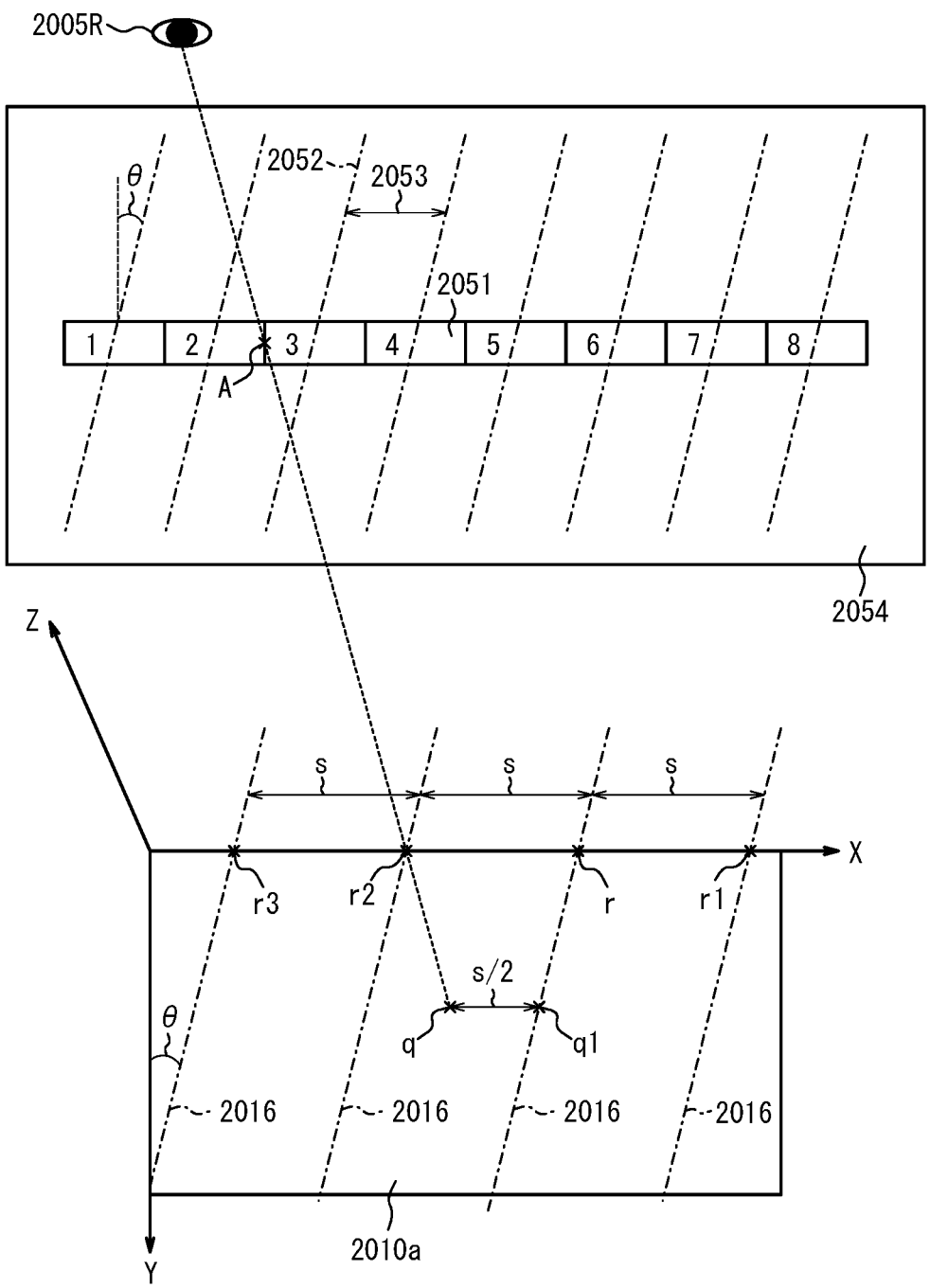
FIG. 42 is a diagram illustrating an example of a right eye display same boundary determination method in the case where the observation distance is longer than the optimum viewing distance.

In the case where the observation distance is longer than the optimum viewing distance, the controller 2030 may determine the right-eye image same boundary 2016 using a reference point denoted by A in FIG. 42. The display surface 2010a of the display apparatus 2010 and the optimum viewing distance plane 2054 are illustrated respectively in the lower and upper parts of FIG. 42, as in FIG. 41. The right eye 2005R is located on the positive side of the display surface 2010a and the optimum viewing distance plane 2054 in the Z-axis direction.

In FIG. 42, the controller 2030 calculates q, as an intersection point of a dashed line extending from the reference point through the right eye 2005R and the display surface 2010a. The controller 2030 calculates q1, as a point away from q in the positive direction of the X-axis direction by s/2. Here, s is calculated by the foregoing Formula (3-5). The controller 2030 calculates r, as an intersection point of a dashed-dotted line extending from q1 in a direction inclined by the barrier inclination angle with respect to the Y axis and the X axis. The controller 2030 sets a straight line through q1 and r, as the right-eye image same boundary 2016. The controller 2030 calculates r1, r2, and r3, as points away from r in the positive and negative directions of the X axis by s. The controller 2030 sets lines through r1, r2, and r3 and parallel to a straight line through q1 and r, each as the right-eye image same boundary 2016.

The method of determining the right-eye image same boundary 2016 corresponding to the right eye 2005R using the reference point has been described above, with reference to FIGS. 41 and 42. As a result of determining the right-eye image same boundary 2016, the right-eye image same region 2017 is determined. The controller 2030 determines the numbers of the subpixels 2011 as the second subpixels 2011R for displaying the right-eye image in the range of the right-eye image same region 2017. Through the use of the reference point, the numbers of the subpixels 2011 as the second subpixels 2011R can be determined easily even in the case where the observation distance of the user is different from the optimum viewing distance. This eases provision of stereoscopic vision to the user. For the left eye 2005L, too, the left-eye image same boundary and the left-eye image same region can be determined in the same way as above. The controller 2030 determines the numbers of the subpixels 2011 as the first subpixels 2011L for displaying the left-eye image in the range of the left-eye image same region.

The three-dimensional display system 2001 according to this embodiment can keep providing stereoscopic vision to the user by controlling the image displayed on the display apparatus 2010, even in the case where the user moves relative to the display apparatus 2010.

Figure 43:
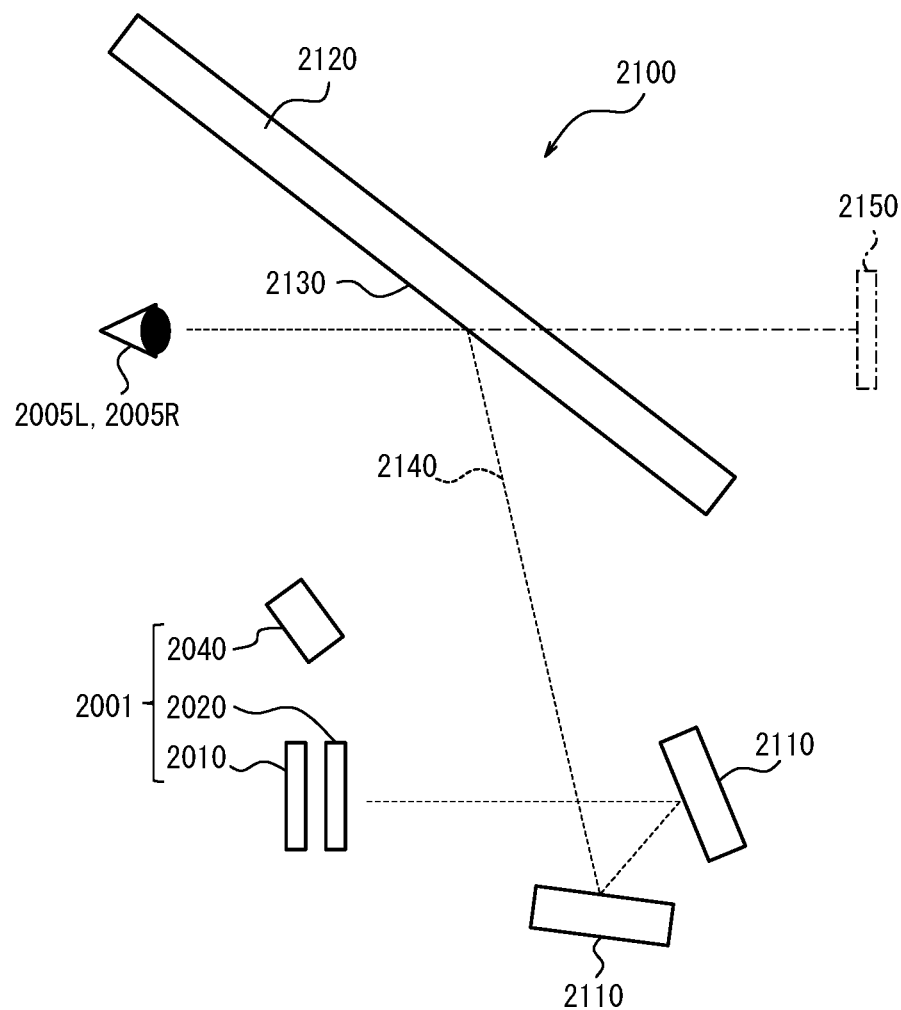
FIG. 43 is a diagram illustrating an example of equipping a three-dimensional display system according to an embodiment in an HUD.

The three-dimensional display system 2001 may be equipped in a head up display 2100, as illustrated in FIG. 43. The head up display 2100 can be abbreviated as "HUD 2100". The HUD 2100 is also referred to as "head up display system". The HUD 2100 includes the three-dimensional display system 2001, an optical member 2110, and a projection target member 2120 having a projection target surface 2130. The HUD 2100 causes image light emitted from the three-dimensional display system 2001 to reach the projection target member 2120 via the optical member 2110. The HUD 2100 causes the image light reflected off the projection target member 2120 to reach the left eye 2005L and the right eye 2005R of the user. Thus, the HUD 2100 causes the image light to travel from the three-dimensional display system 2001 to the left eye 2005L and the right eye 2005R of the user along an optical path 2140 indicated by dashed lines. The user can view the image light that has reached along the optical path 2140, as the virtual image 2150. The three-dimensional display system 2001 can provide stereoscopic vision according to the movement of the user, by controlling the display depending on the positions of the left eye 2005L and the right eye 2005R of the user detected by the detection apparatus 2040.

The HUD 2100 and the three-dimensional display system 2001 may be equipped in a mobile object. The HUD 2100 and the three-dimensional display system 2001 have part of their structure shared with another apparatus or component included in the mobile object. For example, the mobile object may use a windshield as part of the HUD 2100 and the three-dimensional display system 2001. In the case where part of the structure is shared with another apparatus or component included in the mobile object, the other structure can be referred to as "HUD module" or "three-dimensional display component". The three-dimensional display system 2001 and the display apparatus 2010 may be equipped in a mobile object.

The three-dimensional display system 2001 according to the present disclosure may provide stereoscopic vision to one user, instead of providing stereoscopic vision simultaneously to users.

Embodiment 4

In the case where the left and right eyes of the user are assumed to be laterally aligned, the structure of the barrier of the three-dimensional display system can be determined depending on the ratio (aspect ratio) of the length of the pixel of the display apparatus in the longitudinal direction to the length of the pixel in the lateral direction. In the case where the display apparatus is rotated 90 degrees, the aspect ratio of the pixel is the reciprocal of the aspect ratio in the case where the display apparatus is not rotated. In the case where the aspect ratio is the reciprocal, the barrier may be required to have a different structure for stereoscopic vision. A three-dimensional display system 3001 according to one of embodiments of the present disclosure can provide stereoscopic vision using a barrier of a common structure even in the case where the aspect ratio of the pixel is the reciprocal.

Figure 44:
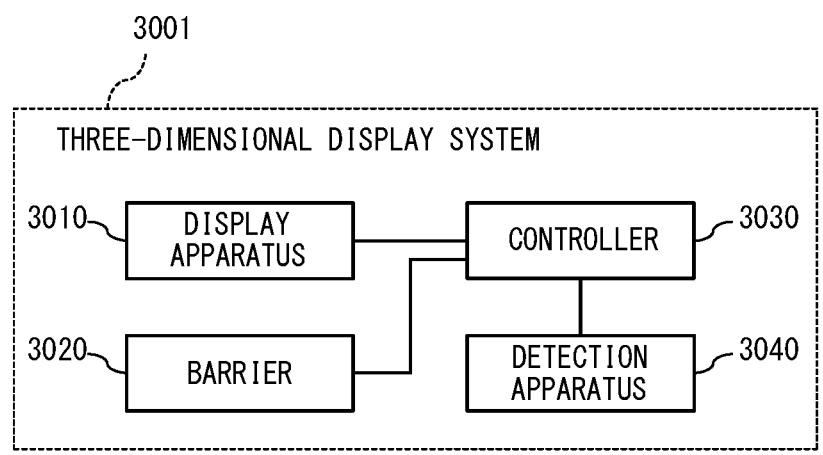
FIG. 44 is a functional block diagram illustrating an example of a three-dimensional display system according to an embodiment.
Figure 45:
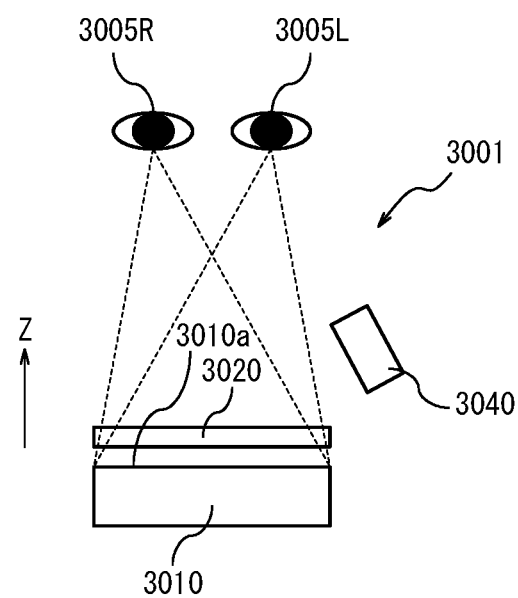
FIG. 45 is a diagram illustrating an example of the structure of the three-dimensional display system according to an embodiment.

As illustrated in FIGS. 44 and 45, the three-dimensional display system 3001 according to an embodiment includes a display apparatus 3010, a barrier 3020, a controller 3030, and a detection apparatus 3040. The three-dimensional display system 3001 displays an image by the display apparatus 3010 and shields part of image light by the barrier 3020, thus allowing different images to be presented to the left eye 3005L of the user and the right eye 3005R of the user. The user views a binocular parallax image with the left eye 3005L and the right eye 3005R, and therefore can stereoscopically view the image. The three-dimensional display system 3001 detects the position of the head of the user by the detection apparatus 3040, and performs head tracking control of controlling image display depending on the position of the head. The head tracking can be abbreviated as "HT". Hereafter, it is assumed that the normal to a display surface 3010a for displaying an image in the display apparatus 3010 is along the Z-axis direction. It is also assumed that the user is located in the positive direction of the Z axis with respect to the display apparatus 3010.

The display apparatus 3010 displays a left-eye image to the left eye 3005L of the user, and displays a right-eye image to the right eye 3005R of the user. The display apparatus 3010 may be, for example, a liquid crystal device such as a liquid crystal display (LCD). The display apparatus 3010 may be a self-luminous device such as an organic EL (electro-luminescence) display or an inorganic EL display.

The barrier 3020 is located between the user and the display apparatus 3010. The barrier 3020 causes the left-eye image displayed by the display apparatus 3010 to be visible to the left eye 3005L of the user and not visible to the right eye 3005R of the user. The barrier 3020 causes the right-eye image displayed by the display apparatus 3010 to be visible to the right eye 3005R of the user and not visible to the left eye 3005L of the user. The barrier 3020 may be integrally provided at the display surface 3010a of the display apparatus 3010. The barrier 3020 may be provided at a certain distance away from the display apparatus 3010.

The controller 3030 is connected to each component in the three-dimensional display system 3001, and controls each component. The controller 3030 is implemented, for example, as a processor. The controller 3030 may include one or more processors. The processors may include a general-purpose processor that performs a specific function by reading a specific program, and a dedicated processor dedicated to a specific process. The dedicated processor may include an application specific integrated circuit (ASIC). Each processor may include a programmable logic device (PLD). The PLD may include a field-programmable gate array (FPGA). The controller 3030 may be any of a system on a chip (SoC) or a system in a package (SiP) in which one or more processors cooperate with each other. The controller 3030 may include memory, and store various information, programs for operating each component in the three-dimensional display system 3001, and the like in the memory. The memory may be, for example, semiconductor memory. The memory may function as work memory of the controller 3030.

The detection apparatus 3040 detects the position of any of the left eye 3005L and the right eye 3005R of the user, and outputs the detected position to the controller 3030. The detection apparatus 3040 may include, for example, a camera. The detection apparatus 3040 may capture an image of the face of the user by the camera. The detection apparatus 3040 may detect the position of at least one of the left eye 3005L and the right eye 3005R from the image captured by the camera. The detection apparatus 3040 may detect the position of at least one of the left eye 3005L and the right eye 3005R as coordinates in a three-dimensional space, from an image captured by one camera. The detection apparatus 3040 may detect the position of at least one of the left eye 3005L and the right eye 3005R as coordinates in a three-dimensional space, from images captured by two or more cameras.

The detection apparatus 3040 may be connected to an external camera, instead of including a camera. The detection apparatus 3040 may include an input terminal to which a signal from the external camera is input. The external camera may be directly connected to the input terminal. The external camera may be indirectly connected to the input terminal via a shared network. The detection apparatus 3040 not including a camera may include an input terminal to which a video signal from a camera is input. The detection apparatus 3040 not including a camera may detect the position of at least one of the left eye 3005L and the right eye 3005R from the video signal input to the input terminal.

The detection apparatus 3040 may include, for example, a sensor. The sensor may be an ultrasonic sensor, an optical sensor, or the like. The detection apparatus 3040 may detect the position of the head of the user by the sensor, and detect the position of at least one of the left eye 3005L and the right eye 3005R based on the position of the head. The detection apparatus 3040 may detect the position of at least one of the left eye 3005L and the right eye 3005R as coordinates in a three-dimensional space by one or more sensors.

The detection apparatus 3040 may detect the moving distance of at least one of the left eye 3005L and the right eye 3005R along the X-axis direction or the Y-axis direction, based on the detection result of the position of at least one of the left eye 3005L and the right eye 3005R. The detection apparatus 3040 may detect the moving distance of at least one of the left eye 3005L and the right eye 3005R along the Z-axis direction. The detection apparatus 3040 may have the start point and the end point of detecting the moving distance, as certain points. The start point of detecting the moving distance may be, for example, the position of at least one of the left eye 3005L and the right eye 3005R when the image displayed by the display apparatus 3010 is changed as a result of HT control. The end point of detecting the moving distance may be the position of at least one of the left eye 3005L and the right eye 3005R when the moving distance is detected.

The three-dimensional display system 3001 may not include the detection apparatus 3040. In the case where the three-dimensional display system 3001 does not include the detection apparatus 3040, the controller 3030 may include an input terminal to which a signal from an external detection apparatus is input. The external detection apparatus may be connected to the input terminal. The external detection apparatus may use an electrical signal and an optical signal as transmission signals to the input terminal. The external detection apparatus may be indirectly connected to the input terminal via a shared network. The controller 3030 may calculate, based on the detection result of the position of at least one of the left eye 3005L and the right eye 3005R acquired from the external detection apparatus, the moving distance of the at least one of the left eye 3005L and the right eye 3005R. The controller 3030 may calculate the moving distance of the left eye 3005L and the right eye 3005R along the Z-axis direction.

Figure 46:
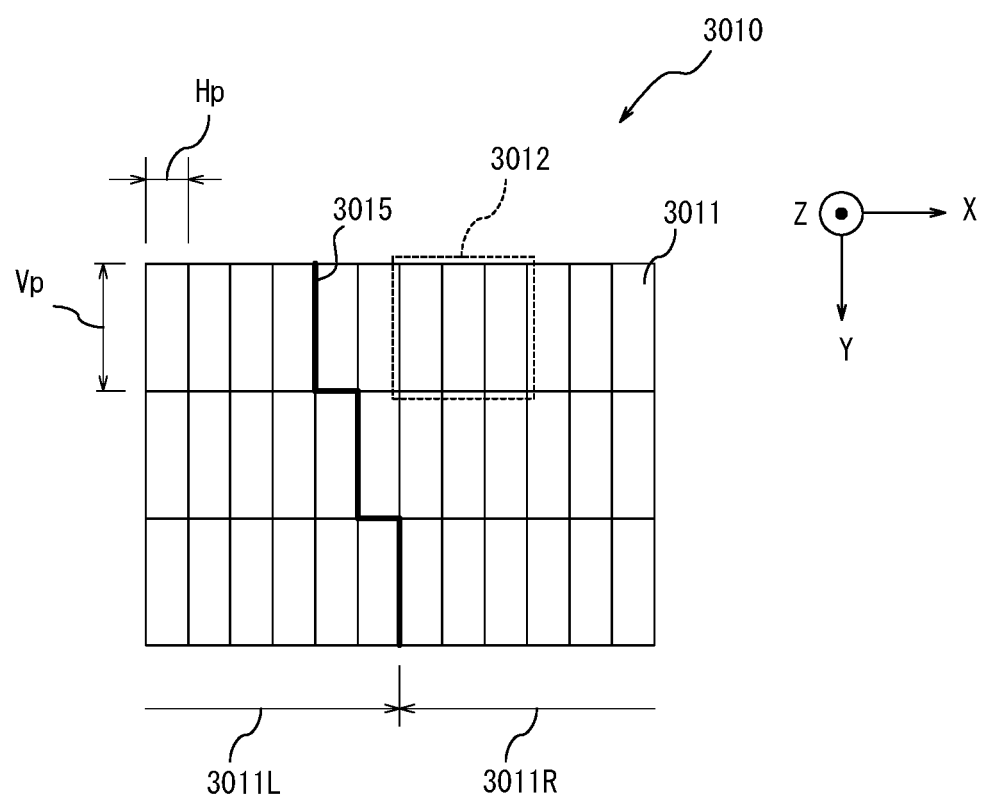
FIG. 46 is a diagram illustrating an example of the structure of a display apparatus.

The display apparatus 3010 includes subpixels 3011, as illustrated in FIG. 46 as an example. The subpixels 3011 are arranged in a grid. The grid axes representing the arrangement of the subpixels 3011 are assumed to be the X axis and the Y axis. The origin point of the X axis and the Y axis may be the center of the display surface 3010a. Each subpixel 3011 has a length in each of the X-axis direction and the Y-axis direction. The respective lengths of the subpixel 3011 in the X-axis direction and the Y-axis direction are denoted by Hp and Vp. Hereafter, it is assumed that Vp>Hp. The X-axis direction is also referred to as "horizontal direction" or "first direction". The Y-axis direction is also referred to as "vertical direction" or "second direction".

Subpixels 3011 may constitute a pixel 3012. In FIG. 46, a pixel 3012 is composed of three subpixels 3011 enclosed by dashed lines. A pixel 3012 may be composed of, for example, subpixels 3011 displaying the colors of R, G, and B. The number of subpixels 3011 constituting a pixel 3012 is not limited to three, and may be two, or four or more. In the case where the display apparatus 3010 is an LCD or an organic EL display or inorganic EL display, each pixel may correspond to a subpixel 3011 or a pixel 3012. In this embodiment, it is assumed that a pixel 3012 is composed of subpixels 3011 arranged in the horizontal direction. In other words, in this embodiment, it is assumed that the horizontal direction is a direction in which subpixels 3011 constituting a pixel 3012 are arranged.

As illustrated in FIG. 46, in the case where the subpixels 3011 constituting the pixel 3012 are laterally arranged as seen from the user, the X-axis direction and the Y-axis direction correspond to the lateral direction and the longitudinal direction respectively. The ratio of the longitudinal length to the lateral length of the subpixel 3011 as seen from the user is also referred to as the "aspect ratio of the subpixel 3011". In this case, the aspect ratio is Vp/Hp. Hereafter, Vp/Hp is denoted by x (x>1). In the case where the display apparatus 3010 illustrated in FIG. 46 rotates 90 degrees, the subpixels 3011 constituting the pixel 3012 are longitudinally arranged as seen from the user. In the case where the subpixels 3011 are longitudinally arranged as seen from the user, the X-axis direction and the Y-axis direction correspond to the longitudinal direction and the lateral direction respectively. In this case, the aspect ratio of the subpixel 3011 is Hp/Vp. Hp/Vp is denoted by 1/x. Thus, as a result of the display apparatus 3010 rotating 90 degrees relative to the user, the aspect ratio of the subpixel 3011 becomes the reciprocal.

The arrangement of the subpixels 3011 is divided by a display boundary 3015 in a stepped shape indicated by thick lines. The subpixels 3011 included in one arrangement separated by the display boundary 3015 is also referred to as "first subpixels 3011L". The subpixels 3011 included in the other arrangement separated by the display boundary 3015 is also referred to as "second subpixels 3011R". The display boundary 3015 is not limited to the shape illustrated in FIG. 46, and may be in other shapes. The display apparatus 3010 displays a left-eye image in the first subpixels 3011L, and a right-eye image in the second subpixels 3011R. The display boundary 3015 is determined by the controller 3030. The display boundary 3015 may include a first display boundary indicating a range in which the first subpixels 3011L are arranged, and a second display boundary indicating a range in which the second subpixels 3011R are arranged. This makes it possible to express subpixels 3011 that are neither the first subpixels 3011L nor the second subpixels 3011R.

The controller 3030 has operation modes between which the orientations of both the left-eye image and the right-eye image displayed by the display apparatus 3010 are different. The orientations of both the left-eye image and the right-eye image displayed by the display apparatus 3010 are also referred to as "image display direction". It is assumed that the image display direction corresponds to the first direction as seen from the user. That is, in the case where the first direction is the lateral direction as seen from the user, the image display direction is assumed to be the lateral direction. In the case where the first direction is the longitudinal direction as seen from the user, the image display direction is assumed to be the longitudinal direction. The case where the first direction is the longitudinal direction as seen from the user can be regarded as the case where the second direction is the lateral direction as seen from the user.

The controller 3030 has a portrait mode and a landscape mode as the operation modes. In the case of operating in the portrait mode, the controller 3030 sets the image display direction in the display apparatus 3010 to the lateral direction. In the case where the image display direction is the lateral direction, the subpixel 3011 is vertically long as seen from the user. In the case of operating in the landscape mode, the controller 3030 sets the image display direction in the display apparatus 3010 to the longitudinal direction. In the case where the image display direction is the longitudinal direction, the subpixel 3011 is horizontally long as seen from the user. The portrait mode and the landscape mode are also referred to as "first mode" and "second mode" respectively.

Figure 47:
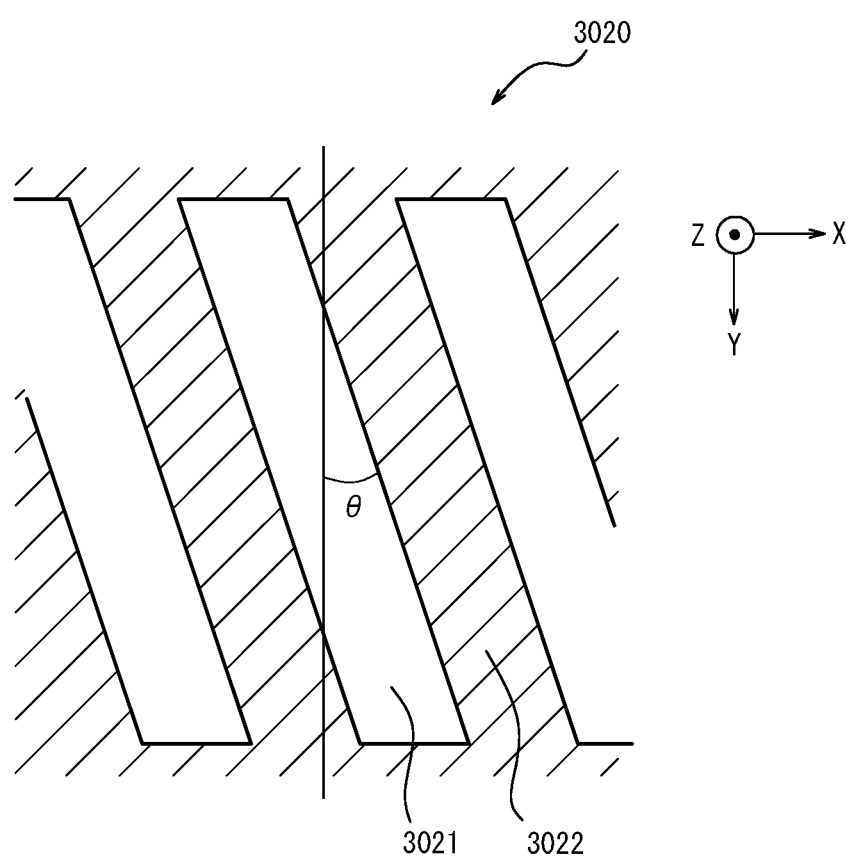
FIG. 47 is a diagram illustrating an example of the structure of a barrier.
Figure 48:
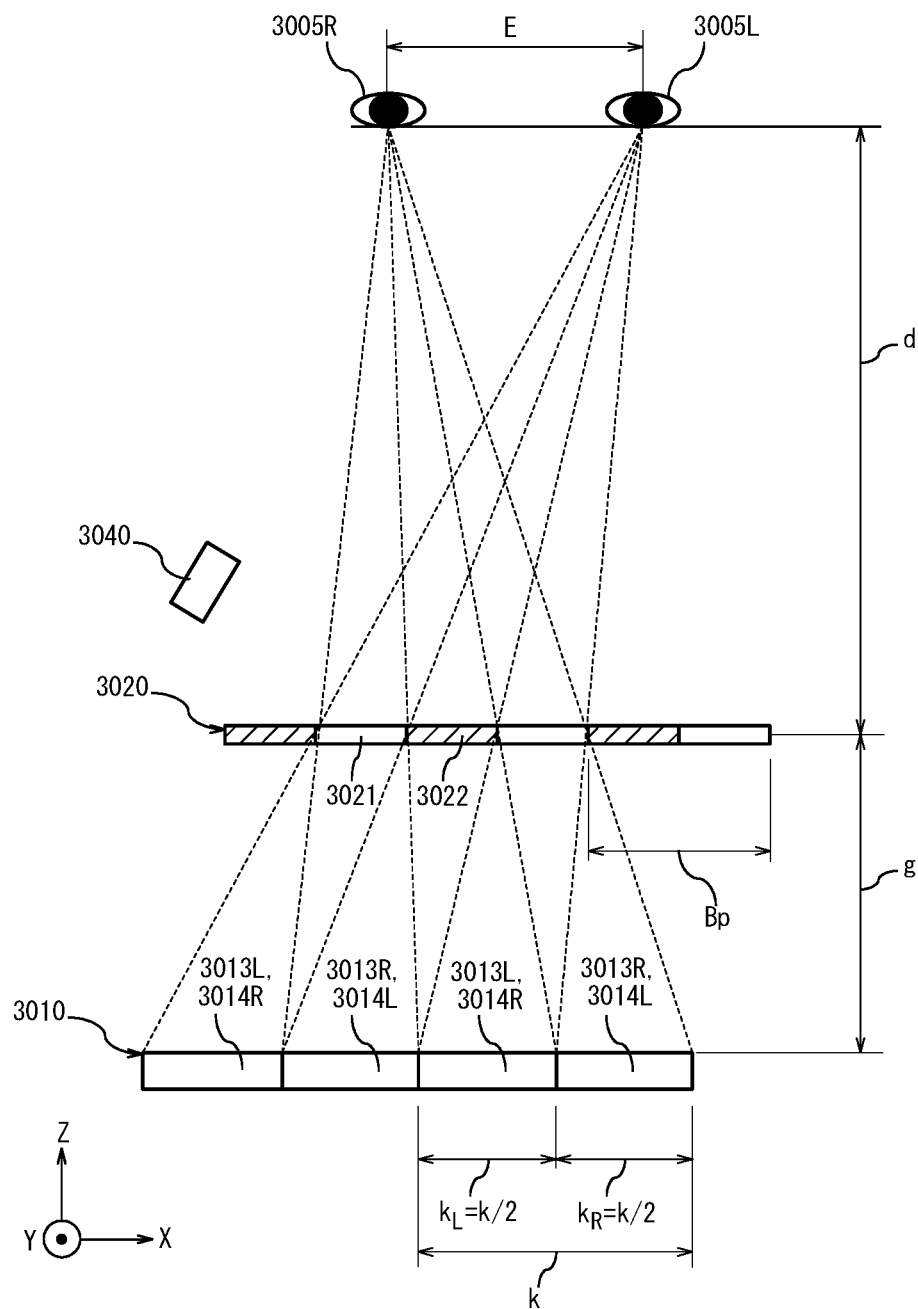
FIG. 48 is a diagram illustrating an example in which the eyes are located at a optimum viewing distance from the barrier.

The barrier 3020 includes light transmitting regions 3021 and light shielding regions 3022, as illustrated in FIG. 47 as an example. The X axis and the Y axis in FIG. 47 correspond to the directions of the X axis and the Y axis in FIG. 46. The directions of the X axis and the Y axis rotate with rotation of the display apparatus 3010. Hence, the directions of the X axis and the Y axis can change with respect to the structure of the light transmitting regions 3021 and the light shielding regions 3022.

The light transmitting regions 3021 are parts that transmit light incident on the barrier 3020. The light transmitting regions 3021 may transmit light at transmittance of a first certain value or more. For example, the first certain value may be 100%, or a value close to 100%. The light shielding regions 3022 are parts that shield light incident on the barrier 3020 so as not to pass through. In other words, the light shielding regions 3022 shield an image displayed by the display apparatus 3010. The light shielding region 3022 may shield light at transmittance of a second certain value or less. For example, the second certain value may be 0%, or a value close to 0%.

In FIG. 47, the light transmitting regions 3021 and the light shielding regions 3022 alternate with each other in the horizontal direction and the vertical direction. The lines indicating the edges of the light transmitting regions 3021 extend in a direction inclined from the vertical direction by a certain angle θ. The lines indicating the edges of the light transmitting regions 3021 can also be regarded as the edges of the light transmitting regions 3021. The certain angle θ is also referred to as "barrier inclination angle". θ may be an angle greater than 0 degrees and less than 90 degrees. For example, θ may be determined to satisfy tan θ=a×Hp/b×Vp (a, b: natural numbers). If the edge of the light transmitting region 3021 extends in the Y-axis direction in FIG. 47 and coincides with the arrangement direction of the subpixels 3011, moire tends to be recognized in the display image due to errors contained in the arrangement of the subpixels 3011 and the dimensions of the light transmitting regions 3021. If the edge of the light transmitting region 3021 extends in the direction having the certain angle with respect to the Y-axis direction in FIG. 47, moire is hardly recognized in the display image regardless errors contained in the arrangement of the subpixels 3011 and the dimensions of the light transmitting regions 3021.

The barrier 3020 may be composed of a film or a platy member having transmittance of less than the second certain value. In this case, the light shielding regions 3022 are formed by the film or platy member, and the light transmitting regions 3021 are formed by openings in the film or platy member. The film may be made of resin, or made of other material. The platy member may be made of resin, metal, or the like, or made of other material. The barrier 3020 is not limited to a film or a platy member, and may be composed of any other type of member. The barrier 3020 may be composed of a light shielding substrate. The barrier 3020 may be composed of a substrate containing a light shielding additive.

The barrier 3020 may be composed of a liquid crystal shutter. The liquid crystal shutter can control the transmittance of light according to an applied voltage. The liquid crystal shutter may be made up of pixels, and control the transmittance of light in each pixel. The liquid crystal shutter may form a region with high transmittance of light or a region with low transmittance of light, in any shape. In the case where the barrier 3020 is composed of a liquid crystal shutter, the light transmitting regions 3021 may be regions having transmittance of the first certain value or more. In the case where the barrier 3020 is composed of a liquid crystal shutter, the light shielding regions 3022 may be regions having transmittance of the second certain value or less.

Figure 49:
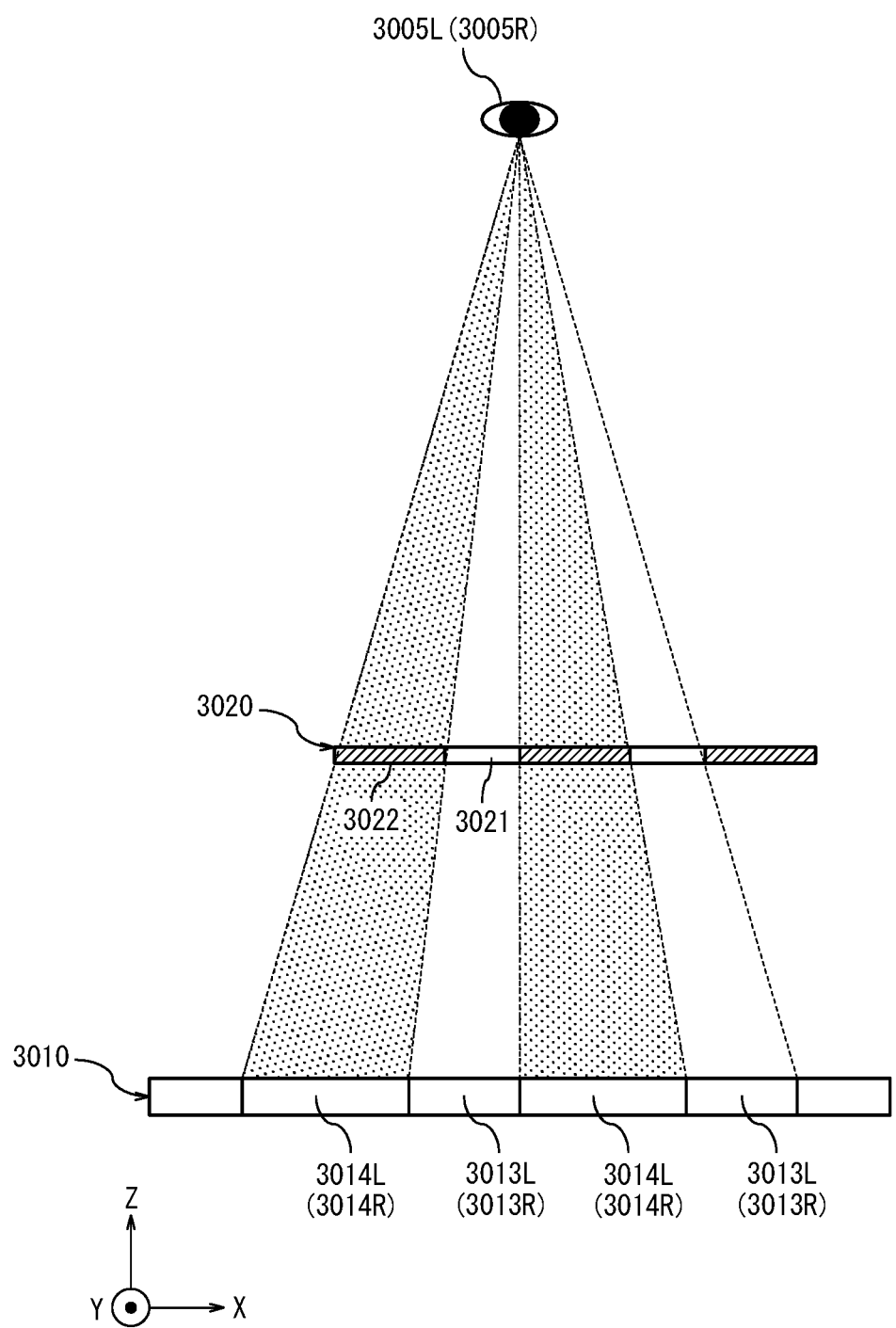
FIG. 49 is a diagram illustrating an example of a visible region and a light shielding region on the display apparatus.

As illustrated in FIG. 49, it is assumed that the left eye 3005L and the right eye 3005R of the user are located at a optimum viewing distance, denoted by d, from the barrier 3020. The optimum viewing distance is also referred to as "optical viewing distance (OVD)". The left eye 3005L and the right eye 3005R can view an image displayed by the display apparatus 3010 via the barrier 3020. The barrier 3020 includes the light transmitting regions 3021 shown as blank and the light shielding regions 3022 shown as hatched. The light transmitting regions 3021 and the light shielding regions 3022 alternate with each other in the X-axis direction. The pitch with which the light transmitting regions 3021 and the light shielding regions 3022 alternate is denoted by Bp. The distance between the left eye 3005L and the right eye 3005R is donated by E. The distance from the barrier 3020 to the display apparatus 3010 is donated by g.

The display apparatus 3010 includes left-eye visible regions 3013L and right-eye visible regions 3013R visible respectively to the left eye 3005L and the right eye 3005R of the user via the light transmitting regions 3021. The display apparatus 3010 includes left-eye light shielding regions 3014L and right-eye light shielding regions 3014R that are made not visible respectively to the left eye 3005L and the right eye 3005R of the user by the light shielding regions 3022. The lines indicating the edges of the left-eye visible regions 3013L and the right-eye visible regions 3013R correspond to the lines indicating the edges of the light transmitting regions 3021. The lines indicating the edges of the left-eye light shielding regions 3014L and the right-eye light shielding regions 3014R correspond to the lines indicating the edges of the light shielding regions 3022. The display boundary 3015 may be located along the line indicating the edge of each of the left-eye visible region 3013L and the right-eye visible region 3013R. That is, the display boundary 3015 may be located along the edge of the light transmitting region 3021.

In the example in FIG. 49, the following assumption is further made. The light transmitting region 3021 and the light shielding region 3022 have the same width, denoted by Bp/2, in the X-axis direction. In the portrait mode, the ratio of the width of the light transmitting region 3021 in the X-axis direction to the width of the light transmitting region 3021 and the light shielding region 3022 in the X-axis direction can be regarded as an opening ratio. In the example in FIG. 49, the opening ratio of the barrier 3020 is (Bp/2)/Bp, i.e. 50%. In the landscape mode, the ratio of the width of the light transmitting region 3021 in the X-axis direction to the width of the light transmitting region 3021 and the light shielding region 3022 in the X-axis direction can be regarded as an opening ratio.

The pitch with which the left-eye visible regions 3013L and the right-eye visible regions 3013R alternate is denoted by k. The left-eye visible region 3013L and the right-eye visible region 3013R respectively have widths $k_L$ and $k_R$ in the X-axis direction. In the portrait mode, the left-eye visible region 3013L includes m subpixels successive along the horizontal direction. In the portrait mode, the right-eye visible region 3013R includes m successive subpixels. When tan θ=a×Hp/b×Vp, k satisfies a formula k=2 mHp/b. In the landscape mode, the left-eye visible region 3013L includes j successive subpixels. In the portrait mode, the right-eye visible region 3013R includes j successive subpixels. When tan θ=(a×Hp)/(b×Vp)=(a × Vp)/(b×$x^2$×Hp), k satisfies a formula k=2×j×Vp/(b×$x^2$). At the OVD, $k_L$ and $k_R$ are both expressed as k/2. At the OVD, the left-eye visible regions 3013L and the right-eye visible regions 3013R alternate without a spacing. At the OVD, the left-eye visible region 3013L and the right-eye light shielding region 3014R overlap with each other. At the OVD, the right-eye visible region 3013R and the left-eye light shielding region 3014L overlap with each other.

The relationships among E, k, d, and g illustrated in FIG. 49 are geometrically determined. The ratio of E and k/2 is equal to the ratio of d and g. In other words, the relationship of Formula (4-1) holds:

$$E : k/2 = d : g \qquad (4\text{-}1).$$

The relationships among Bp, k, d, and g illustrated in FIG. 49 are geometrically determined. The ratio of Bp and k is equal to the ratio of d and (d+g). In other words, the relationship of Formula (4-2) holds:

$$Bp:k=d:(d+g) \quad (4\text{-}2).$$

In the case where the light transmitting region 3021 and the light shielding region 3022 have different widths, $k_L$ and $k_R$ are each different from k/2. In the case where the light transmitting region 3021 is narrower in width than the light shielding region 3022, $k_L$ and $k_R$ are each less than k/2. In such a case, the left-eye visible region 3013L and the right-eye visible region 3013R are arranged with a spacing. As a result of the left-eye visible region 3013L and the right-eye visible region 3013R being arranged with a spacing, crosstalk caused by a right-eye image reaching the left eye 3005L or a left-eye image reaching the right eye 3005R can be reduced. In the case where the light transmitting region 3021 is greater in width than the light shielding region 3022, $k_L$ and $k_R$ are each greater than k/2. In such a case, the left-eye visible region 3013L and the right-eye visible region 3013R partially overlap with each other. As a result of the left-eye visible region 3013L and the right-eye visible region 3013R partially overlapping with each other, crosstalk occurs. Here, k also represents the pitch of the left-eye visible region 3013L or the right-eye visible region 3013R. Hereafter, the pitch of the left-eye visible region 3013L or the right-eye visible region 3013R is also referred to as "visible region pitch".

In the case where the distance between each of the left eye 3005L and the right eye 3005R and the barrier 3020 is different from the optimum viewing distance, $k_L$ and $k_R$ are each not limited to k/2. For example, in the case where the distance between each of the left eye 3005L and the right eye 3005R and the barrier 3020 is longer than the optimum viewing distance, $k_L$ and $k_R$ are each less than k/2. In such a case, the left-eye visible region 3013L and the right-eye visible region 3013R may be arranged with a spacing. For example, in the case where the distance between each of the left eye 3005L and the right eye 3005R and the barrier 3020 is shorter than the optimum viewing distance, $k_L$ and $k_R$ are each greater than k/2. In such a case, the left-eye visible region 3013L and the right-eye visible region 3013R may partially overlap with each other.

As illustrated in FIG. 49, the display apparatus 3010 as seen from the left eye 3005L has the left-eye visible region 3013L and the left-eye light shielding region 3014L. An image displayed in the left-eye visible region 3013L is visible to the left eye 3005L. Meanwhile, an image displayed in the left-eye light shielding region 3014L shielded by the light shielding region 3022 as indicated by hatching is not visible to the left eye 3005L. In FIG. 49, the left eye 3005L, the left-eye visible region 3013L, and the left-eye light shielding region 3014L can be replaced with the right eye 3005R, the right-eye visible region 3013R, and the right-eye light shielding region 3014R, respectively. The display apparatus 3010 as seen from the right eye 3005R has the right-eye visible region 3013R and the right-eye light shielding region 3014R. An image displayed in the right-eye visible region 3013R is visible to the right eye 3005R. Meanwhile, an image displayed in the right-eye light shielding region 3014R shielded by the light shielding region 3022 as indicated by hatching is not visible to the right eye 3005R.

Figure 50:
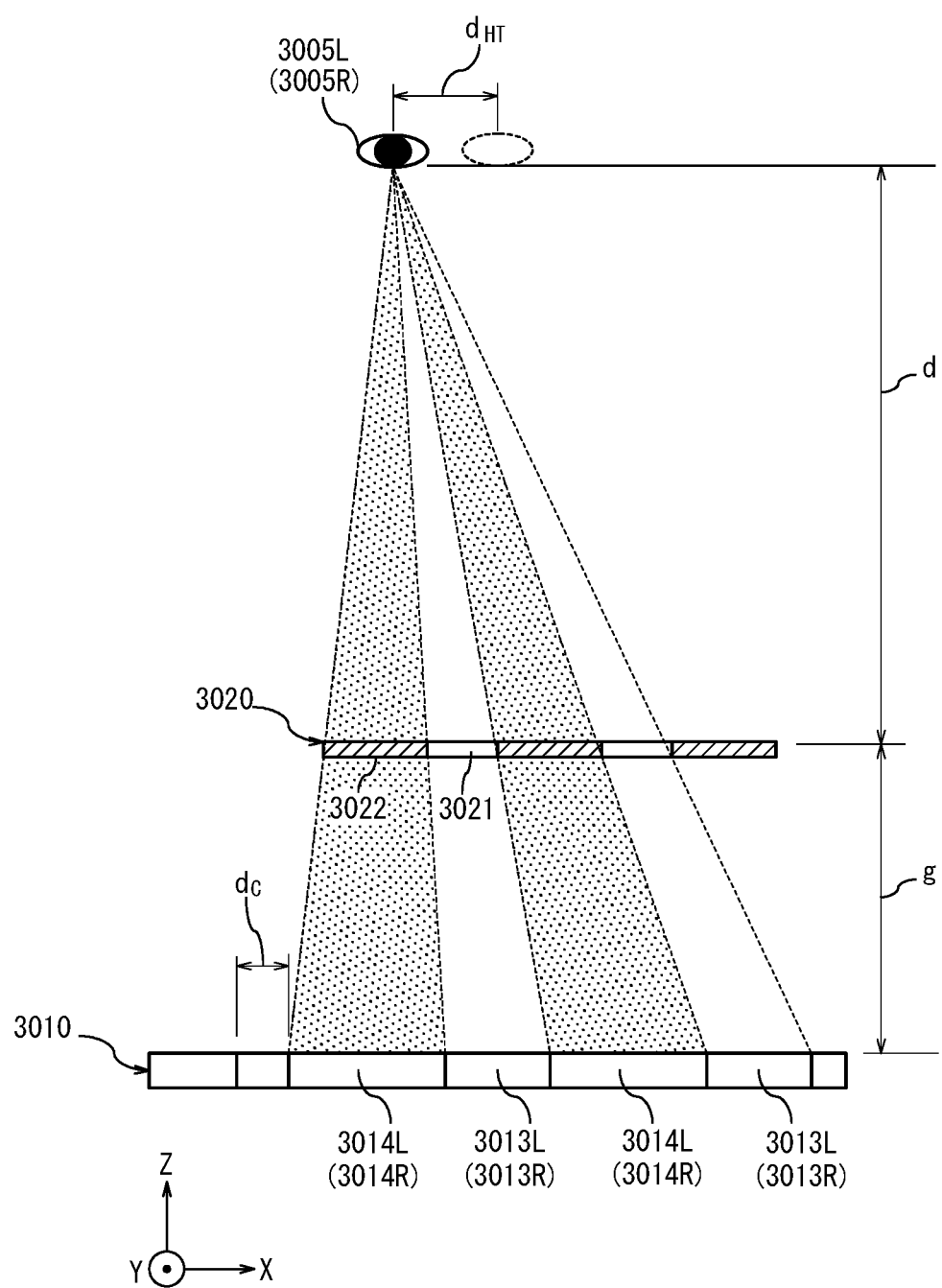
FIG. 50 is a diagram illustrating an example of a visible region and a light shielding region on the display apparatus.

As illustrated in FIG. 50, in the case where the left eye 3005L moves in the negative direction of the X axis by $d_{HT}$, the left-eye visible region 3013L and the left-eye light shielding region 3014L in the display apparatus 3010 move in the positive direction of the X axis by $d_C$. In FIG. 50, the left eye 3005L can be replaced with the right eye 3005R. In the case where the right eye 3005R moves in the negative direction of the X axis by $d_{HT}$, the right-eye visible region 3013R and the right-eye light shielding region 3014R in the display apparatus 3010 move in the positive direction of the X axis by $d_C$.

Figure 51:
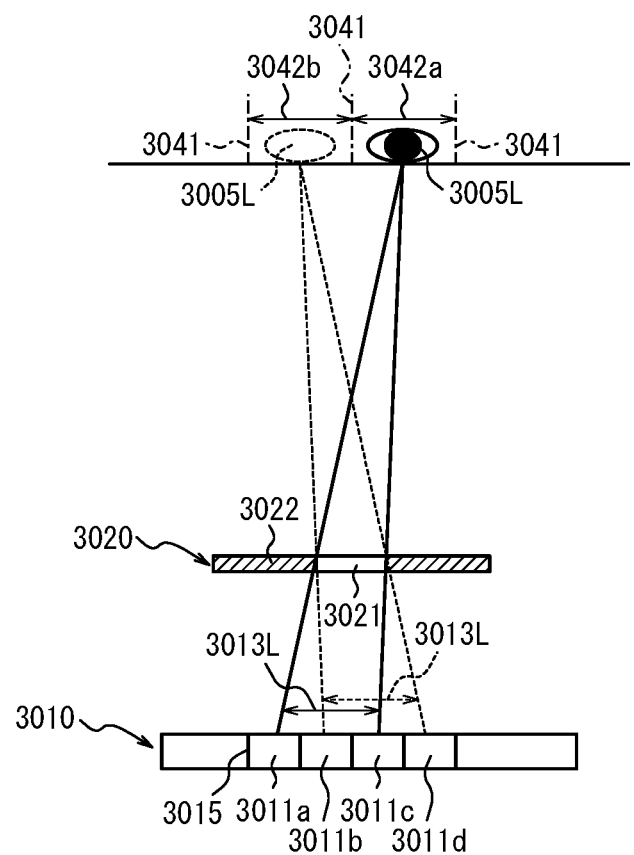
FIG. 51 is a diagram illustrating an example of the correlation between the head tracking boundary and the display boundary.

As illustrated in FIG. 51, in the case of operating in the portrait mode, the controller 3030 virtually sets, in a certain plane, head tracking boundaries 3041 arranged in the X-axis direction based on the shape of the light transmitting region 3021 of the barrier 3020. The certain plane is assumed to be parallel to a plane in which the barrier 3020 is located, and away from the barrier 3020 by the OVD. The head tracking boundaries 3041 are also referred to as "HT boundaries 3041". The left eye 3005L or the right eye 3005R is located in any of head tracking regions 3042 defined by the HT boundaries 3041. The head tracking regions 3042 are also referred to as "HT regions 3042".

The first subpixels 3011L included in the left-eye visible region 3013L are determined depending on the HT region 3042 in which the left eye 3005L is located. For example, in the case where the left eye 3005L is located in a HT region 3042a, the left-eye visible region 3013L indicated by the solid arrow includes subpixels 3011a, 3011b, and 3011c. That is, the subpixels 3011a, 3011b, and 3011c are the first subpixels 3011L. In the case where the left eye 3005L is located in a HT region 3042b, the left-eye visible region 3013L indicated by the dashed arrow includes subpixels 3011b, 3011c, and 3011d. That is, the subpixels 3011b, 3011c, and 3011d are the first subpixels 3011L.

The interval of the HT boundaries 3041 assumed in the portrait mode is expressed as $I_{1HT}=(Hp \times d)/(g \times b)$, using Hp in FIG. 46, etc. and d and g in FIG. 50, etc. In FIG. 51, the left eye 3005L can be replaced with the right eye 3005R. The HT boundaries 3041 are assumed for each of the left eye 3005L and the right eye 3005R. The HT region 3042 is assumed for each of the left eye 3005L and the right eye 3005R. The interval of the HT boundaries 3041 assumed in the portrait mode is also referred to as "first interval".

The interval of the HT boundaries 3041 assumed in the landscape mode is expressed as $I_{2HT}=(Vp \times d)/(g \times b \times x^2)$, using Vp in FIG. 46, etc. and d and g in FIG. 50, etc. The interval of the HT boundaries 3041 assumed in the landscape mode is also referred to as "second interval".

In the case where the left-eye visible region 3013L and the right-eye visible region 3013R move in response to the movement of the left eye 3005L and the right eye 3005R, the three-dimensional display system 3001 moves the image displayed by the display apparatus 3010 to keep providing stereoscopic vision to the user. The controller 3030 acquires the positions of the left eye 3005L and the right eye 3005R from the detection apparatus 3040. Based on the positions of the left eye 3005L and the right eye 3005R, the controller 3030 determines the display boundary 3015 so that the first subpixels 3011L and the second subpixels 3011R are respectively located in the left-eye visible region 3013L and the right-eye visible region 3013R. In other words, when each of the left eye 3005L and the right eye 3005R passes across the HT boundary 3041, the controller 3030 moves the display boundary 3015 in the X-axis direction by one subpixel. The controller 3030 may move the display boundary 3015, based on the moving distance of the left eye 3005L and the right eye 3005R acquired from the detection apparatus 3040. The moving distance may be detected as the distance from the HT boundary 3041 to the left eye 3005L and the right eye 3005R. The controller 3030 may move the display boundary 3015, when the moving distance of the left eye 3005L and the right eye 3005R reaches the first interval.

Figure 52:
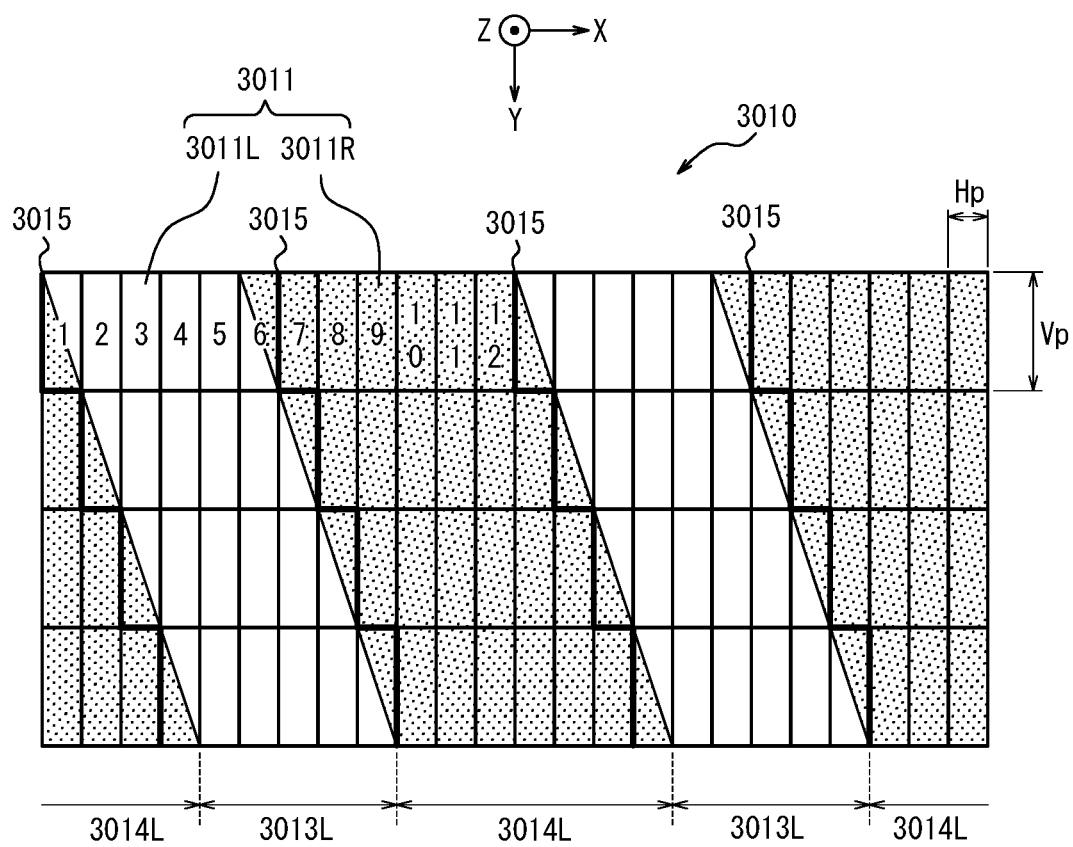
FIG. 52 is a diagram illustrating a display example of the display apparatus in a portrait mode.

FIG. 52 illustrates the positions of the left-eye visible region 3013L and the left-eye light shielding region 3014L with respect to the arrangement of the subpixels 3011 as seen from the left eye 3005L. The left-eye light shielding region 3014L is indicated as a region with hatching. The left-eye visible region 3013L is indicated as a region without hatching. The arrangement of the subpixels 3011 is divided between the arrangement of the first subpixels 3011L and the arrangement of the second subpixels 3011R by the display boundary 3015. The arrangement of the first subpixels 3011L is an arrangement in which the subpixels 3011 of numbers 1 to 6 are included. The arrangement of the second subpixels 3011R is an arrangement in which the subpixels 3011 of numbers 7 to 12 are included. In FIG. 52, the left eye 3005L, the left-eye visible region 3013L, and the left-eye light shielding region 3014L can be replaced with the right eye 3005R, the right-eye visible region 3013R, and the right-eye light shielding region 3014R, respectively. In the case where the left eye 3005L is replaced with the right eye 3005R, the first subpixels 3011L and the second subpixels 3011R are replaced with each other.

The left-eye visible region 3013L corresponds to a region visible through the light transmitting region 3021 of the barrier 3020 in FIG. 47. The display apparatus 3010 illustrated in FIG. 52 is used in the portrait mode. The display apparatus 3010 includes the first subpixels 3011L indicated by hatching, and the second subpixels 3011R separated from the first subpixels 3011L by the display boundary 3015. The controller 3030 determines the position of the display boundary 3015 so that the first subpixels 3011L are located in the left-eye visible region 3013L. The positional relationship between the right-eye visible region 3013R and the second subpixels 3011R is the same as the positional relationship between the left-eye visible region 3013L and the first subpixels 3011L. In this case, at least part of image light emitted from the first subpixels 3011L and at least part of image light emitted from the second subpixels 3011R respectively reach the left eye 3005L and the right eye 3005R.

As illustrated in FIG. 51, when the left eye 3005L passes across the HT boundary 3041, the controller 3030 moves the display boundary 3015 in the X-axis direction by one subpixel 3011. In other words, when the left eye 3005L moves to the adjacent HT region 3042, the controller 3030 moves the display boundary 3015 in the X-axis direction by one subpixel 3011. By moving the display boundary 3015 in response to the movement of the left eye 3005L, the three-dimensional display system 3001 can continuously make the left-eye image visible to the left eye 3005L. In the case where the left eye 3005L moves in the positive direction of the X axis, too, the three-dimensional display system 3001 can continuously make the left-eye image visible to the left eye 3005L. In the case where the right eye 3005R moves in the positive or negative direction of the X axis, too, the three-dimensional display system 3001 can continuously make the right-eye image visible to the right eye 3005R.

As illustrated in FIG. 50, suppose the left-eye visible region 3013L and the left-eye light shielding region 3014L move in the positive direction of the X axis by $d_C$ in response to the left eye 3005L moving in the negative direction of the X axis by $d_{HT}$. In such a case, in FIG. 52, too, the left-eye visible region 3013L and the left-eye light shielding region 3014L move in the positive direction of the X axis by $d_C$. When $d_C$ reaches Hp which is the length of the subpixel 3011 in the X-axis direction, the controller 3030 may move the display boundary 3015 in the X-axis direction by one subpixel 3011.

The condition for the controller 3030 to move the display boundary 3015 may be expressed as the condition that the moving distance of the left eye 3005L and the right eye 3005R along the X-axis direction reaches a control distance, instead of the condition that $d_C$ reaches Hp. The moving distance is assumed to be the distance from the position of the left eye 3005L and the right eye 3005R when the controller 3030 moved the display boundary most recently to the position of the left eye 3005L and the right eye 3005R acquired by the controller 3030. The controller 3030 sets the control distance in the portrait mode depending on the arrangement of the subpixels 3011. The control distance in the portrait mode is expressed as $D_{1HT}=(Hp \times d)/(g \times b)$, using d and g in FIG. 50. The control distance in the portrait mode is also referred to as "first distance". That is, when the moving distance reaches the first distance, the controller 3030 moves the display boundary 3015 in the X-axis direction by one subpixel 3011.

In the display apparatus 3010 illustrated in FIG. 52 described above, the image display direction is the lateral direction. In the display apparatus 3010 illustrated in FIG. 53, on the other hand, the image display direction is the longitudinal direction. In detail, with respect to the display apparatus 3010 illustrated in FIG. 52, the display apparatus 3010 illustrated in FIG. 53 is rotated 90 degrees counterclockwise as seen from the positive side of the Z axis, in a plane along the X-axis direction and the Y-axis direction.

Figure 53:
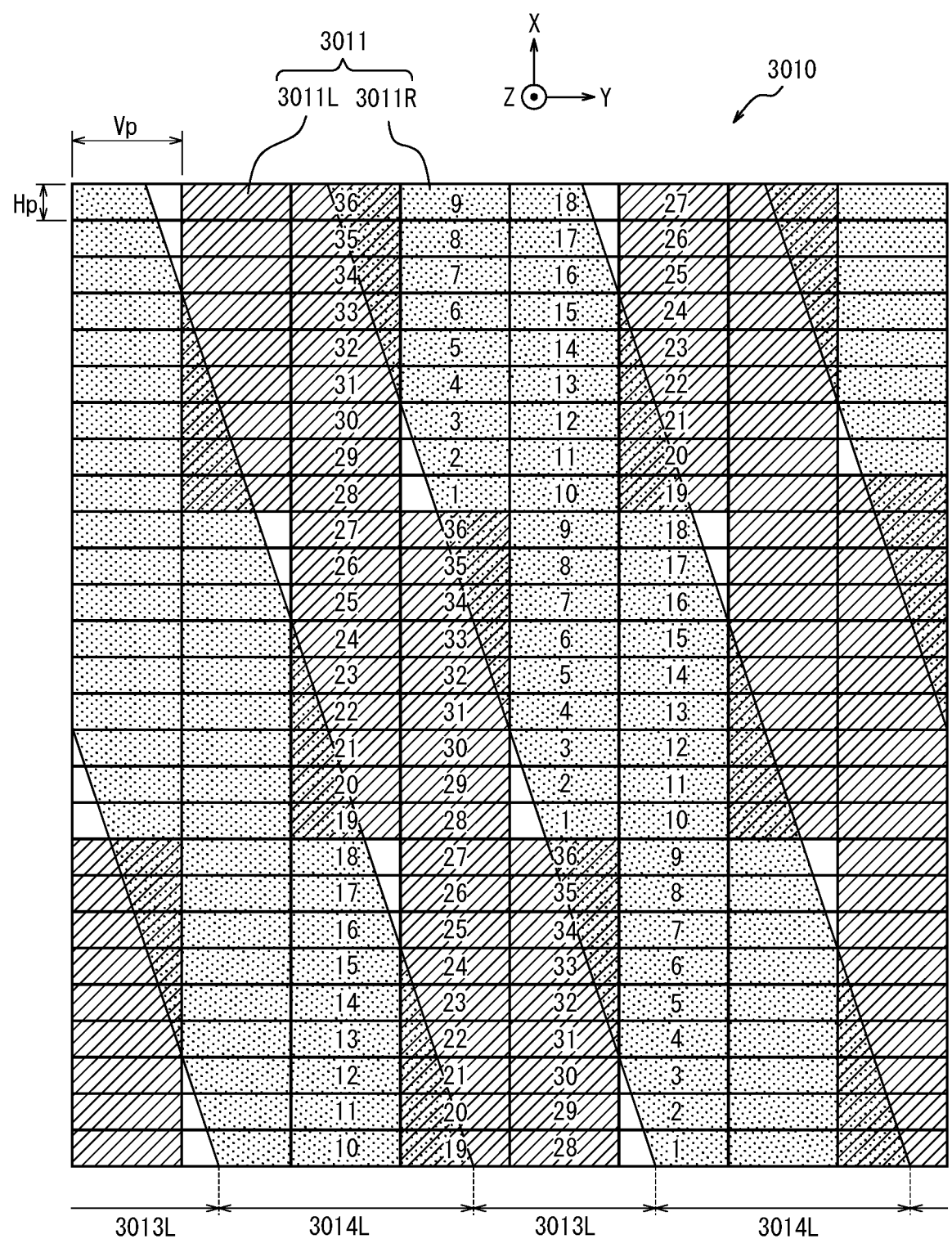
FIG. 53 is a diagram illustrating a display example of the display apparatus in a landscape mode.

In FIG. 53, the barrier 3020 is not rotated relative to the user. That is, with respect to the barrier 3020, too, the display apparatus 3010 is rotated 90 degrees counterclockwise as seen from the positive side of the Z axis. Since the barrier 3020 is not rotated, the arrangement of the subpixels 3011 is rotated 90 degrees counterclockwise as seen from the positive side of the Z axis with respect to the left-eye visible region 3013L. In other words, the barrier 3020 is rotated 90 degrees clockwise in a plane along the X-axis direction and the Y-axis direction with respect to the display apparatus 3010.

FIG. 53 illustrates the positions of the left-eye visible region 3013L and the left-eye light shielding region 3014L with respect to the arrangement of the subpixels 3011 as seen from the left eye 3005L. The arrangement of the subpixels 3011 includes the arrangement of the first subpixels 3011L and the arrangement of the second subpixels 3011R. The arrangement of the first subpixels 3011L is an arrangement of subpixels 3011 with hatching. The arrangement of the second subpixels 3011R is an arrangement of subpixels 3011 without hatching. The first subpixels 3011L and the second subpixels 3011R are separated by the display boundary 3015. In FIG. 53, part of the first subpixel 3011L has numbers 19 to 36, and part of the second subpixels 3011R has numbers 1 to 18.

The display apparatus 3010 illustrated in FIG. 53 is used in the landscape mode. The display apparatus 3010 includes the first subpixels 3011L and the second subpixels 3011R, as in FIG. 52. At least part of image light emitted from the first subpixels 3011L and at least part of image light emitted from the second subpixels 3011R respectively reach the left eye 3005L and the right eye 3005R. The aspect ratio of the subpixel 3011 in FIG. 53 is the reciprocal of the aspect ratio of the subpixel 3011 in FIG. 52.

In FIG. 53, suppose the left eye 3005L and the right eye 3005R move in the positive or negative direction of the Y axis. When the left eye 3005L and the right eye 3005R pass across the HT boundaries 3041 arranged at the second interval in the Y-axis direction, the controller 3030 operating in the landscape mode moves the display boundary 3015 in the Y-axis direction by one subpixel 3011.

The second interval is expressed as $I_{2HT}=(Vp\times d)/(g\times b\times x^2)$, as mentioned above. The ratio of the second interval to the first interval is expressed as Vp/Hp (=x). In other words, the ratio of the second interval to the first interval is the ratio of the length of the subpixel 3011 in the second direction to the length of the subpixel 3011 in the first direction. Even in the case where the aspect ratio of the subpixel 3011 is the reciprocal depending on the operation mode, the controller 3030 can easily change the interval of the HT boundary 3041 depending on the aspect ratio.

The controller 3030 may move the display boundary 3015 depending on the moving distance of the left eye 3005L and the right eye 3005R along the Y-axis direction, as in the operation in the portrait mode illustrated in FIG. 52. The controller 3030 may set a control distance in the landscape mode. The control distance in the landscape mode is expressed as $D_{2HT}=(Vp\times d)/(g \times b\times x^2)$. The control distance in the landscape mode is also referred to as "second distance". That is, when the moving distance reaches the second distance, the controller 3030 moves the display boundary 3015 in the Y-axis direction by one subpixel 3011. In the landscape mode, too, the three-dimensional display system 3001 can continuously make the left-eye image and the right-eye image visible to the left eye 3005L and the right eye 3005R respectively, as in the portrait mode.

The ratio of the second distance to the first distance is expressed as Vp/Hp (=x). In other words, the ratio of the second distance to the first distance is the ratio of the length of the subpixel 3011 in the second direction to the length of the subpixel 3011 in the first direction. Even in the case where the aspect ratio of the subpixel 3011 is the reciprocal depending on the operation mode, the controller 3030 can easily change the control distance depending on the aspect ratio.

In the portrait mode illustrated in FIG. 52 and the landscape mode illustrated in FIG. 53, the barrier 3020 may have a common structure regardless of which mode the arrangement of the subpixels 3011 corresponds to. In detail, the same structure of the light transmitting region 3021 and the light shielding region 3022 may be used in both modes. For example, the barrier 3020 having the same ratio of the width of the light transmitting region 3021 and the width of the light shielding region 3022, pitch of repeating the light transmitting region 3021 and the light shielding region 3022, barrier inclination angle, and the like may be used.

The three-dimensional display system 3001 according to this embodiment can provide stereoscopic vision to the user using the barrier 3020 of the same structure, even in the case where the display apparatus 3010 is rotated 90 degrees as seen from the user and as a result the aspect ratio of the subpixel 3011 becomes the reciprocal. In the case where the barrier 3020 is composed of a film or a plate member, the barrier 3020 of the same structure can be commonly used in the modes, thus enabling use of a common member. In the case where the barrier 3020 is composed of a liquid crystal shutter, the pattern for controlling the transmittance of each pixel in the liquid crystal shutter is common, so that the storage capacity for pattern data can be saved. In addition, the control circuitry of the liquid crystal shutter can be simplified. This contributes to lower costs.

The controller 3030 may move the display boundary 3015 in the X-axis direction or the Y-axis direction not by one subpixel but by c subpixels. Here, c is a natural number of 2 or more. c may be the number of subpixels 3011 constituting the pixel 3012. For example, c may be 3. In this case, the control distance corresponding to c=3 is three times the control distance corresponding to c=1. When the moving distance reaches the control distance, the controller 3030 moves the display boundary 3015 in the X-axis direction by three subpixels 3011. This can simplify image display control. In the case where three subpixels 3011 display the colors of R, G, and B, color display by one pixel 3012 can be controlled as a whole. c denotes a unit number for switching display of subpixels 3011 in HT control. The unit number for switching display of subpixels 3011 in HT control is also referred to as "HT control unit".

It is assumed that, in the barrier 3020, the certain angle θ between the edge of the light transmitting region 3021 and the direction orthogonal to the vertical direction is determined to satisfy tan θ=a×Hp/b×Vp (a, b: natural numbers). By applying x=Vp/Hp, the formula satisfied by θ is expressed as tan θ=a/b×x.

In the portrait mode, k denoting the visible region pitch is expressed by the following Formula (4-3):

$$k=n\times Hp/b \qquad (4\text{-}3).$$

The longitudinal length and the lateral length of the subpixel 3011 in the landscape mode are respectively Hp and Vp, i.e. the reverse of the portrait mode. The direction indicated by the barrier inclination angle corresponds to a direction represented by a component having a length corresponding to a subpixels 3011 and a component having a length corresponding to (b×x×x) subpixels 3011 respectively in the horizontal direction and the vertical direction. In this case, the formula satisfied by θ is the following Formula (4-4):

$$\tan\theta=a\times Vp/(b\times x\times x\times Hp) \qquad (4\text{-}4).$$

Suppose, in the landscape mode, a pair of a right-eye image and a left-eye image are displayed in p successive subpixels 3011. By substituting, in Formula (4-3), n by p, Hp by Vp, and b by b×x×x, k denoting the visible region pitch is expressed by the following Formula (4-5):

$$k=p\times Vp/(b\times x\times x)=p\times Hp/(b\times x) \qquad (4\text{-}5).$$

As a result of the visible region pitch k being the same value in the portrait mode and the landscape mode, the OVD can be the same. In the case where the OVD is the same, the barrier 3020 can be used in common. In the case where k is the same value in both modes, n×x=p holds based on Formulas (4-3) and (4-5). In other words, in the case where a pair of a right-eye image and a left-eye image are displayed in n successive subpixels 3011 in the portrait mode, a pair of a right-eye image and a left-eye image are displayed in n×x successive subpixels 3011 in the landscape mode.

It is assumed that the left-eye visible region 3013L and the left-eye light shielding region 3014L illustrated in FIG. 52 are formed by the barrier 3020 having a barrier inclination angle calculated with a=b=1 and x=3. At least part of the first subpixels 3011L has numbers 1 to 6. At least part of the second subpixels 3011R has numbers 7 to 12. Thus, it is assumed that a pair of a right-eye image and a left-eye image are displayed in 12 (n=12) successive subpixels 3011. In this case, the visible region pitch is expressed as k=12×Hp, based on Formula (4-3).

The left-eye visible region 3013L and the left-eye light shielding region 3014L illustrated in FIG. 53 are similar to the left-eye visible region 3013L and the left-eye light shielding region 3014L illustrated in FIG. 52. At least part of the second subpixels 3011R has numbers 1 to 18. At least part of the first subpixels 3011L has numbers 19 to 36. Thus, given that n=12 in the portrait mode, a pair of a right-eye image and a left-eye image are displayed in 36 (p=n×x=36) successive subpixels 3011 in the landscape mode.

In the case where a pair of a right-eye image and a left-eye image are displayed in n successive subpixels 3011 in the portrait mode, crosstalk can be reduced if n satisfies at least the following Formula (4-6):

$$n \geq 2 \times (a+b-1) \tag{4-6}$$

In the landscape mode, on the other hand, a pair of a right-eye image and a left-eye image are displayed in n×x successive subpixels 3011.

Substituting, in Formula (4-6), n by n×x and b by b×x×x yields the following Formula (4-7). In the landscape mode, crosstalk can be reduced if n satisfies at least the following Formula (4-7):

$$n \geq 2 \times (a + b \times x \times x - 1)/x \tag{4-7}$$

It is assumed that the barrier inclination angle is determined to satisfy tan θ=x×Hp/Vp=1. In this case, a/b=x, and θ=45 degrees. The barrier inclination angle is 45 degrees both in the case where the display apparatus 3010 is used in the portrait mode and in the case where the display apparatus 3010 is used in the landscape mode.

For example, it is assumed that, in the case where x=3, image display is controlled with the HT control unit being 3 in the portrait mode. In this case, image display is controlled with the HT control unit being 3 in the landscape mode, too. Thus, in the case where the HT control unit in the portrait mode is c, the HT control unit in the landscape mode is also c.

With a barrier inclination angle of 45 degrees, image display can be controlled using the same HT control unit in the portrait mode and the landscape mode. This eases image display control.

The three-dimensional display system 3001 according to this embodiment can provide stereoscopic vision to the user simply by changing the control distance depending on the aspect ratio of the subpixel 3011, even in the case where the display apparatus 3010 is used in a state in which the aspect ratio of the subpixel 3011 is the reciprocal. Computation required to change the control distance depending on the aspect ratio of the subpixel 3011 is, for example, less than computation required to change the shape of the display boundary 3015. The structure of the controller 3030 can therefore be simplified. This contributes to lower costs.

In the example in FIG. 49, the light transmitting region 3021 and the light shielding region 3022 have the same width in the X-axis direction. However, the present disclosure is not limited to such. The light transmitting region 3021 and the light shielding region 3022 may have different widths in the X-axis direction. The ratio of the light transmitting region 3021 and the light shielding region 3022 may be different between the portrait mode and the landscape mode. The opening ratio of the barrier 3020 may be different between the portrait mode and the landscape mode. For example, the opening ratio in the landscape mode may be less than the opening ratio in the portrait mode. The inclination angle of the barrier 3020 may be the same in the portrait mode and the landscape mode. Computation required to change the position of the display boundary 3015 is, for example, less than computation required to change the shape of the display boundary 3015. In the case where the subpixel of the display apparatus 3010 is longer in the Y-axis direction, crosstalk is greater in the landscape mode than in the portrait mode. As a result of the opening ratio in the landscape mode being less than the opening ratio in the portrait mode, the three-dimensional display system 3001 can reduce crosstalk by simple control.

In the case where the opening ratio of the barrier 3020 is different between the portrait mode and the landscape mode, the controller 3030 may change the luminance of the light source device between the portrait mode and the landscape mode. The controller 3030 may set the luminance in the landscape mode to be higher than the luminance in the portrait mode.

Figure 54:
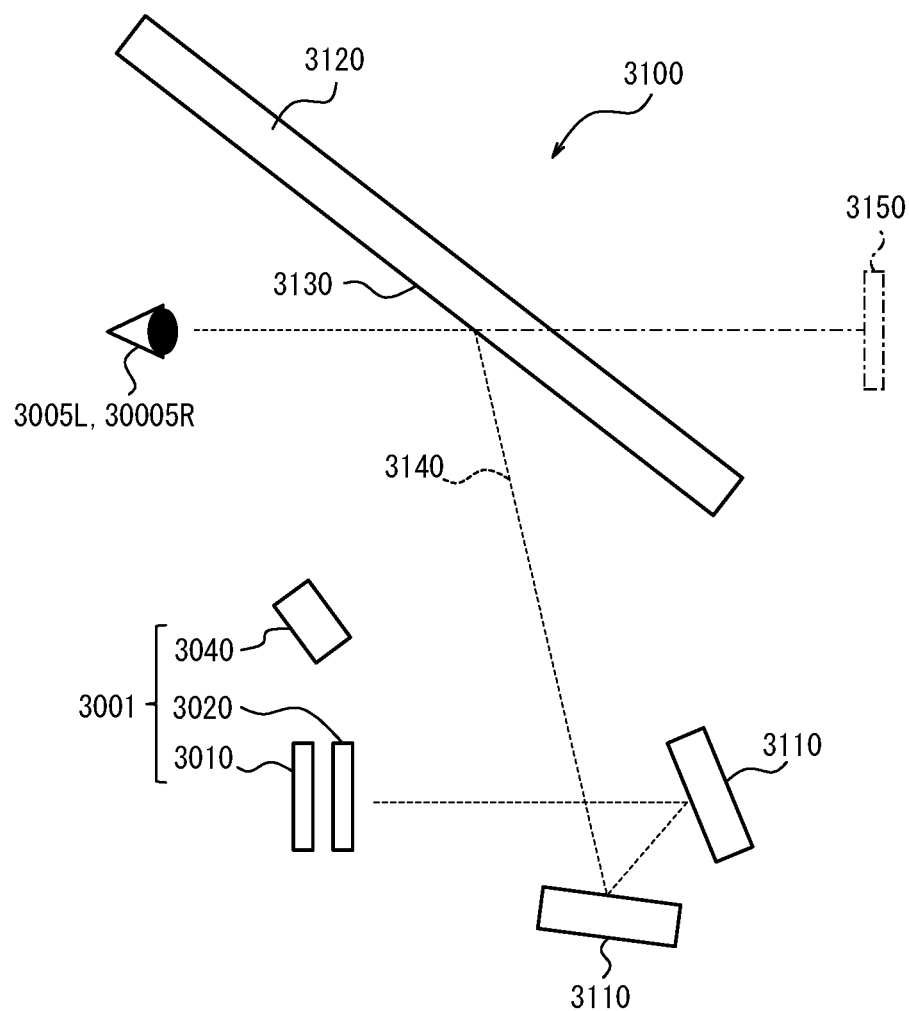
FIG. 54 is a diagram illustrating an example of equipping a three-dimensional display system according to an embodiment in an HUD.

The three-dimensional display system 3001 may be equipped in a head up display 3100, as illustrated in FIG. 54. The head up display 3100 can be abbreviated as "HUD 3100". The HUD 3100 is also referred to as "head up display system". The HUD 3100 includes the three-dimensional display system 3001, an optical member 3110, and a projection target member 3120 having a projection target surface 3130. The HUD 3100 causes image light emitted from the three-dimensional display system 3001 to reach the projection target member 3120 via the optical member 3110. The HUD 3100 causes the image light reflected off the projection target member 3120 to reach the left eye 3005L and the right eye 3005R of the user. Thus, the HUD 3100 causes the image light to travel from the three-dimensional display system 3001 to the left eye 3005L and the right eye 3005R of the user along an optical path 3140 indicated by dashed lines. The user can view the image light that has reached along the optical path 3140, as the virtual image 3150. The three-dimensional display system 3001 can provide stereoscopic vision according to the movement of the user, by controlling the display depending on the positions of the left eye 3005L and the right eye 3005R of the user detected by the detection apparatus 3040.

The HUD 3100 and the three-dimensional display system 3001 may be equipped in a mobile object. The HUD 3100 and the three-dimensional display system 3001 have part of their structure shared with another apparatus or component included in the mobile object. For example, the mobile object may use a windshield as part of the HUD 3100 and the three-dimensional display system 3001. In the case where part of the structure is shared with another apparatus or component included in the mobile object, the other structure can be referred to as "HUD module" or "three-dimensional display component". The three-dimensional display system 3001 and the display apparatus 3010 may be equipped in a mobile object.

The presently disclosed structures are not limited to the foregoing embodiments, and various modifications and changes are possible. For example, the functions, etc. included in the components, the steps, etc. may be rearranged without logical inconsistency, and components, etc. may be combined into one component, etc. and a component, etc. may be divided into components, etc.

The drawings used to describe the presently disclosed structures are schematic, and the dimensional ratios, etc. in the drawings do not necessarily coincide with actual dimensional ratios, etc.

Terms such as "first" and "second" in the present disclosure are identifiers for distinguishing components. Components distinguished by terms such as "first" and "second" in the present disclosure may have their numbers interchanged with each other. For example, the identifier "first" of the "first direction" and the identifier "second" of the "second direction" may be interchanged with each other. The identifiers are replaced with each other simultaneously. The components are distinguishable even after their identifiers are interchanged. The identifiers may be omitted. Components from which identifiers are omitted are distinguished by reference signs. Description of identifiers such as "first" and "second" in the present disclosure alone should not be used for interpretation of order of components or reasoning based on one identifier being smaller than another identifier.

REFERENCE SIGNS LIST 1 three-dimensional display system
2 detection apparatus
3 three-dimensional display apparatus
4 irradiation unit
5 display panel (display apparatus)
6 parallax barrier (optical element)
7 controller
8 mobile object
9 lenticular lens (optical element)
10 cylindrical lens
11 subpixel
11L first subpixel
11R second subpixel
12 pixel
15 display boundary
51 display surface
52 left-eye visible region
53 left-eye light shielding region
61 light shielding region
62 light transmitting region
100 head up display
110 optical member
120 projection target member
130 projection target surface
140 optical path
150 virtual image
1001 three-dimensional display system
1002 detection apparatus
1003 three-dimensional display apparatus
1004 irradiation unit
1005 display panel
1006 parallax barrier
1007 controller
1008 mobile object
1009 lenticular lens
1010 cylindrical lens
1051 display surface
1052 black matrix
1052a first black line
1052b second black line
1053 visible region
1054 light shielding region
1061 light shielding surface
1062 open region
1100 head up display system
1110 optical member
1120 projection target member
1130 projection target surface
1140 optical path
1150 virtual image
2001 three-dimensional display system
2005L left eye
2005R right eye
2010 display apparatus
2010a display surface
2011 subpixel
2011L first subpixel
2011R second subpixel
2012 pixel
2013L left-eye visible region
2013R right-eye visible region
2014L left-eye light shielding region
2014R right-eye light shielding region
2015 display boundary
2016 right-eye image same boundary
2017 (2017a, 2017b, 2017c) right-eye image same region
2020 barrier
2021 light transmitting region
2022 light shielding region
2030 controller
2040 detection apparatus
2041 head tracking boundary
2042 (2042a, 2042b) head tracking region
2051 dot region
2052 control boundary
2053 control region
2054 optimum viewing distance plane
2100 HUD
2110 optical member
2120 projection target member
2130 projection target surface
2140 optical path
2150 virtual image
3001 three-dimensional display system
3005L left eye
3005R right eye
3010 display apparatus
3011 subpixel
3011L first subpixel
3011R second subpixel
3012 pixel
3013L left-eye visible region
3013R right-eye visible region
3014L left-eye light shielding region
3014R right-eye light shielding region
3015 display boundary
3020 barrier
3021 light transmitting region
3022 light shielding region
3030 controller
3040 detection apparatus
3041 head tracking boundary
3042 (3042a, 3042b) head tracking region
3100 HUD
3110 optical member
3120 projection target member
3130 projection target surface
3140 optical path
3150 virtual image

The invention claimed is:

1. A three-dimensional display apparatus comprising:
a display apparatus
having a display surface including subpixels arranged in a grid in a first direction, and a second direction, and
configured to display a left-eye image and a right-eye image respectively in first subpixels and second subpixels separated by display boundaries passing along boundaries between the subpixels; and
an optical element configured to
selectively transmit at least part of the left-eye image in a direction of an optical path toward a left eye of the user, and
selectively transmit at least part of the right-eye image in a direction of an optical path toward a right eye of the user, wherein when an arrangement in the first direction of the grid formed by the subpixels is a row and an arrangement in the second direction of the grid is a column,
a first certain number of the first subpixels and of the second subpixels are each successively arranged in each column,
a region in which the first subpixels are arranged and a region in which the second subpixels are arranged are displaced from each other in the second direction by a second certain number between two adjacent columns,
the first certain number is greater than the second certain number and is not a multiple of the second certain number, and
the first certain number and the second certain number are determined based on a pitch in the first direction with which the left-eye image and the right-eye image are displayed.

2. The three-dimensional display apparatus according to claim 1, wherein each of the subpixels is longer in the first direction than in the second direction.

3. The three-dimensional display apparatus according to claim 1, wherein the optical element
is located at a certain distance away from the display surface,
includes a light shielding region and a light transmitting region arranged in a slit shape, and
is configured to cause the first subpixels to be visible to the left eye of the user and the second subpixels to be visible to the right eye of the user.

4. The three-dimensional display apparatus according to claim 3, wherein a pitch in the first direction of the light shielding region and the light transmitting region on the display surface viewed by the user is approximately equal to a value obtained by multiplying, by a pitch of the subpixel in the first direction, a quotient obtained by dividing twice the first certain number by the second certain number.

5. The three-dimensional display apparatus according to claim 1, wherein the optical element
is a lenticular lens located at a certain distance away from the display surface, and
is configured to cause the first subpixels to be visible to the left eye of the user and the second subpixels to be visible to the right eye of the user.

6. The three-dimensional display apparatus according to claim 1, comprising
an optical system configured to project image light emitted from the display surface and transmitted through the optical element so as to form a virtual image in a field of view of the user.

7. The three-dimensional display apparatus according to claim 1, wherein
the first direction is corresponding to a direction, in which parallax is provided to eyes of a user, and
the second direction is approximately orthogonal to the first direction.

8. A three-dimensional display system comprising:
a display apparatus having a display surface including subpixels arranged in a grid in a first direction corresponding to a direction in which parallax is provided to eyes of a user and a second direction approximately orthogonal to the first direction, and configured to display a left-eye image and a right-eye image respectively in first subpixels and second subpixels separated by display boundaries passing along boundaries between the subpixels;
an optical element configured to selectively transmit at least part of the left-eye image in a direction of an optical path toward a left eye of the user, and selectively transmit at least part of the right-eye image in a direction of an optical path toward a right eye of the user;
a detection apparatus configured to detect positions of the left eye and the right eye of the user; and
a controller configured to move the display boundaries, based on the positions of the left eye and the right eye of the user detected by the detection apparatus,
wherein when an arrangement in the first direction of the grid formed by the subpixels is a row and an arrangement in the second direction of the grid is a column, a first certain number of the first subpixels and of the second subpixels are each successively arranged in each column, a region in which the first subpixels are arranged and a region in which the second subpixels are arranged are displaced from each other in the second direction by a second certain number between two adjacent columns, and the first certain number is greater than the second certain number and is not a multiple of the second certain number, and
the first certain number and the second certain number are determined based on a pitch in the first direction with which the left-eye image and the right-eye image are displayed.

9. The three-dimensional display system according to claim 8, wherein
the first direction is corresponding to a direction, in which parallax is provided to eyes of a user, and
the second direction is approximately orthogonal to the first direction.

10. A head up display comprising:
a display apparatus having a display surface including subpixels arranged in a grid in a first direction corresponding to a direction in which parallax is provided to eyes of a user and a second direction approximately orthogonal to the first direction, and configured to display a left-eye image and a right-eye image respectively in first subpixels and second subpixels separated by display boundaries passing along boundaries between the subpixels;
an optical element configured to selectively transmit at least part of the left-eye image in a direction of an optical path toward a left eye of the user, and selectively transmit at least part of the right-eye image in a direction of an optical path toward a right eye of the user;
a detection apparatus configured to detect positions of the left eye and the right eye of the user;
a controller configured to move the display boundaries, based on the positions of the left eye and the right eye of the user detected by the detection apparatus; and
an optical system configured to project image light emitted from the display surface and transmitted through the optical element so as to form a virtual image in a field of view of the user,
wherein when an arrangement in the first direction of the grid formed by the subpixels is a row and an arrangement in the second direction of the grid is a column, a first certain number of the first subpixels and of the second subpixels are each successively arranged in each column, a region in which the first subpixels are arranged and a region in which the second subpixels are arranged are displaced from each other in the second direction by a second certain number between two adjacent columns, and the first certain number is greater than the second certain number and is not a multiple of the second certain number, and the first certain number and the second certain number are determined based on a pitch in the first direction with which the left-eye image and the right-eye image are displayed.

11. The head up display according to claim 10, wherein
the first direction is corresponding to a direction, in which parallax is provided to eyes of a user, and
the second direction is approximately orthogonal to the first direction.

12. A three-dimensional display apparatus design method for a three-dimensional display apparatus including: a display apparatus having a display surface including subpixels arranged in a grid in a first direction corresponding to a direction in which parallax is provided to eyes of a user and a second direction approximately orthogonal to the first direction, and configured to display a left-eye image and a right-eye image respectively in first subpixels and second subpixels separated by display boundaries passing along boundaries between the subpixels; and an optical element configured to selectively transmit at least part of the left-eye image in a direction of an optical path toward a left eye of the user, and selectively transmit at least part of the right-eye image in a direction of an optical path toward a right eye of the user, the three-dimensional display apparatus design method comprising:

determining an optimum viewing distance;

determining an image pitch that is a pitch in the first direction with which the left-eye image and the right-eye image are displayed, based on the optimum viewing distance;

determining a first certain number and a second certain number based on the image pitch, the first certain number being greater than the second certain number; and determining an arrangement method of the first subpixels and the second subpixels and a shape of the optical element based on the first certain number and the second certain number, wherein when an arrangement in the first direction of the grid formed by the subpixels is a row and an arrangement in the second direction of the grid is a column, the first certain number of the first subpixels and of the second subpixels are each successively arranged in each column, and a region in which the first subpixels are arranged and a region in which the second subpixels are arranged are displaced from each other in the second direction by the second certain number between two adjacent columns.

13. The three-dimensional display apparatus design method according to claim 12, wherein
the first direction is corresponding to a direction, in which parallax is provided to eyes of a user, and
the second direction is approximately orthogonal to the first direction.

* * * * *